United States Patent
Wang et al.

(10) Patent No.: US 11,937,231 B2
(45) Date of Patent: Mar. 19, 2024

(54) SIDELINK COMMUNICATION RELIABILITY

(71) Applicant: QUALCOMM Incorporated, San Diego, CA (US)

(72) Inventors: Xiaojie Wang, Hillsborough, NJ (US); Piyush Gupta, Bridgewater, NJ (US); Jing Sun, San Diego, CA (US); Lik Hang Silas Fong, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/350,314

(22) Filed: Jun. 17, 2021

(65) Prior Publication Data

US 2021/0400689 A1    Dec. 23, 2021

Related U.S. Application Data

(60) Provisional application No. 63/043,011, filed on Jun. 23, 2020.

(51) Int. Cl.
*H04W 72/1263* (2023.01)
*H04W 52/52* (2009.01)
(Continued)

(52) U.S. Cl.
CPC ....... *H04W 72/1263* (2013.01); *H04W 52/52* (2013.01); *H04W 72/02* (2013.01);
(Continued)

(58) Field of Classification Search
CPC . H04W 72/1263; H04W 52/52; H04W 72/02; H04W 72/0453; H04W 72/1278;
(Continued)

(56) References Cited

U.S. PATENT DOCUMENTS

2016/0073408 A1    3/2016  Sartori et al.
2017/0195163 A1*  7/2017  Chae ................. H04L 67/108
(Continued)

FOREIGN PATENT DOCUMENTS

WO   WO-2020033563 A1 *  2/2020  ........... H04L 5/0053

OTHER PUBLICATIONS

3GPP: "3rd Generation Partnership Project; Technical Specification Group Radio Access Network; Vehicle to Vehicle (V2V) Services based on LTE Sidelink; User Equipment (UE) Radio Transmission and Reception (Release 14)", 3GPP Standard; Technical Report; 3GPP TR 36.785, 3rd Generation Partnership Project (3GPP), Mobile Competence Centre; 650, Route Des Lucioles; F-06921 Sophia-Antipolis Cedex; France, vol. RAN WG4, No. V14.0.0, Oct. 12, 2016, XP051295424, [retrieved on Oct. 12, 2016], pp. 1-57, Paragraph 7.3.

(Continued)

*Primary Examiner* — Yu-Wen Chang
(74) *Attorney, Agent, or Firm* — Holland & Hart LLP/QUALCOMM Incorporated

(57) ABSTRACT

Methods, systems, and devices for wireless communications are described for improving sidelink communication reliability. In some examples, a user equipment (UE) may map allocated sidelink resources from a logical domain to a physical domain, where the mapped resources may include greater frequency diversity in the physical domain. A frequency range of a sidelink control channel or of a sidelink data channel may be greater in the physical domain than in the logical domain after the mapping. In some examples, sidelink communications may be associated with an aggregation factor that represents a number of repetitions of a sidelink communication. In this example, a UE may repeat a sidelink communication within a contention-based resource pool a number of times before receiving feedback (Continued)

in order to increase communication reliability. A first UE may communicate a sidelink communication with a second UE using a resource mapping or repetitions of the sidelink communication.

30 Claims, 20 Drawing Sheets

(51) Int. Cl.
  *H04W 72/02* (2009.01)
  *H04W 72/0453* (2023.01)
  *H04W 72/20* (2023.01)
  *H04W 92/18* (2009.01)

(52) U.S. Cl.
  CPC ....... *H04W 72/0453* (2013.01); *H04W 72/20* (2023.01); *H04W 92/18* (2013.01)

(58) Field of Classification Search
  CPC . H04W 92/18; H04W 72/1242; H04W 88/02; H04W 76/14
  See application file for complete search history.

(56) References Cited

U.S. PATENT DOCUMENTS

| | | | | |
|---|---|---|---|---|
| 2017/0215199 | A1* | 7/2017 | Wu | H04L 5/0012 |
| 2017/0289733 | A1* | 10/2017 | Rajagopal | H04L 67/12 |
| 2018/0368090 | A1* | 12/2018 | Kadambar | H04W 8/005 |
| 2019/0364585 | A1* | 11/2019 | Lee | H04W 4/40 |
| 2020/0252910 | A1* | 8/2020 | Wu | H04W 72/04 |
| 2021/0219292 | A1* | 7/2021 | Wang | H04W 72/0453 |
| 2021/0400632 | A1* | 12/2021 | Yang | H04W 72/20 |
| 2022/0124683 | A1* | 4/2022 | Zhao | H04W 72/0446 |
| 2022/0159674 | A1* | 5/2022 | Deng | H04W 72/044 |
| 2022/0210804 | A1* | 6/2022 | Hwang | H04W 72/20 |
| 2022/0225316 | A1* | 7/2022 | Su | H04W 72/0406 |
| 2022/0304032 | A1* | 9/2022 | Hahn | H04L 5/0044 |

OTHER PUBLICATIONS

"3rd Generation Partnership Project, Technical Specification Group Radio Access Network, V2X Services Based on LTE Sidelink, User Equipment (UE) Radio Transmission and Reception (Release 14)", 3GPP Draft, RP-170127_TR 36.786 V1.0.0, For LTE-Based V2X Services Clean Rev1, 3rd Generation Partnership Project (3GPP), Mobile Competence Centre, 650, Route Des Lucioles, F-06921 Sophia-Anti Polls C, Mar. 18, 2018 (Mar. 18, 2018), 71 Pages, XP051506805, Retrieved from the Internet: URL: https://www.3gpp.org/ftp/tsg_ran/TSG_RAN/TSGR_75/Docs/RP-170127.zip, [retrieved on Mar. 18, 2018], paragraph 4.3.3.2.

Partial International Search Report—PCT/US2021/038046—ISA/EPO—dated Oct. 21, 2021 (205520WO).
Qualcomm Incorporated, et al., "Introduction of ProSe", 3GPP Draft, 36300 CR0681R1 (REL-12) R2-145417, 3GPP TSG-RAN WG2 #88, 3rd Generation Partnership Project (3GPP), Mobile Competence Centre, 650, Route Des Lucioles, F-06921 Sophia-Anti Polls Cedex, France, San Francisco, USA, Nov. 17-21, 2014, Dec. 19, 2014 (Dec. 19, 2014), XP050920553, 38 Pages, Nov. 21, 2014, Retrieved from the Internet: URL:http://www.3gpp.org/ftp/tsg_ran/WG2_RL2/Specifications/201412_draft_specs_after_RAN_66/History/, [retrieved on Dec. 19, 2014], paragraph 5.3, paragraph 5.6, paragraph 6.1.3, paragraph 23.X.3.1.
Huawei, et al., "Sidelink Resource Allocation Mode 2 for NR V2X", 3GPP Draft, 3GPP TSG RAN WG1 Meeting #98, R1-1908042, 33rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), pp. 1-6, XP051764665, 31 Pages, Retrieved from the Internet: URL: http://www.3gpp.org/ftp/tsg_ran/WG1_RL1/TSGR1_98/Docs/R1-1908042.zip [Retrieved on Aug. 17, 2019], paragraph 2 paragraph 2.1 paragraph 2.2.
Huawei, et al., "Sidelink Resource Allocation Mode 2 for NR V2X", 3GPP Draft, 3GPP TSG RAN WG1 Meeting #98bis, R1-1910056, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 8, 2019 (Oct. 8, 2019), XP051809066, 12 Pages, Retrieved from the Internet: URL: https://ftp.3gpp.org/tsg_ran/WG1_RL1/TSGR1_98b/Docs/R1-1910056.zip R1-1910056.docx [Retrieved on Oct. 8, 2019] paragraph 2.1.
Intel Corporation: "Discussion on D2D Broadcast Resource Allocation", 3GPP Draft, 3GPP TSG RAN WG1 Meeting #76, R1-140130, Intel-D2D RA, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Feb. 10, 2014-Feb. 14, 2014, Feb. 9, 2014 (Feb. 9, 2014), XP050735694, 7 Pages, Retrieved from the Internet: URL: http://www.3gpp.org/ftp/Meetings_3GPP_SYNC/RAN/RAN1/Docs/ [Retrieved on Feb. 9, 2014] paragraph 2.
Intel Corporation: "On D2D Discovery Resource Size and Repeated Transmissions", 3GPP Draft, 3GPP TSG RAN WG1 Meeting #78, R1-142854_INTEL_DISCOVERY_REPEATEDTX, 3rd Generation Partnership Project (3GPP), Mobile Competence Centre, 650, Route Des Lucioles, F-06921 Sophia-Antipolis Cedex, France, vol. RAN WG1, No. Dresden, Germany, Aug. 18, 2014-Aug. 22, 2014, Aug. 17, 2014 (Aug. 17, 2014), XP050788339, 8 Pages, Retrieved from the Internet: URL: http://www.3gpp.org/ftp/Meetings_3GPP_SYNC/RAN1/Docs/ [Retrieved on Aug. 17, 2014] paragraph 3.1 paragraph 3.3.
International Search Report and Written Opinion—PCT/US2021/038046—ISA/EPO—Jan. 19, 2022 (205520WO).

* cited by examiner

SIDELINK COMMUNICATION RELIABILITY

CROSS REFERENCE

The present Application for Patent claims the benefit of U.S. Provisional Patent Application No. 63/043,011 by WANG et al., entitled "SIDELINK COMMUNICATION RELIABILITY," filed Jun. 23, 2020, assigned to the assignee hereof, and expressly incorporated by reference herein.

INTRODUCTION

The following relates to wireless communications and more specifically to managing sidelink communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a first UE is described. The method may include receiving a configuration associated with mapping communication resources allocated for a sidelink control channel and a sidelink data channel to corresponding physical communication resources. The method may further include mapping, based on the configuration, first communication resources allocated to the first UE for the sidelink control channel and the sidelink data channel to second communication resources for the sidelink control channel and the sidelink data channel, the first communication resources allocated for the sidelink control channel occupying a first bandwidth and the second communication resources for the sidelink control channel covering a second bandwidth greater than the first bandwidth. The method may also include communicating with a second UE using the second communication resources.

An apparatus for wireless communication at a first UE is described. The apparatus may include a processor and memory coupled to the processor. The processor and memory may be configured to receive a configuration associated with mapping communication resources allocated for a sidelink control channel and a sidelink data channel to corresponding physical communication resources. The processor and memory may further be configured to map, based on the configuration, first communication resources allocated to the first UE for the sidelink control channel and the sidelink data channel to second communication resources for the sidelink control channel and the sidelink data channel, the first communication resources allocated for the sidelink control channel occupying a first bandwidth and the second communication resources for the sidelink control channel covering a second bandwidth greater than the first bandwidth. The processor and memory may also be configured to communicate with a second UE using the second communication resources.

Another apparatus for wireless communication at a first UE is described. The apparatus may include means for receiving a configuration associated with mapping communication resources allocated for a sidelink control channel and a sidelink data channel to corresponding physical communication resources. The apparatus may further include means for mapping, based on the configuration, first communication resources allocated to the first UE for the sidelink control channel and the sidelink data channel to second communication resources for the sidelink control channel and the sidelink data channel, the first communication resources allocated for the sidelink control channel occupying a first bandwidth and the second communication resources for the sidelink control channel covering a second bandwidth greater than the first bandwidth. The apparatus may also include means for communicating with a second UE using the second communication resources.

A non-transitory computer-readable medium storing code for wireless communication at a first UE is described. The code may include instructions executable by a processor to receive a configuration associated with mapping communication resources allocated for a sidelink control channel and a sidelink data channel to corresponding physical communication resources. The code may further include instructions executable by the processor to map, based on the configuration, first communication resources allocated to the first UE for the sidelink control channel and the sidelink data channel to second communication resources for the sidelink control channel and the sidelink data channel, the first communication resources allocated for the sidelink control channel occupying a first bandwidth and the second communication resources for the sidelink control channel covering a second bandwidth greater than the first bandwidth. The code may also include instructions executable by the processor to communicate with a second UE using the second communication resources.

Some examples of the method, apparatuses, and non-transitory computer-readable medium described herein may further include operations, features, means, or instructions for mapping consecutive symbols of a first stage sidelink control information (SCI) to a same first frequency range, at least two subsets of the first stage SCI being separated by a frequency range. The examples of the method, apparatuses, and non-transitory computer-readable medium described herein may further include operations, features, means, or instructions for mapping consecutive symbols of a second stage SCI to a same second frequency range different from and interlaced with the first frequency range.

Some examples of the method, apparatuses, and non-transitory computer-readable medium described herein may further include operations, features, means, or instructions for multiplexing the first stage SCI and the second stage SCI to cover a bandwidth of a sidelink sub-channel.

Some examples of the method, apparatuses, and non-transitory computer-readable medium described herein may further include operations, features, means, or instructions for multiplexing the first stage SCI and the second stage SCI to cover a bandwidth greater than a sidelink sub-channel.

Some examples of the method, apparatuses, and non-transitory computer-readable medium described herein may further include operations, features, means, or instructions for mapping consecutive symbols of a first stage SCI to at least partially different first frequency ranges, and mapping consecutive symbols of a second stage SCI to at least partially different second frequency ranges interlaced with respective first frequency ranges.

Some examples of the method, apparatuses, and non-transitory computer-readable medium described herein may further include operations, features, means, or instructions for multiplexing the first stage SCI and the second stage SCI to cover a bandwidth of a sidelink sub-channel.

Some examples of the method, apparatuses, and non-transitory computer-readable medium described herein may further include operations, features, means, or instructions for multiplexing the first stage SCI and the second stage SCI to cover a bandwidth greater than a sidelink sub-channel.

In some examples of the method, apparatuses, and non-transitory computer-readable medium described herein the second bandwidth includes the second communication resources different form the first communication resources.

Some examples of the method, apparatuses, and non-transitory computer-readable medium described herein may further include operations, features, means, or instructions for receiving signaling from a base station, a broadcast UE, or both, indicating the configuration.

A method for wireless communication at a UE is described. The method may include receiving signaling that indicates a communication resource pool including one or more contention-based communication resources for sidelink communications. The method may further include receiving signaling that indicates a quantity of repetitions associated with the communication resource pool. The method may also include communicating, using contention-based communication resources from the communication resource pool, a repetition of the sidelink communication in each of a number of consecutive time periods associated with the quantity of repetitions, each repetition of the sidelink communication being unassociated with control information used for scheduling.

An apparatus for wireless communication at a UE is described. The apparatus may include a processor and memory coupled to the processor. The processor and memory may be configured to receive signaling that indicates a communication resource pool including one or more contention-based communication resources for sidelink communications. The processor and memory may further be configured to receive signaling that indicates a quantity of repetitions associated with the communication resource pool. The processor and memory may also be configured to communicate, using contention-based communication resources from the communication resource pool, a repetition of the sidelink communication in each of a number of consecutive time periods associated with the quantity of repetitions, each repetition of the sidelink communication being unassociated with control information used for scheduling.

Another apparatus for wireless communication at a UE is described. The apparatus may include means for receiving signaling that indicates a communication resource pool including one or more contention-based communication resources for sidelink communications. The apparatus may further include means for receiving signaling that indicates a quantity of repetitions associated with the communication resource pool. The apparatus may also include means for communicating, using contention-based communication resources from the communication resource pool, a repetition of the sidelink communication in each of a number of consecutive time periods associated with the quantity of repetitions, each repetition of the sidelink communication being unassociated with control information used for scheduling.

A non-transitory computer-readable medium storing code for wireless communication at a UE is described. The code may include instructions executable by a processor to receive signaling that indicates a communication resource pool including one or more contention-based communication resources for sidelink communications. The code may further include instructions executable by the processor to receive signaling that indicates a quantity of repetitions associated with the communication resource pool. The code may also include instructions executable by the processor to communicate, using contention-based communication resources from the communication resource pool, a repetition of the sidelink communication in each of a number of consecutive time periods associated with the quantity of repetitions, each repetition of the sidelink communication being unassociated with control information used for scheduling.

Some examples of the method, apparatuses, and non-transitory computer-readable medium described herein may further include operations, features, means, or instructions for selecting, based on a configuration for transmission priority or for detecting overlapping transmissions, contention-based communication resources from the communication resource pool for communicating the repetitions of the sidelink communication.

Some examples of the method, apparatuses, and non-transitory computer-readable medium described herein may further include operations, features, means, or instructions for communicating consecutive repetitions of the sidelink communication using at least partially different frequency ranges.

Some examples of the method, apparatuses, and non-transitory computer-readable medium described herein may further include operations, features, means, or instructions for identifying a redundancy version identifier (RV-ID) for each of the repetitions of the sidelink communication based on a configured pattern of RV-IDs.

Some examples of the method, apparatuses, and non-transitory computer-readable medium described herein may further include operations, features, means, or instructions for receiving first signaling from a broadcast UE, the first signaling indicating the communication resource pool, the quantity of repetitions, or both.

Some examples of the method, apparatuses, and non-transitory computer-readable medium described herein may further include operations, features, means, or instructions for receiving first signaling from a base station, the first signaling indicating the communication resource pool, the quantity of repetitions, or both.

Some examples of the method, apparatuses, and non-transitory computer-readable medium described herein may further include operations, features, means, or instructions for performing a combining process based on the repetitions of the sidelink communication.

In some examples of the method, apparatuses, and non-transitory computer-readable medium described herein the quantity of repetitions is associated with feedback.

In some examples of the method, apparatuses, and non-transitory computer-readable medium described herein the quantity of repetitions is unassociated with feedback.

A method for wireless communication at a first UE is described. The method may include receiving a configuration associated with mapping communication resources allocated for a sidelink control channel and a sidelink data channel to corresponding physical communication resources, the configuration applicable to a communication resource pool that includes first communication resources allocated to the first UE for the sidelink control channel and the sidelink data channel. The method may further include mapping, based on the configuration, a logical communication resource unit of the first communication resources to a physical communication resource unit of second communication resources for the sidelink control channel and the sidelink data channel, the logical communication resource unit and the physical communication resource unit each including a first quantity of resource elements (REs) and a second quantity of symbols. The method may also include communicating with a second UE using the second communication resources.

An apparatus for wireless communication at a first UE is described. The apparatus may include a processor and memory coupled to the processor. The processor and memory may be configured to receive a configuration associated with mapping communication resources allocated for a sidelink control channel and a sidelink data channel to corresponding physical communication resources, the configuration applicable to a communication resource pool that includes first communication resources allocated to the first UE for the sidelink control channel and the sidelink data channel. The processor and memory may further be configured to map, based on the configuration, a logical communication resource unit of the first communication resources to a physical communication resource unit of second communication resources for the sidelink control channel and the sidelink data channel, the logical communication resource unit and the physical communication resource unit each including a first quantity of REs and a second quantity of symbols. The processor and memory may also be configured to communicate with a second UE using the second communication resources.

Another apparatus for wireless communication at a first UE is described. The apparatus may include means for receiving a configuration associated with mapping communication resources allocated for a sidelink control channel and a sidelink data channel to corresponding physical communication resources, the configuration applicable to a communication resource pool that includes first communication resources allocated to the first UE for the sidelink control channel and the sidelink data channel. The apparatus may further include means for mapping, based on the configuration, a logical communication resource unit of the first communication resources to a physical communication resource unit of second communication resources for the sidelink control channel and the sidelink data channel, the logical communication resource unit and the physical communication resource unit each including a first quantity of REs and a second quantity of symbols. The apparatus may also include means for communicating with a second UE using the second communication resources.

A non-transitory computer-readable medium storing code for wireless communication at a first UE is described. The code may include instructions executable by a processor to receive a configuration associated with mapping communication resources allocated for a sidelink control channel and a sidelink data channel to corresponding physical communication resources, the configuration applicable to a communication resource pool that includes first communication resources allocated to the first UE for the sidelink control channel and the sidelink data channel. The code may further include instructions executable by the processor to map, based on the configuration, a logical communication resource unit of the first communication resources to a physical communication resource unit of second communication resources for the sidelink control channel and the sidelink data channel, the logical communication resource unit and the physical communication resource unit each including a first quantity of REs and a second quantity of symbols. The code may further include instructions executable by the processor to communicate with a second UE using the second communication resources.

In some examples of the method, apparatuses, and non-transitory computer-readable medium described herein the first communication resources allocated for the sidelink control channel occupy a first bandwidth and the second communication resources for the sidelink control channel cover a second bandwidth greater than the first bandwidth.

In some examples of the method, apparatuses, and non-transitory computer-readable medium described herein the first quantity of REs and the second quantity of symbols are based on a type of communication, the type of communication including control information or data, or both.

In some examples of the method, apparatuses, and non-transitory computer-readable medium described herein the first quantity of REs and the second quantity of symbols are on the communication resource pool or a type of traffic of the communication resource pool, or both.

Some examples of the method, apparatuses, and non-transitory computer-readable medium described herein may further include operations, features, means, or instructions for mapping an automatic gain control (AGC) communication to a range of frequencies covered in a first symbol of the second communication resources.

Some examples of the method, apparatuses, and non-transitory computer-readable medium described herein may further include operations, features, means, or instructions for mapping an AGC communication to a range of frequencies covered in all of the symbols of the second communication resources.

Some examples of the method, apparatuses, and non-transitory computer-readable medium described herein may further include operations, features, means, or instructions for receiving signaling from a base station, a broadcast UE, or both, indicating the configuration.

A method for wireless communication at a first UE is described. The method may include receiving a configuration associated with mapping communication resources allocated for a sidelink control channel and a sidelink data channel to corresponding physical communication resources, the configuration for a communication resource pool that includes first communication resources allocated to the first UE for the sidelink control channel and the sidelink data channel. The method may further include mapping, based on the configuration, indexes of a set of multiple logical communication resource units of the first communication resources to a indexes of a set of multiple physical communication resource units of second communication resources for the sidelink control channel and the sidelink data channel, the set of multiple logical communication resource units and the set of multiple physical communication resource units each including a first quantity of REs and a second quantity of symbols. The method may further include communicating with a second UE using the second communication resources.

An apparatus for wireless communication at a first UE is described. The apparatus may include a processor and memory coupled to the processor. The processor and memory may be configured to receive a configuration associated with mapping communication resources allocated for a sidelink control channel and a sidelink data channel to corresponding physical communication resources, the configuration for a communication resource pool that includes first communication resources allocated to the first UE for the sidelink control channel and the sidelink data channel. The processor and memory may further be configured to map, based on the configuration, indexes of a set of multiple logical communication resource units of the first communication resources to a indexes of a set of multiple physical communication resource units of second communication resources for the sidelink control channel and the sidelink data channel, the set of multiple logical communication resource units and the set of multiple physical communication resource units each including a first quantity of REs and a second quantity of symbols. The processor and memory may also be configured to communicate with a second UE using the second communication resources.

Another apparatus for wireless communication at a first UE is described. The apparatus may include means for receiving a configuration associated with mapping communication resources allocated for a sidelink control channel and a sidelink data channel to corresponding physical communication resources, the configuration for a communication resource pool that includes first communication resources allocated to the first UE for the sidelink control channel and the sidelink data channel. The apparatus may further include means for mapping, based on the configuration, indexes of a set of multiple logical communication resource units of the first communication resources to a indexes of a set of multiple physical communication resource units of second communication resources for the sidelink control channel and the sidelink data channel, the set of multiple logical communication resource units and the set of multiple physical communication resource units each including a first quantity of REs and a second quantity of symbols. The apparatus may further include means for communicating with a second UE using the second communication resources.

A non-transitory computer-readable medium storing code for wireless communication at a first UE is described. The code may include instructions executable by a processor to receive a configuration associated with mapping communication resources allocated for a sidelink control channel and a sidelink data channel to corresponding physical communication resources, the configuration for a communication resource pool that includes first communication resources allocated to the first UE for the sidelink control channel and the sidelink data channel. The code may further include instructions executable by the processor to map, based on the configuration, indexes of a set of multiple logical communication resource units of the first communication resources to a indexes of a set of multiple physical communication resource units of second communication resources for the sidelink control channel and the sidelink data channel, the set of multiple logical communication resource units and the set of multiple physical communication resource units each including a first quantity of REs and a second quantity of symbols. The code may also include instructions executable by the processor to communicate with a second UE using the second communication resources.

In some examples of the method, apparatuses, and non-transitory computer-readable medium described herein the first communication resources allocated for the sidelink control channel occupy a first bandwidth and the second communication resources for the sidelink control channel cover a second bandwidth greater than the first bandwidth.

Some examples of the method, apparatuses, and non-transitory computer-readable medium described herein may further include operations, features, means, or instructions for mapping consecutive even indexes of a set of multiple logical communication resource units to consecutive indexes of a first subset of a set of multiple physical communication resource units. The examples of the method, apparatuses, and non-transitory computer-readable medium described herein may further include operations, features, means, or instructions for mapping consecutive odd indexes of the set of multiple logical communication resource units to consecutive indexes of a second subset of the set of multiple physical communication resource units.

In some examples of the method, apparatuses, and non-transitory computer-readable medium described herein, indexes of the set of multiple physical communication resource units that may be associated with consecutive indexes of the set of multiple logical communication resource units may be separated by an index offset.

Some examples of the method, apparatuses, and non-transitory computer-readable medium described herein may further include operations, features, means, or instructions for receiving signaling from a base station, a broadcast UE, or both, indicating the configuration.

A method of wireless communication at a first UE is described. The method may include receiving a configuration associated with mapping communication resources allocated for a sidelink control channel and a sidelink data channel to corresponding physical communication resources. The method may include identifying first communication resources allocated to the first UE for the sidelink control channel and the sidelink data channel, the first communication resources allocated for the sidelink control channel occupying a first bandwidth. The method may also include mapping, based on the configuration, the first communication resources to second communication resources for the sidelink control channel and the sidelink data channel, the second communication resources for the sidelink control channel covering a second bandwidth greater than the first bandwidth. The method may also include communicating with a second UE using the second communication resources.

An apparatus for wireless communication at a first UE is described. The apparatus may include a processor and memory coupled to the processor. The processor and memory may be configured to receive a configuration associated with mapping communication resources allocated for a sidelink control channel and a sidelink data channel to corresponding physical communication resources. The processor and memory may be configured to identify first communication resources allocated to the first UE for the sidelink control channel and the sidelink data channel, the first communication resources allocated for the sidelink control channel occupying a first bandwidth. The processor and memory may be also be configured to map, based on the configuration, the first communication resources to second communication resources for the sidelink control channel and the sidelink data channel, the second communication resources for the sidelink control channel covering a second bandwidth greater than the first bandwidth. The processor and memory may also be configured to communicate with a second UE using the second communication resources.

Another apparatus for wireless communication at a first UE is described. The apparatus may include means for receiving a configuration associated with mapping communication resources allocated for a sidelink control channel and a sidelink data channel to corresponding physical communication resources. The apparatus may include means for identifying first communication resources allocated to the first UE for the sidelink control channel and the sidelink data channel, the first communication resources allocated for the sidelink control channel occupying a first bandwidth. The apparatus may also include means for mapping, based on the configuration, the first communication resources to second communication resources for the sidelink control channel and the sidelink data channel, the second communication resources for the sidelink control channel covering a second bandwidth greater than the first bandwidth. The apparatus may also include means for communicating with a second UE using the second communication resources.

A non-transitory computer-readable medium storing code for wireless communication at a first UE is described. The code may include instructions executable by a processor to receive a configuration associated with mapping communication resources allocated for a sidelink control channel and a sidelink data channel to corresponding physical communication resources. The code may include instructions executable by the processor to identify first communication resources allocated to the first UE for the sidelink control channel and the sidelink data channel, the first communication resources allocated for the sidelink control channel occupying a first bandwidth. The code may also include instructions executable by the processor to map, based on the configuration, the first communication resources to second communication resources for the sidelink control channel and the sidelink data channel, the second communication resources for the sidelink control channel covering a second bandwidth greater than the first bandwidth. The code may also include instructions executable by the processor to communicate with a second UE using the second communication resources.

In some examples of the method, apparatuses, and non-transitory computer-readable medium described herein, the second bandwidth includes communication resources for one or more UEs different from the first UE.

Some examples of the method, apparatuses, and non-transitory computer-readable medium described herein may further include operations, features, means, or instructions for mapping consecutive symbols of a first stage SCI to at least partially different first frequency ranges, and mapping consecutive symbols of a second stage SCI to at least partially different second frequency ranges interlaced with respective first frequency ranges.

Some examples of the method, apparatuses, and non-transitory computer-readable medium described herein may further include operations, features, means, or instructions for multiplexing the first stage SCI and the second stage SCI to cover a bandwidth of a sidelink sub-channel.

Some examples of the method, apparatuses, and non-transitory computer-readable medium described herein may further include operations, features, means, or instructions for multiplexing the first stage SCI and the second stage SCI to cover a bandwidth greater than a sidelink sub-channel.

Some examples of the method, apparatuses, and non-transitory computer-readable medium described herein may further include operations, features, means, or instructions for mapping consecutive symbols of a first stage SCI to a same first frequency range, where at least two subsets of the first stage SCI may be separated by a frequency range, and mapping consecutive symbols of a second stage SCI to a same second frequency range different from and interlaced with the first frequency range.

Some examples of the method, apparatuses, and non-transitory computer-readable medium described herein may further include operations, features, means, or instructions for multiplexing the first stage SCI and the second stage SCI to cover a bandwidth of a sidelink sub-channel.

Some examples of the method, apparatuses, and non-transitory computer-readable medium described herein may further include operations, features, means, or instructions for multiplexing the first stage SCI and the second stage SCI to cover a bandwidth greater than a sidelink sub-channel.

Some examples of the method, apparatuses, and non-transitory computer-readable medium described herein may further include operations, features, means, or instructions for mapping a logical communication resource unit of the first communication resources to a physical communication resource unit of the second communication resources based on a mapping for a communication resource pool that includes the first communication resources, where the logical communication resource unit and the physical communication resource unit each include a first quantity of REs and a second quantity of symbols.

In some examples of the method, apparatuses, and non-transitory computer-readable medium described herein, the first quantity of REs and the second quantity of symbols may be based on a type of communication, where the type of communication includes control information or data or both.

In some examples of the method, apparatuses, and non-transitory computer-readable medium described herein, the first quantity of REs and the second quantity of symbols may be based on the communication resource pool or a type of traffic of the communication resource pool or both.

Some examples of the method, apparatuses, and non-transitory computer-readable medium described herein may further include operations, features, means, or instructions for mapping an AGC communication to a range of frequencies covered in a first symbol of the second communication resources.

Some examples of the method, apparatuses, and non-transitory computer-readable medium described herein may further include operations, features, means, or instructions for mapping an AGC communication to a range of frequencies covered in all of the symbols of the second communication resources.

Some examples of the method, apparatuses, and non-transitory computer-readable medium described herein may further include operations, features, means, or instructions for mapping consecutive even indexes of a set of logical communication resource units to consecutive indexes of a first subset of a set of physical communication resource units, and mapping consecutive odd indexes of the set of logical communication resource units to consecutive indexes of a second subset of the set of physical communication resource units.

Some examples of the method, apparatuses, and non-transitory computer-readable medium described herein may further include operations, features, means, or instructions for mapping indexes of a set of logical communication resource units to respective indexes of a set of physical communication resource units, where indexes of the set of physical communication resource units that may be associated with consecutive indexes of the set of logical communication resource units may be separated by an index offset.

A method of wireless communication at a UE is described. The method may include identifying a quantity of repetitions associated with a sidelink communication and identifying a communication resource pool including one or more contention-based communication resources for sidelink communications. The method may also include communicating, using contention-based communication resources from the communication resource pool, a repetition of the sidelink communication in each of a number of consecutive time periods associated with the quantity of repetitions, where each repetition of the sidelink communication is unassociated with control information used for scheduling.

An apparatus for wireless communication at a UE is described. The apparatus may include a processor and memory coupled to the processor. The memory and processor may be configured to identify a quantity of repetitions associated with a sidelink communication and identify a communication resource pool including one or more contention-based communication resources for sidelink communications. The memory and processor may also be configured to communicate, using contention-based communication resources from the communication resource pool, a repetition of the sidelink communication in each of a number of consecutive time periods associated with the quantity of repetitions, where each repetition of the sidelink communication is unassociated with control information used for scheduling.

Another apparatus for wireless communication at a UE is described. The apparatus may include means for identifying a quantity of repetitions associated with a sidelink communication and identifying a communication resource pool including one or more contention-based communication resources for sidelink communications. The apparatus may also include means for communicating, using contention-based communication resources from the communication resource pool, a repetition of the sidelink communication in each of a number of consecutive time periods associated with the quantity of repetitions, where each repetition of the sidelink communication is unassociated with control information used for scheduling.

A non-transitory computer-readable medium storing code for wireless communication at a UE is described. The code may include instructions executable by a processor to identify a quantity of repetitions associated with a sidelink communication and identify a communication resource pool including one or more contention-based communication resources for sidelink communications. The code may also include instructions executable by the processor to communicate, using contention-based communication resources from the communication resource pool, a repetition of the sidelink communication in each of a number of consecutive time periods associated with the quantity of repetitions, where each repetition of the sidelink communication is unassociated with control information used for scheduling.

Some examples of the method, apparatuses, and non-transitory computer-readable medium described herein may further include operations, features, means, or instructions for selecting, based on a configuration for transmission priority or for detecting overlapping transmissions, contention-based communication resources from the communication resource pool for communicating the repetitions of the sidelink communication.

Some examples of the method, apparatuses, and non-transitory computer-readable medium described herein may further include operations, features, means, or instructions for communicating consecutive repetitions of the sidelink communication using at least partially different frequency ranges.

Some examples of the method, apparatuses, and non-transitory computer-readable medium described herein may further include operations, features, means, or instructions for identifying a RV-ID for each of the repetitions of the sidelink communication based on a configured pattern of RV-IDs.

Some examples of the method, apparatuses, and non-transitory computer-readable medium described herein may further include operations, features, means, or instructions for performing a combining process based on the repetitions of the sidelink communication.

Some examples of the method, apparatuses, and non-transitory computer-readable medium described herein may further include operations, features, means, or instructions for communicating configuration signaling that indicates the quantity of repetitions.

Some examples of the method, apparatuses, and non-transitory computer-readable medium described herein may further include operations, features, means, or instructions for receiving configuration signaling that indicates the communication resource pool.

In some examples of the method, apparatuses, and non-transitory computer-readable medium described herein, the quantity of repetitions may be configured for a feedback instance.

DETAILED DESCRIPTION

Figure 1:
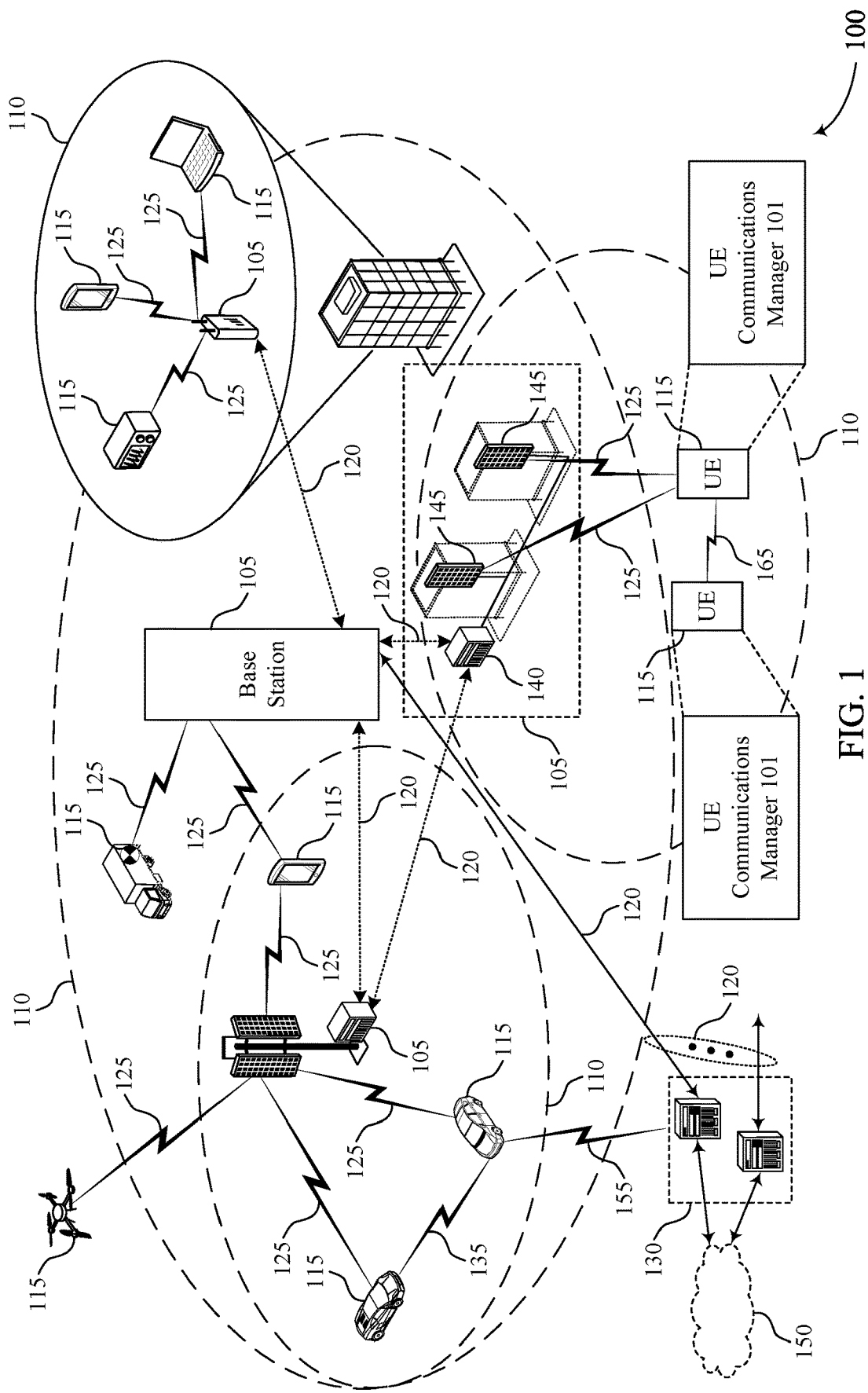
FIG. 1 illustrates an example of a wireless communications system that supports sidelink communication reliability in accordance with one or more aspects of the present disclosure.

Some UEs may be configured for sidelink communications with other UEs, for example, via one or more sidelink channels (e.g., data or control channels) or sidelink sub-channels, where a sidelink sub-channel may represent a portion of frequency ranges of a sidelink channel over which a UE may communicate. In some examples described herein, a first UE may transmit a sidelink packet (e.g., a sidelink transmission or communication) to a second UE via sidelink communication resources, which may include time and frequency resources of a sidelink channel or sub-channel. In some sidelink communications systems, resource allocation for a sidelink packet may include contiguous frequency domain resources. As described herein, contiguous frequency domain resources may represent one or more frequency ranges that are immediately next to each other in frequency. In some examples, contiguous resource allocation in the frequency domain may result in higher interference (e.g., as generated by one or more signal reflections over a frequency range within the frequency domain, such as signal reflections caused by signaling within a similar frequency range from one or more machines within an enclosed space such as a factory).

The present disclosure provides techniques for increasing sidelink communication reliability, for example, by reducing interference or frequency notches (e.g., missed transmissions at one or more frequencies) resulting from contiguous resource allocation. In a first example, a UE (e.g., the first or second UE) may map sidelink resources allocated for a sidelink packet from a logical domain (e.g., virtual domain, based on indices or other identifiers of the resources) to a physical domain (e.g., time and frequency resources), where the mapped resources may include greater frequency diversity (e.g., a larger range of frequency resources, frequency resources that are farther apart in the physical frequency domain). For example, resources may be allocated to the first and second UEs in a logical domain (e.g., allocated by a base station, another UE, or the first or second UE), and one or both UEs may map the allocated resources to a physical domain. In one example, a frequency range of a sidelink control channel or of a sidelink data channel may be greater in the physical domain than in the logical domain after the mapping (e.g., to increase frequency diversity). In another example, sidelink communications may be associated with an aggregation factor that represents a number of repetitions of a sidelink packet. In this example, the first UE may repeat the sidelink packet within a contention-based resource pool (e.g., a pool of sidelink communication resources that are selected by UEs for communications, on a contention basis) a number of times before receiving feedback in order to increase communication reliability.

Based on one or more of the techniques described herein, the first UE may communicate the sidelink communication to the second UE (e.g., using a resource mapping and/or one or more repetitions of the sidelink communication). The techniques described herein may increase communication reliability and thereby increase the likelihood of successful reception of the sidelink packet at the second UE. For example, mapping sidelink frequency resources such that the sidelink resources have greater frequency diversity may increase communication reliability by decreasing an amount of frequency-specific interference (e.g., interference that affects one range of frequencies but not another). Similarly, performing one or more repetitions of a sidelink communication may increase communication reliability by increasing a total amount of received information from the one or more repetitions (e.g., as received via the one or more repetitions) that may be processed by a receiving UE.

Aspects of the disclosure are initially described in the context of wireless communications systems. Aspects of the disclosure are further illustrated by and described with reference to resource mapping schemes, a communication repetition scheme, a process flow, apparatus diagrams, system diagrams, and flowcharts that relate to sidelink communication reliability.

FIG. 1 illustrates an example of a wireless communications system 100 that supports sidelink communication reliability in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In some implementations, the UEs 115 may be or include disaggregated UEs 115 in which one or more of the various functions and communication layers of the UE 115 may be split between multiple physical devices for communication between UEs 115 and base stations 105. In such cases, the disaggregated UE 115 may include the respective physical devices configured to perform various functions and communications, for example to perform one or more of the signaling and power control techniques for RF sensing procedures described herein.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). In some cases, a communication link 135 may be referred to as a sidelink communication link 165 and may be used for sidelink communications between UEs 115. In some cases, a sidelink communication link 165 may be used to relay information (e.g., data, control information) from a first UE 115 to a second UE 115.

One or more UEs 115 utilizing D2D or sidelink communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D or sidelink communications may utilize a one-to-many (1:M) system in which each UE 115 transmits to every other UE 115 in the group. In some examples, a base station 105 facilitates the scheduling of resources for D2D or sidelink communications. In other cases, D2D or sidelink communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. For example, vehicles, or other examples of UEs 115 (e.g., industrial or other devices), may communicate using cellular V2X (C-V2X) communications. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service. A UE 115 may communicate with the core network 130 through communication link 155.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

One or more of the operations performed by a UE 115 may be performed by a UE communications manager 101, which may be an example of a communications manager 815, 920, 1020, or 1110 as described with reference to FIGS. 8 through 11. In some cases, a transceiver may perform the receiving or transmitting operations and a processor may identify one or more aspects of mapping or repetition configuration and configure one or more sidelink communications according to the mapping or repetition configuration.

Figure 2:
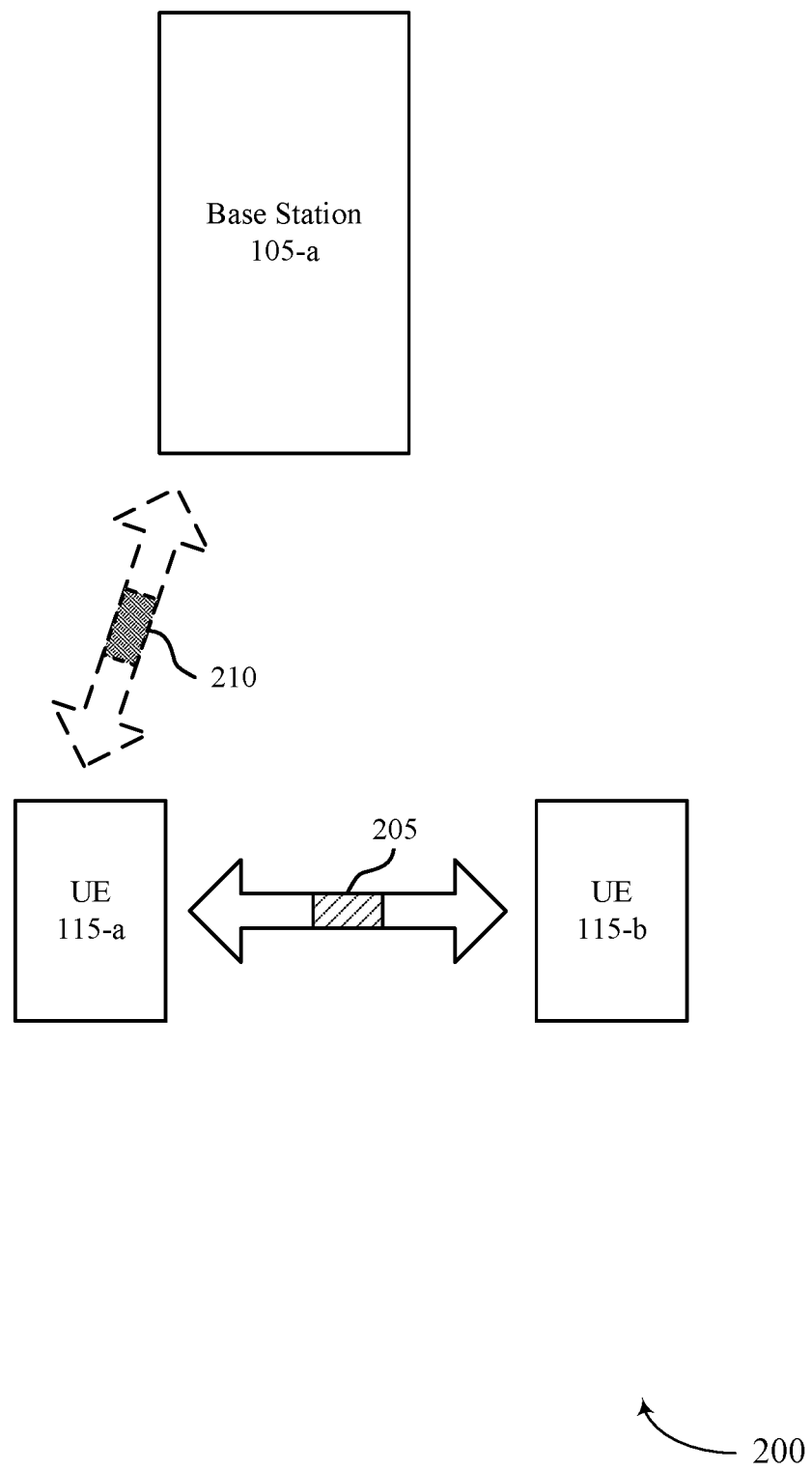
FIG. 2 illustrates an example of a wireless communications system that supports sidelink communication reliability in accordance with one or more aspects of the present disclosure.

FIG. 2 illustrates an example of a wireless communications system 200 that supports sidelink communication reliability in accordance with one or more aspects of the present disclosure. In some examples, wireless communications system 200 may implement aspects of wireless communications system 100. For example, wireless communications system may include a base station 105-a and UEs 115-a and 115-b, which may be examples of a base station 105 and UEs 115 described with reference to FIG. 1. UEs 115-a and 115-b may each represent examples of a UE 115 configured for sidelink communications, for example, with other UEs 115 and via one or more sidelink channels or sub-channels. In some examples described herein, UE 115-a may transmit a sidelink packet 205 (e.g., a sidelink transmission or communication) to UE 115-b (e.g., UE 115-b may receive the sidelink packet 205).

UE 115-b may receive the sidelink packet 205 by performing a blind decoding of a number of sidelink channels or sub-channels (e.g., blind decoding all configured sidelink channels or sub-channels, such that the UE 115 may decode all sidelink transmissions). For example, 1 to 27 sidelink sub-channels may be configured for sidelink communications within wireless communications system 200, such that blind decoding of all the sub-channels may be performed within a time limit for receiving a sidelink communication. A sidelink sub-channel may occupy a number of frequency resource blocks (RBs); for example, ten or more RBs (e.g., 10, 15, 20, 25, 50, 75, or 100 RBs). A sidelink packet 205 may include one or more sidelink sub-channels and one or more TTIs (e.g., one or more slots), where a sidelink control channel (e.g., PSCCH) and a sidelink data channel (e.g., PSSCH) may be transmitted within a same TTI (e.g., same slot). A sidelink packet 205 may also include a gap between a data and/or control channel block and a feedback instance (e.g., physical sidelink feedback channel (PSFCH)) associated with the sidelink packet 205.

A sidelink data channel may occupy a number of contiguous sub-channels (e.g., $N_{subchannel}^{SL}$) and a sidelink control channel may occupy up to one sub-channel with a lowest sub-channel index, for example, within a sidelink bandwidth. A sidelink control channel may carry one or more portions (e.g., stages) of an SCI. For example, the sidelink control channel may carry a first stage SCI that includes information about a bandwidth of the corresponding sidelink data channel and about sidelink resource reservation for future TTIs. In some cases, the sidelink data channel may carry a second stage SCI that may be decoded by UE 115-b after decoding the sidelink control channel and may include a source identifier (ID) and a destination ID, which may indicate a source UE 115 (e.g., UE 115-a) and an intended destination UE 115 (e.g., UE 115-b) for the sidelink packet 205.

A sidelink control channel may be configured to occupy a number of physical RBs (PRBs) within a sub-channel (e.g., 10, 12, 15, 20, or 25 PRBs) and may be configured to include two or three symbols. In some cases, up to two future resources may be reserved by SCI for retransmission of a sidelink packet 205, where the retransmissions and the original sidelink packet 205 may include a same frequency allocation size or length. Resources for the sidelink packet 205 and any retransmissions thereof may be allocated by a base station 105 (e.g., base station 105-a) via downlink control information (DCI) (e.g., Mode 1 communications) or may be allocated autonomously (e.g., Mode 2 communications) by a transmitting or receiving UE 115 (e.g., UE 115-a or UE 115-b). In the cases where the resources for the sidelink packet are allocated autonomously, UEs 115-a and 115-b may communicate without communicating with base station 105-a, as indicated in FIG. 2 by the dashed line for a downlink transmission 210 from base station 105-a. In some cases, a behavior of UE 115-b (e.g., a receiving UE 115) may be the same in either mode (e.g., the resource allocation process may be transparent to the receiving UE 115).

Mode 1 communications may support dynamic sidelink grants or various types of configured sidelink grants (e.g., a configured grant type 1 or type 2). A dynamic grant may be transmitted via DCI (e.g., DCI type 30) from base station 105-a (e.g., via a downlink transmission 210) and may indicate allocated time and frequency resources, as well as transmission timing, for a sidelink packet 205. A configured grant (e.g., type 1) may be activated via radio resource control (RRC) signaling from base station 105-a (e.g., via a downlink transmission 210). A modulation coding scheme (MCS) for mode 1 communications may be set by UE 115-a (e.g., the transmitting UE 115) and may be within a limit set or configured by base station 105-a. The DCI or RRC signaling may represent examples of signaling over a base station to UE interface (e.g., Uu interface).

One or more resources for Mode 2 communications may be allocated by UE 115-a based on a channel sensing procedure. For example, UE 115-a (e.g., a transmitter or a receiver of UE 115-a) may perform channel sensing by blindly decoding all control channels in order to determine which sidelink resources are reserved for other sidelink transmissions. The transmitter or receiver of UE 115-a may report available sidelink resources to an upper layer, and the upper layer may determine which resources to allocate for the sidelink packet 205. The sidelink packet 205 may represent an example of signaling over a UE to UE interface (e.g., PC5 interface).

The wireless communications system 200 may be an example of an industrial Internet-of-Things (IIoT) system, however, the techniques described herein may be applicable to any sidelink or message based reservation system. For example, an IIoT system may use sidelink communication protocols (e.g., C-V2X communication protocols) for communications. An IIoT system may include sensors that may transmit sensed data to servers or similar network equipment. The network equipment may perform calculations based on the sensed data and may send a command or similar message to an actuator to perform an action in response to the sensed data. In some examples, IIoT systems may be configured to communicate a sidelink packet 205 within a time window (e.g., 1 to 2 ms, or less), for example, between a sensor sensing a changing parameter and a command message arriving at an actuator based on the sensed data. Some IIoT systems may further be configured to communicate a sidelink packet 205 with a configured error rate (e.g., a 10-6 error rate). A control channel for IIoT communications may therefore be configured to meet conditions imposed by the transmission time window and the error rate.

In an example IIoT communication process, a sensor may sense a changing parameter, compile the data using an embedded computer, and transmit the data to a receiver at a programmable logic controller (PLC) (e.g., control or steering server). A transmitter of the PLC may transmit the data to a receiver of an actuator on a wireless device, and the embedded computer of the actuator may analyze the data and make an adjustment based on the changing parameter the sensor detected. In such an example, the user interface may have a latency of 0.3 ms and the radio interface may have a latency of 0.2 ms. A wireless PLC may support flexible and simplified deployment, for example, based on an ability to communicate wirelessly with one or more sensors and one or more actuators. For example, a PLC may communicate with (e.g., control) 20 to 50 sensor/actuator pairs. In some cases, performing such communications via base station 105-*a* may result in multiple over the air (OTA) transmissions, which may increase latency and reduce reliability. As such, IIoT systems may employ sidelink communications.

Some IIoT communication traffic may be deterministic and may include smaller sidelink packets 205 (e.g., having a size of 32 to 256 bytes). Smaller sidelink packets 205 may support a smaller transmission bandwidth for IIoT traffic (e.g., 2 RBs), where an overall bandwidth for IIoT may be large and may include dedicated frequency bands and/or unlicensed frequency bands. Some sensor or actuators may have limited capabilities, for example, with respect to transmission bandwidth or processing power, and as such, a sensor or actuator may not be configured to detect or monitor all sidelink communications (e.g., perform blind decoding of all sidelink communications).

In some sidelink communications systems for IIoT, resource allocation for a sidelink packet 205 may be restricted to contiguous frequency domain resources. However, contiguous frequency resource allocation may limit a range of frequencies used for some sidelink packets 205, which may limit or reduce frequency diversity. In some IIoT environments, the reduced frequency diversity may result in unreliable sidelink transmissions. For example, narrow-band interference generated by neighboring machinery, or a frequency notch (e.g., missed transmissions) generated by signal reflections, may cause degraded communication quality over one or more frequency ranges. Accordingly, some IIoT sidelink communications (e.g., control and/or data channels) may experience reduced transmission reliability, which may result in latency or other errors for sidelink communications (e.g., a sidelink packet 205).

The present disclosure provides techniques for improving sidelink communication reliability. In a first example, a UE 115 (e.g., UEs 115-*a* and 115-*b*) may map allocated sidelink resources from a logical domain (e.g., virtual domain) to a physical domain, where the mapped resources may include greater frequency diversity. For example, resources may be allocated (e.g., autonomously or by base station 105-*a*) to UEs 115-*a* and 115-*b* in a logical domain, and one or both of UE 115-*a* and 115-*b* may map the allocated resources to a physical domain, where a frequency range of a sidelink control channel or of a sidelink data channel may be greater in the physical domain than in the logical domain (e.g., to increase frequency diversity). In a second example (e.g., additionally or alternatively), IIoT or other sidelink communications may be associated with an aggregation factor that represents a number of blind repetitions (e.g., repetitions transmitted without first receiving feedback) of a sidelink packet 205 associated with a feedback process (e.g., HARQ feedback). For example, UE 115-*a* may repeat the sidelink packet 205 within a contention-based resource pool a number of times before receiving feedback, in order to increase communication reliability.

In the first example, a UE 115 (e.g., UE 115-*a* or 115-*b*) may select or be allocated sidelink resources in a logical or virtual domain and may map the resources to a physical domain. For example, the UE 115 may use a multiplexing pattern to map logical resources associated with a first and second stage SCI that are contiguous in frequency to cover a greater frequency range for at least the first stage SCI. In another example, the UE 115 may map logical allocated resources to physical resources using one or more mappings for a logical resource pool, where the one or more mappings are based on resource units that each include a same number of symbols and a same number of resource elements. For example, the UE 115 may map virtual allocated resources to physical resources using resource mapping patterns based on define indexes of the resource units (e.g., where a resource unit may represent one or more RBs). The mapping pattern, any information regarding associated resource pools, and any associated parameters may be configured for the UE 115 via configuration signaling (e.g., RRC signaling) by base station 105-*a* (e.g., via a downlink transmission 210) or by another UE 115 (e.g., UE 115-*a* or 115-*b*).

In the second example, UEs 115-*a* and 115-*b* may be configured with one or more aggregation factors for blind repetitions of sidelink packets 205. For example, base station 105-*a* or another UE 115 (e.g., UE 115-*a* or 115-*b*) may configure one or both of UE 115-*a* and 115-*b* with an aggregation factor and with associated parameters (e.g., via a downlink transmission 210 or another transmission). Similarly, base station 105-*a* or another UE 115 (e.g., UE 115-*a* or 115-*b*) may configure one or both of UE 115-*a* and 115-*b* with a contention-based resource pool for communicating repetitions of the sidelink packet 205 (e.g., via a downlink transmission 210 or another transmission).

Based on one or more of the techniques described herein, UE 115-*a* may communicate the sidelink packet 205 to UE 115-*b* (e.g., using a resource mapping and/or blind repetitions of the sidelink packet 205). The techniques described herein may increase communication reliability and thereby increase the likelihood of successful reception of the sidelink packet 205 at UE 115-*b*.

FIGS. 3A, 3B, 3C, and 3D illustrate respective examples of resource mapping schemes 301, 302, 303, and 304 that support sidelink communication reliability in accordance with one or more aspects of the present disclosure. In some examples, resource mapping schemes 301, 302, 303, and 304 may implement aspects of wireless communications system 100 or 200. For example, one or more of resource mapping schemes 301, 302, 303, or 304 may be implemented by a UE 115 or aspects of a UE 115, which may represent an example of a UE 115 described with reference to FIGS. 1 and 2. As described with reference to FIG. 2, one or more of resource mapping schemes 301, 302, 303, or 304 may be implemented by the UE 115 to map sidelink communication resources allocated in a logical or virtual domain to physical sidelink communication resources (e.g., to improve frequency diversity of a sidelink control channel, a sidelink data channel, or both).

Figure 3A:
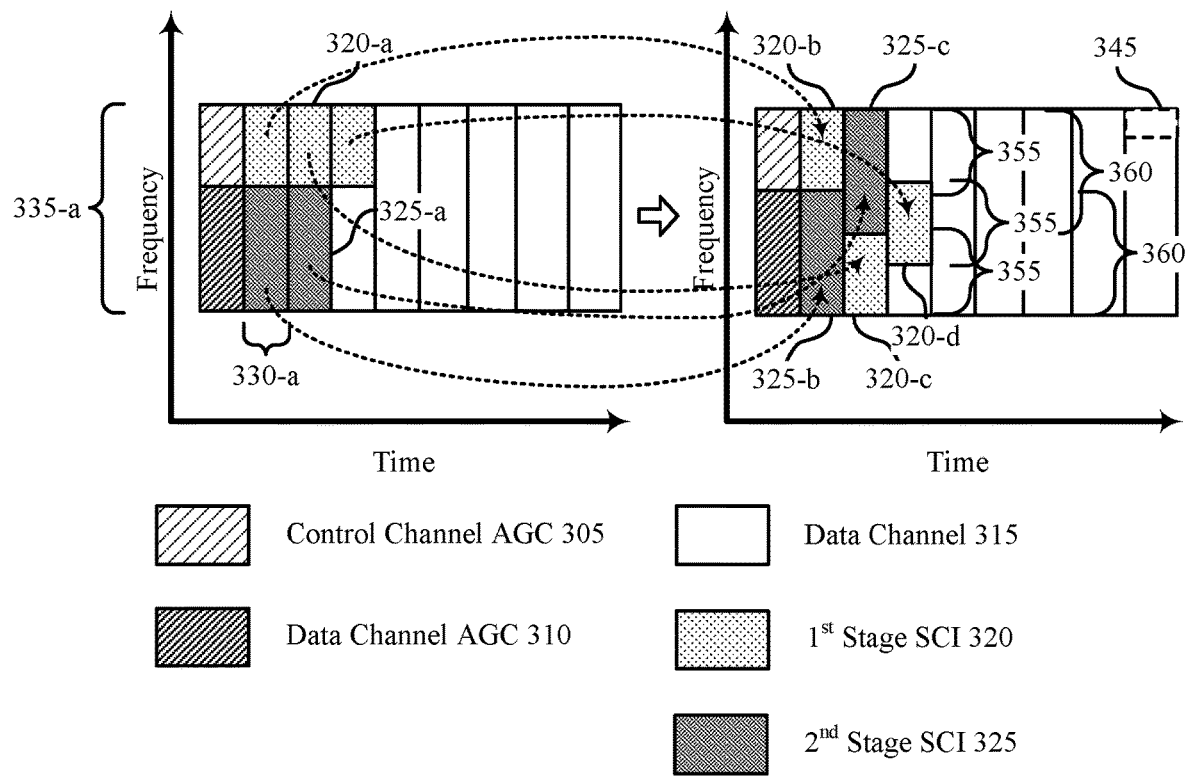
FIGS. 3A through 3D illustrate respective examples of resource mapping schemes that support sidelink communication reliability in accordance with one or more aspects of the present disclosure.
Figure 3B:
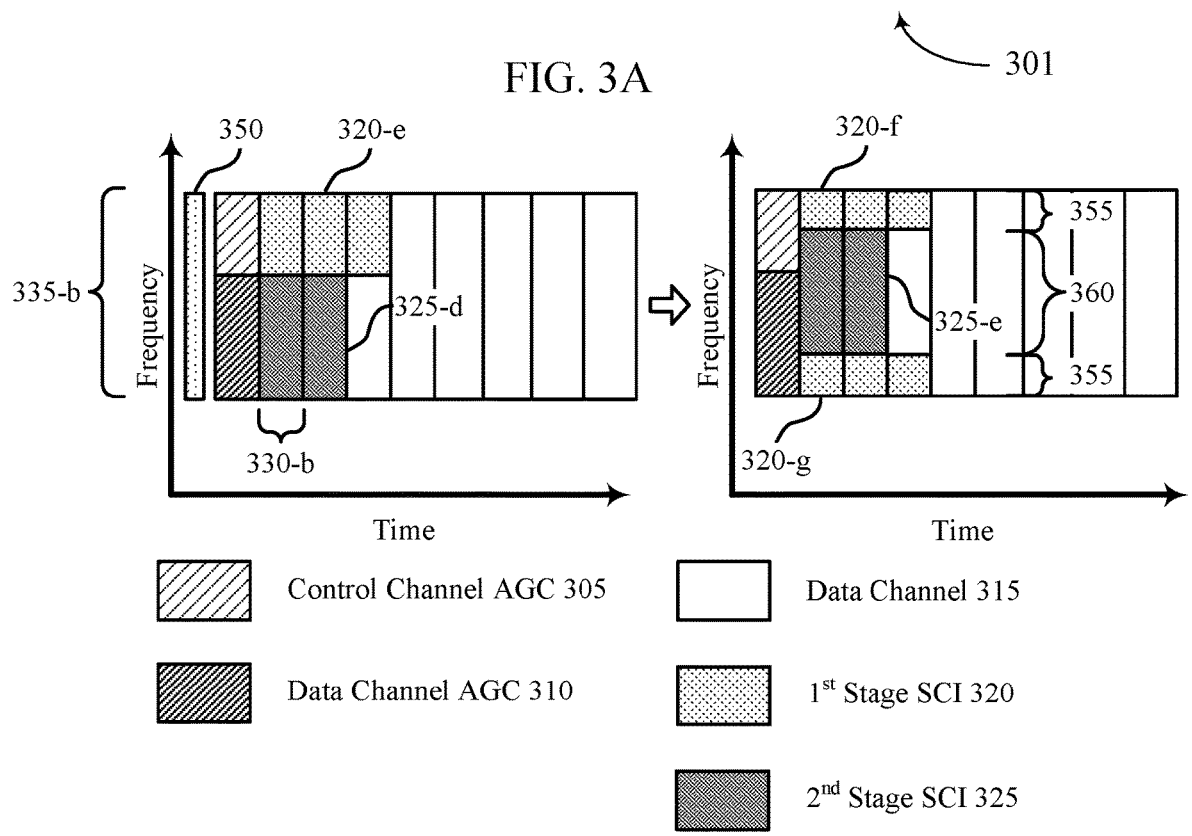
Figure 3C:
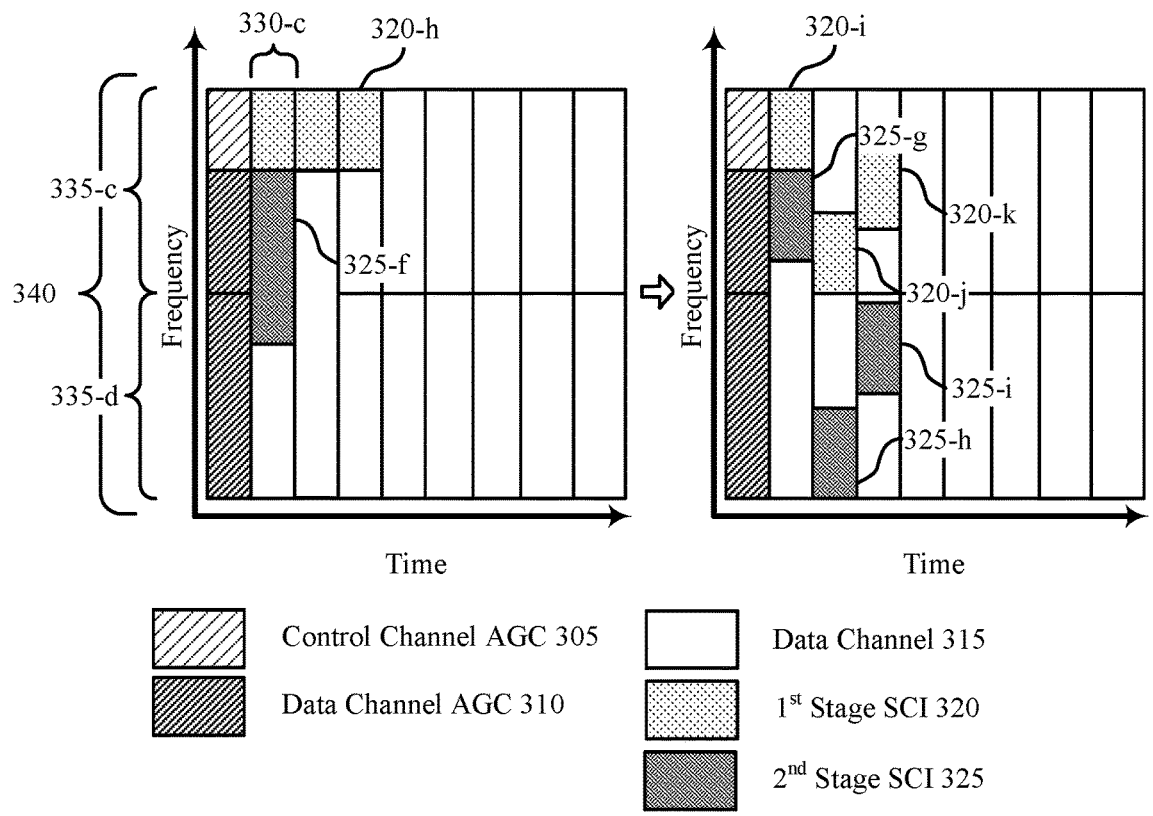
Figure 3D:
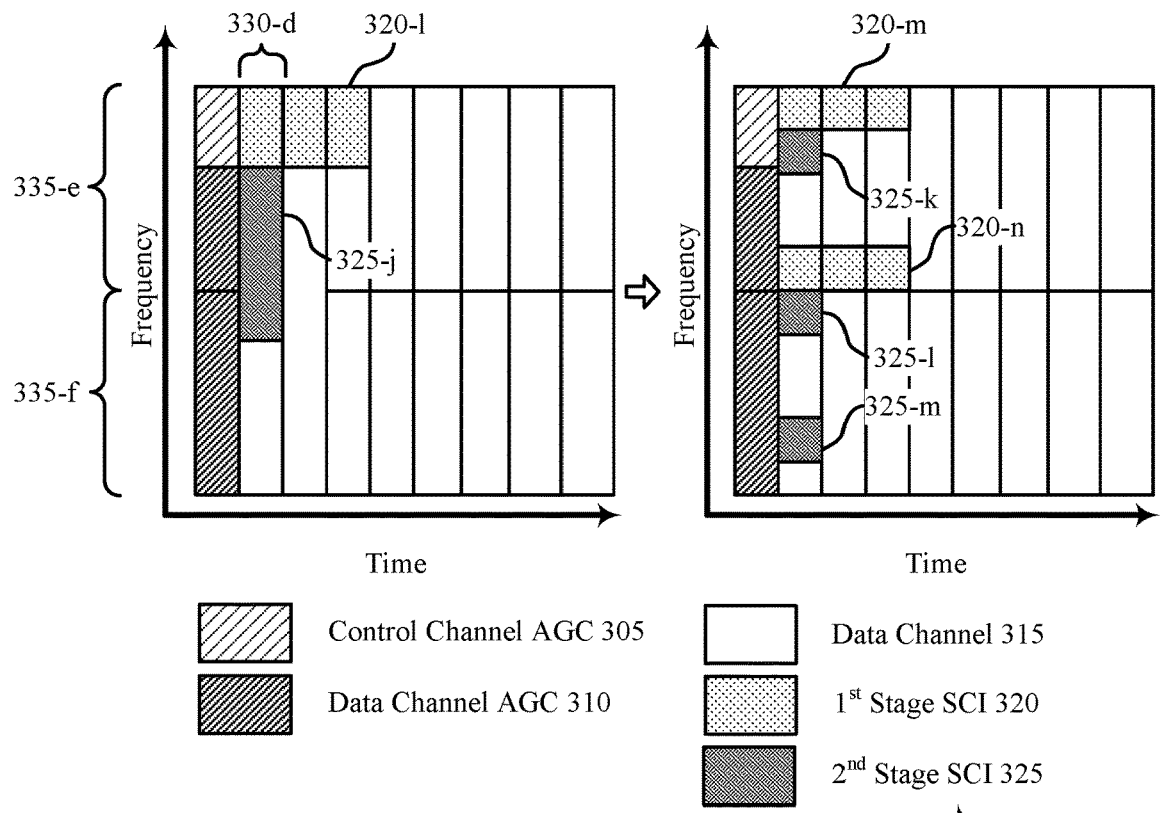

In some examples, decoding an SCI may be directly related to increasing reliability and/or decreasing latency for some sidelink communications (e.g., IIoT communications). For example, when the UE 115, or another UE 115, allocates resources for sidelink communications (e.g., Mode 2 resource allocation), the UE 115 allocating the resources may transmit an SCI to inform other UEs 115 of the allocated resources and avoid transmission collisions. In some sidelink communications (e.g., C-V2X communications), a first stage SCI and a second stage SCI may be transmitted at a beginning of a sub-channel time frame (e.g., beginning at a second symbol of the time frame, such as symbol 330-*a*, 330-*b*, 330-*c*, or 330-*d*) and may occupy relatively small portions of the sub-channel bandwidth (e.g., 10% of the sub-channel bandwidth). For example, a sub-channel bandwidth (e.g., any of bandwidths 335-*a*, 335-*b*, 335-*c*, 335-*d*, 335-*e*, or 335-*f*) may occupy 100 PRBs 345 and a corresponding control channel (e.g., PSCCH) may occupy 10 of those PRBs 345. A PRB 345 may, for example, be a frequency resource unit represented by the dashed line in FIG. 3A (not to scale), which may be a unit by which a bandwidth of a sub-channel is at least partially defined or measured. A sub-channel bandwidth may occupy a portion of a channel 340, which may, for example, be represented by two or more sub-channel bandwidths (e.g., as shown in FIG. 3C).

A first stage SCI 320 and/or second stage SCI 325 may be configured with a smaller frequency diversity, which may result in decreased transmission reliability. For example, as illustrated by the first example in each of FIGS. 3A, 3B, 3C, and 3D, a first stage SCI 320-*a*, 320-*b*, 320-*c*, or 320-*d* may occupy contiguous frequency resources, such that the diversity in the frequency resources may be relatively small (e.g., the frequency resources may occupy relatively similar frequency ranges). Similarly, a second stage SCI 325-*a*, 325-*b*, 325-*c*, or 325-*d* may occupy contiguous frequency resources, such that the diversity in the frequency resources for the second stage SCI 325 may be relatively small.

Resource mapping schemes 301, 302, 303, and 304 illustrate respective examples of increasing frequency diversity of a sidelink control channel and/or sidelink data channel 315 by multiplexing a sidelink data channel 315 (e.g., PSSCH) and a first stage SCI 320 (e.g., the sidelink control channel) in an interlaced manner. A resource mapping scheme (e.g., one or more of resource mapping schemes 301, 302, 303, or 304) may be configured at the UE 115 as a multiplexing pattern by configuration signaling (e.g., RRC signaling, such as transmitted via a base station 105 or another UE 115). A resource mapping scheme may be configured separately for each sub-channel or may be common to all sub-channels. A first stage SCI 320 and a second stage SCI 325 may be mapped using a same mapping scheme or a different mapping scheme. In some cases, resource mapping schemes 301, 302, 303, and 304 may be implemented even if virtual to physical RB mapping is disabled for the UE 115. In some cases, a first example of resource mapping in each of the respective resource mapping schemes 301, 302, 303, and 304 may represent a virtual resource mapping and a second example of the resource mapping may represent a physical resource mapping.

In a first example illustrated by resource mapping schemes 301 and 302, a sidelink data channel 315 may be allocated within one sub-channel bandwidth (e.g., bandwidth 335-*a* or bandwidth 335-*b*). In some cases, as illustrated by resource mapping scheme 301, the first stage SCI 320 and second stage SCI 325 may be multiplexed to cover the full bandwidth of the bandwidth 335-*a*, or a greater portion of the bandwidth of the bandwidth 335-*a*. For example, allocated resources for the first stage SCI 320-*a* may be mapped to multiplexed resources for the first stage SCI at 320-*b* through 320-*d*. Similarly, allocated resources for the second stage SCI 325-*a* may be mapped to multiplexed resources for the second stage SCI at 325-*b* and 325-*c*. A control channel AGC resource 305 and a data channel AGC resource 310 (e.g., an AGC signal used for hardware calibration) may remain the same after mapping.

The mapping scheme illustrated by resource mapping scheme 301 may provide a higher amount of frequency diversity by remapping SCI resources to occupy greater portions of the bandwidth of the bandwidth 335-*a*. For example, as illustrated by the second example in FIG. 3A, after mapping, a first stage SCI 320 may occupy non-contiguous frequency resources at 320-*b*, 320-*c*, and 320-*d*, each of which may be associated with a respective first frequency range 355. In such cases, the diversity in the frequency resources may be larger (e.g., some of the frequency resources for the first stage SCI 320 may occupy some different frequency ranges), and the non-contiguous frequency resources at 320-*b*, 320-*c*, and 320-*d* may together occupy a larger portion of the bandwidth 335-*a*. Similarly, a second stage SCI 325 (e.g., as illustrated by the second example of FIG. 3A) may occupy non-contiguous frequency resources at 325-*b* and 325-*c*, each of which may be associated with a respective second frequency range 360 that may be interlaced with respective first frequency ranges 355. In such cases, the diversity in the frequency resources for the second stage SCI 325 may be larger and may occupy a larger portion of bandwidth 335-*a*.

In some cases, as illustrated by resource mapping scheme 302, the first and second stage SCI may be multiplexed to cover a greater portion of the bandwidth of the bandwidth 335-*b*, where the frequency resources used by the first stage SCI 320 or the second stage SCI 325 may be the same frequency resources for consecutive symbols. For example, allocated resources for the first stage SCI 320-*e* may be mapped to multiplexed resources for the first stage SCI at 320-*f* and 320-*g*, each of which may be associated with a respective first frequency range 355. In such cases, the frequency resources allocated may remain the same for each consecutive symbol. Similarly, allocated resources for the second stage SCI 325-*d* may be mapped to multiplexed resources for the second stage SCI at 325-*e*, which may be associated with a second frequency range 360. A control channel AGC resource 305 and a data channel AGC resource 310 may remain the same after mapping. The mapping scheme illustrated by resource mapping scheme 302 may provide some frequency diversity (e.g., more frequency diversity than the original resource allocation) by remapping SCI resources to span or cover greater portions of the bandwidth of the bandwidth 335-*b*. For example, a total bandwidth including and between the multiplexed resources for the first stage SCI at 320-*f* and 320-*g* may be greater than a bandwidth covered by the first stage SCI at 320-*e*. As illustrated by resource mapping scheme 302, an SCI (e.g., the first stage SCI 320) may be split or partitioned to occupy two different subsets of frequency resources within one symbol.

In a second example illustrated by resource mapping schemes 303 and 304, a sidelink data channel 315 may be allocated within multiple sub-channel bandwidths (e.g., bandwidths 335-*c* and 335-*d* or bandwidths 335-*e* and 335-*f*). The second example may illustrate techniques for mapping the first stage SCI 320 and/or the second stage SCI 325 to one or more different sub-channel bandwidths than indicated by the original resource allocation. A first stage SCI 320 may be allocated to a sub-channel having a lowest index 350 (e.g., for backwards compatibility), and the UE 115 may be informed of such via RRC signaling. The first stage SCI 320 may hop to other sub-channel bandwidths allocated to the UE 115, as indicated by upper communication layers. A second stage SCI 325 may occupy other sub-channel bandwidths, as indicated to the UE 115 via RRC signaling or control signaling (e.g., a field in an SCI, such as in SCI 0_1).

In some cases, as illustrated by resource mapping scheme 303, the first stage SCI 320 may be multiplexed to cover the full bandwidth of the bandwidth 335-*c* (e.g., a sub-channel having a lowest index 350), or a greater portion of the bandwidth of the bandwidth 335-*c*. The second stage SCI 325 may be multiplexed to cover the full bandwidth of the bandwidths 335-*c* and 335-*d*, or a greater portion of the bandwidth of the bandwidths 335-*c* and 335-*d*. For example, allocated resources for the first stage SCI 320-*h* may be mapped to multiplexed resources for the first stage SCI at 320-*i* through 320-*k*. Similarly, allocated resources for the second stage SCI 325-*f* may be mapped to multiplexed resources for the second stage SCI at 325-*g* through 325-*i*. A control channel AGC resource 305 and a data channel AGC resource 310 may remain the same after mapping.

The mapping scheme illustrated by resource mapping scheme 303 may provide a higher amount of frequency diversity by remapping SCI resources to occupy greater portions of the bandwidth of the bandwidths 335-*c* and 335-*d*. For example, as illustrated by the second example in FIG. 3C, after mapping, a first stage SCI 320 may occupy non-contiguous frequency resources at 320-*i*, 320-*j*, and 320-*k*, such that the diversity in the frequency resources may be larger (e.g., some of the frequency resources for the first stage SCI 320 may occupy some different frequency ranges). Similarly, a second stage SCI 325 (e.g., as illustrated by the second example of FIG. 3C) may occupy non-contiguous frequency resources at 325-*g*, 325-*h*, and 325-*i*, such that the diversity in the frequency resources for the second stage SCI 325 may be larger.

In some cases, as illustrated by resource mapping scheme 304, the first stage SCI 320 may be multiplexed to cover a greater portion of the bandwidth of the bandwidth 335-*e* (e.g., a sub-channel having a lowest index 350), where consecutive symbols 330 of the first stage SCI 320 may occupy same frequency resources. The second stage SCI 325 may be multiplexed to cover the full bandwidth of the sub-channels 335-*e* and 335-*f*, or a greater portion of the bandwidth of the sub-channels 335-*e* and 335-*f*. For example, allocated resources for the first stage SCI 320-1 may be mapped to multiplexed resources for the first stage SCI at 320-*m* and 320-*n*. Similarly, allocated resources for the second stage SCI 325-*j* may be mapped to multiplexed resources for the second stage SCI at 325-*k* through 325-*m*. A control channel AGC resource 305 and a data channel AGC resource 310 may remain the same after mapping. The mapping scheme illustrated by resource mapping scheme 304 may provide some frequency diversity (e.g., more frequency diversity than the original resource allocation) by remapping SCI resources to cover greater portions of the bandwidth of the sub-channels 335-*e* and 335-*f*. As illustrated by resource mapping scheme 304, an SCI (e.g., the first stage SCI 320 or the second stage SCI 325) may be split or partitioned to occupy two different subsets of frequency resources within one symbol 330.

Based on one or more of the examples described herein, the UE 115 may communicate a sidelink packet or communication to another UE 115 (e.g., using a resource mapping). The techniques described herein may increase communication reliability and thereby increase the likelihood of successful transmission or reception of the sidelink packet.

Figure 4A:
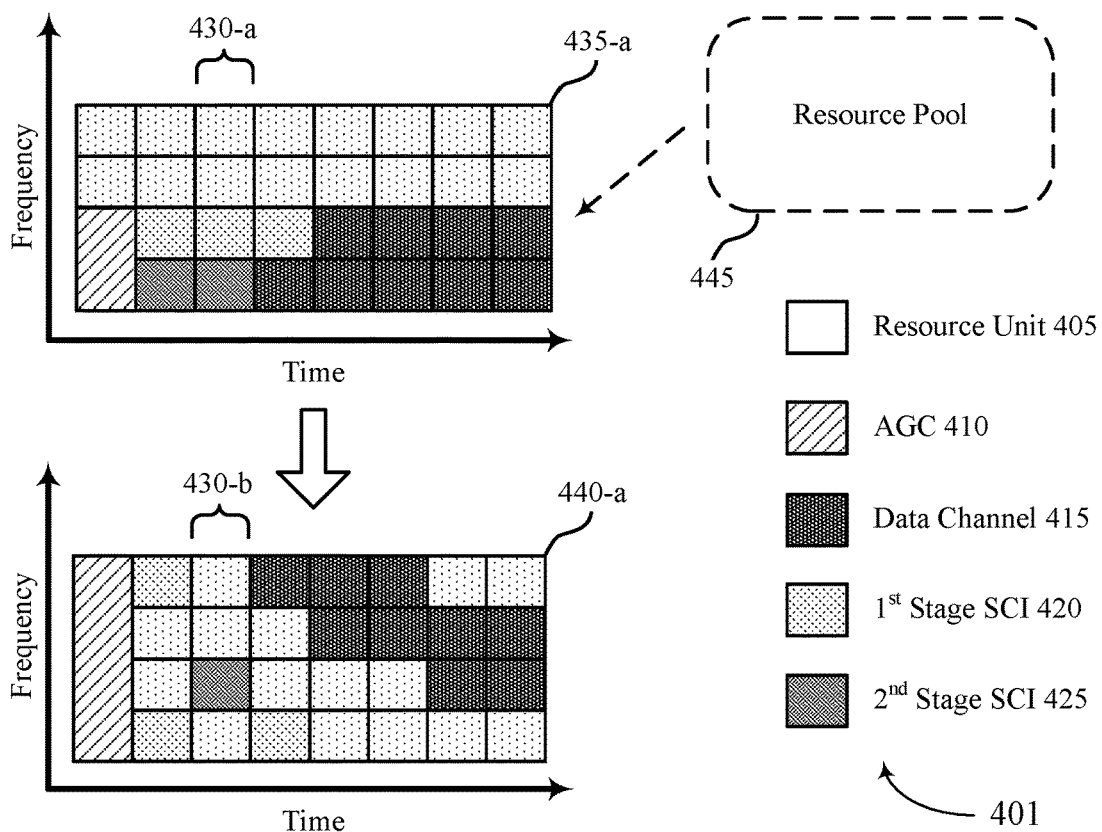
FIGS. 4A and 4B illustrate respective examples of resource mapping schemes that support sidelink communication reliability in accordance with one or more aspects of the present disclosure.
Figure 4B:
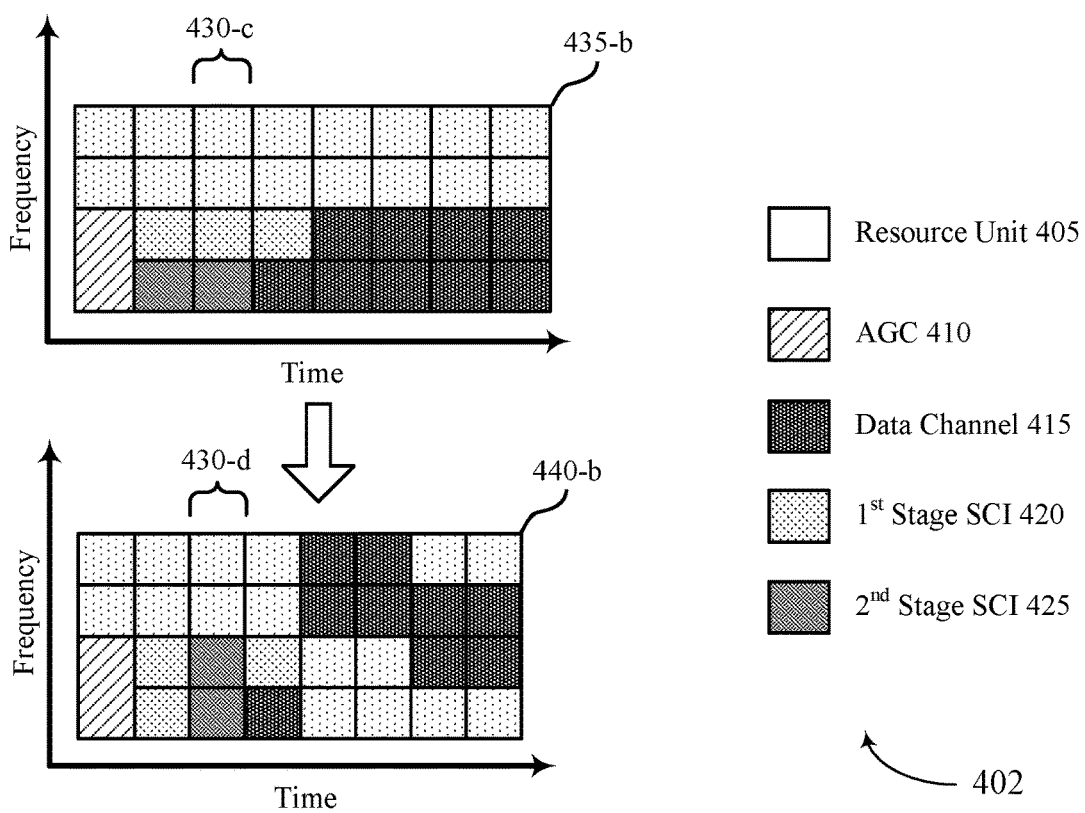

FIGS. 4A and 4B illustrate respective examples of resource mapping schemes 401 and 402 that support sidelink communication reliability in accordance with one or more aspects of the present disclosure. In some examples, resource mapping schemes 401 and 402 may implement aspects of wireless communications system 100 or 200. For example, one or more of resource mapping schemes 401 or 402 may be implemented by a UE 115 or aspects of a UE 115, which may represent an example of a UE 115 described with reference to FIGS. 1-3. As described with reference to FIG. 2, one or more of resource mapping schemes 401 or 402 may be implemented by the UE 115 to map sidelink communication resources allocated in a logical or virtual domain to physical sidelink communication resources (e.g., to improve frequency diversity of a sidelink control channel, a sidelink data channel, or both).

For example, the UE 115 may use a resource unit 405 (e.g., a mini-slot) to map sidelink resources allocated in a logical domain to physical sidelink resources. The resource unit 405 may represent a dimensional communication resource that includes a first number of REs (e.g., X REs) and a second number of symbols 430 (e.g., Y OFDM symbols). A resource unit 405 may be configurable for different resources pools, for example, based on a type of communication traffic allocated to a resource pool 445, and may be configured separately for an SCI portion and a data portion (e.g., a data channel 415) of the allocated resources. For example, if a first stage SCI 420 occupies a first number of symbols 430 (e.g., a first three symbols 430), a definition or configuration of a resource unit 405 for the SCI portion may apply to resource mapping for the first number of symbols 430 (e.g., and a configuration of a resource unit 405 for the data portion may apply to the rest of the symbols 430).

A resource unit mapping (e.g., any combination of different size or amount of resource units 405) may be used to map resources between logical resource units (e.g., as allocated) and physical resource units (e.g., as used for transmission). In the examples illustrated by resource mapping schemes 401 and 402, allocated resources may be mapped from a first resource allocation 435 (e.g., a logical resource allocation) to a second resource allocation 440 (e.g., a physical resource allocation). For example, resource units 405 corresponding to a data channel 415, a first stage SCI 420, and a second stage SCI 425, may be mapped to cover different frequency resources (e.g., a greater or more diverse frequency range). In some cases, resource units 405 corresponding to the data channel 415, the first stage SCI 420, and the second stage SCI 425, may also be mapped to cover different time resources.

Such a mapping may be common to all UEs 115 sharing a same resource pool 445 and may apply to Mode 1 and Mode 2 resource allocation using resources from the resource pool 445. In some cases, a portion of the resource pool 445 may be configured to support a direct mapping (e.g., without changing resources) for UEs 115 that may use contiguous frequency allocations (e.g., based on a configuration or on a communication of the UEs 115). Resource mapping schemes 401 and 402 may support both contiguous and non-contiguous frequency resource allocation, as well as intra-TTI and inter-TTI hopping (e.g., based on resource unit 405 granularity and the resource mapping configuration).

In a first example, an AGC 410 may be mapped to the same frequencies occupied during a first data or control symbol 430, for example, as illustrated by the example of resource mapping scheme 402. Mapping the AGC 410 in this manner may save or decrease power usage at the UE 115 and may provide a coarse calibration for AGC. In a second example, the AGC 410 may be mapped to frequencies that include each frequency covered by the remapped resource units 405. For example, the UE 115 may map the AGC 410 to a union of all frequencies of all the resource units 405. Mapping the AGC 410 in this manner may provide a finer calibration for AGC, for example, for each frequency used for the sidelink communication.

Based on one or more of the examples described herein, the UE 115 may communicate a sidelink packet or communication to another UE 115 (e.g., using a resource mapping). The techniques described herein may increase communication reliability and thereby increase the likelihood of successful transmission or reception of the sidelink packet.

Figure 5A:
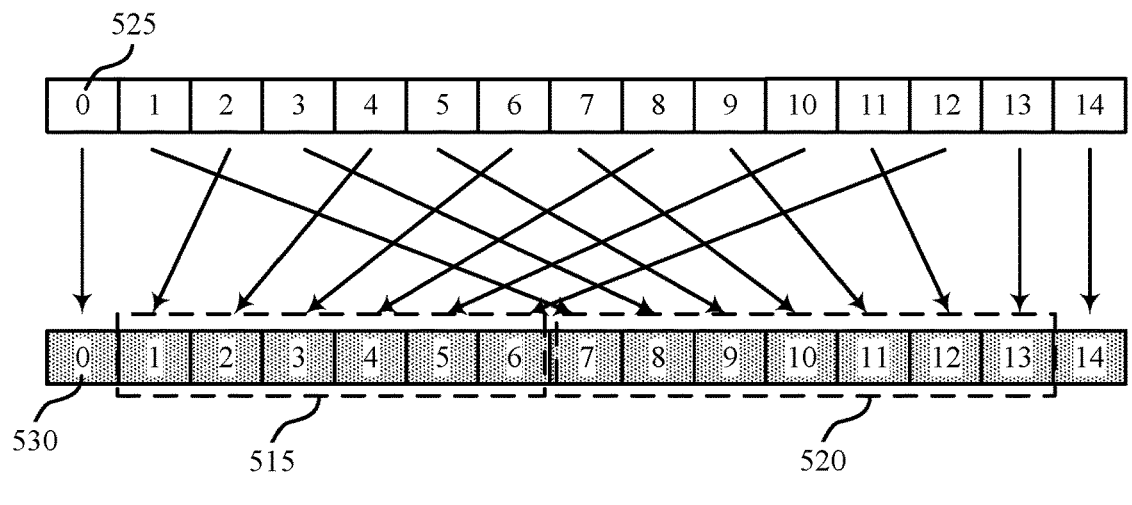
FIGS. 5A and 5B illustrate respective examples of resource mapping schemes that support sidelink communication reliability in accordance with one or more aspects of the present disclosure.
Figure 5B:
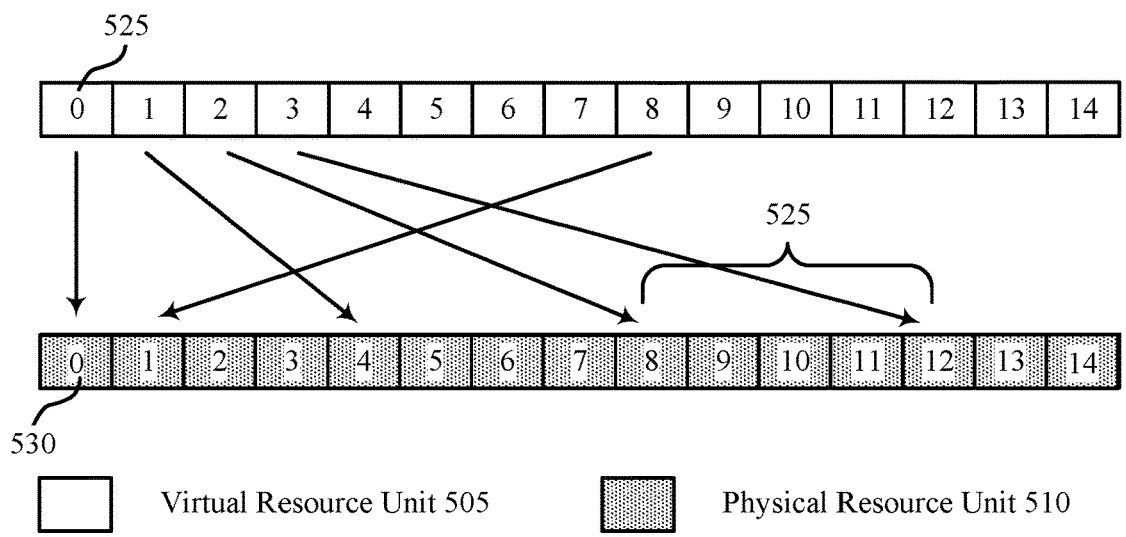

FIGS. 5A and 5B illustrate respective examples of resource mapping schemes 501 and 502 that support sidelink communication reliability in accordance with one or more aspects of the present disclosure. In some examples, resource mapping schemes 501 and 502 may implement aspects of wireless communications system 100 or 200. In some cases, resource mapping schemes 501 and 502 may implement aspects of resource mapping schemes 401 or 402. For example, one or more of resource mapping schemes 501 or 502 may be implemented by a UE 115 or aspects of a UE 115, which may represent an example of a UE 115 described with reference to FIGS. 1-4. As described with reference to FIG. 2, one or more of resource mapping schemes 501 or 502 may be implemented by the UE 115 to map sidelink communication resources allocated in a logical or virtual domain to physical sidelink communication resources (e.g., to improve frequency diversity of a sidelink control channel, a sidelink data channel, or both).

Resource mapping schemes 501 and 502 may illustrate respective examples of mapping resource units (e.g., as described with reference to FIG. 4) from a logical or virtual domain to a physical domain. In some examples, the resource units may represent RBs or groups of RBs, and resource mapping schemes 501 and 502 may represent RB mapping schemes or RB group mapping schemes. An RB group may be configurable (e.g., dynamically configurable), such that different RB group sizes may be supported for the mapping schemes described herein. According to the mapping schemes described herein, physical resources may be interleaved in order to increase frequency diversity. A minimum interleaving unit may correspond to one RB or may be smaller, for example, a number of REs corresponding to an RE group (e.g., four REs).

A resource mapping scheme may be common to a cell, for example, in order to avoid collisions between sidelink communications and may correspond to one or more examples of a resource mapping scheme. In a first example illustrated by resource mapping scheme 501, virtual resource units 505 may be mapped to physical resource units 510 using a pattern based on an index 525 of a virtual resource units 505. Virtual resource units 505 having an even-numbered index 525 may be consecutively mapped to a first group 515 of physical resource units 510 (e.g., a group of contiguous physical resource units 510). Similarly, virtual resource units 505 having an odd-numbered index 525 may be consecutively mapped to a second group 520 of physical resource units 510 (e.g., a group of contiguous physical resource units 510). Virtual resource units 505 having a highest index 525 or a lowest index 525 may be mapped to a same physical resource unit 510. For example, virtual resource units 505 having an indexes of '0' and '14' may respectively be mapped to physical resource units 510 having an index of '0' and '14.'

Based on the resource mapping scheme 501, a virtual resource unit 505 having an index of '1' may be mapped to a physical resource unit having an index of '7' (e.g., a first physical resource unit 510 of the second group 520), a virtual resource unit 505 having an index of '3' may be mapped to a physical resource unit having an index of '8' (e.g., a second physical resource unit 510 of the second group 520), and so forth. A virtual resource unit 505 having an index of '2' may be mapped to a physical resource unit having an index of '1' (e.g., a first physical resource unit 510 of the first group 515), a virtual resource unit 505 having an index of '4' may be mapped to a physical resource unit having an index of '2' (e.g., a second physical resource unit 510 of the first group 515), and so forth. For example, a virtual resource unit 505 may have an index 525 given by an equation such as equation (1):

$$j = 2c + r \quad (1)$$

where j represents a respective index 525 of a virtual resource unit 505, r represents an indicator of whether the index 525 is even or odd (e.g., may have a value of '0' for even indexes and a value of '1' for odd indexes), and c represents a value that may be obtained based on j and r and then used to determine an index 530 of a corresponding physical resource unit 510. A virtual resource unit 505 with an index 525 given by equation (1) may be mapped to a physical resource unit 510 having an index 530 given by an equation such as equation (2):

$$m = r \times C + c \quad (2)$$

where m represents a respective index 530 of a physical resource unit 510, c represents the value obtained using equation (1) based on j and r, r represents an indicator of whether a corresponding logical resource unit 505 index 525 is even or odd (e.g., may have a value of '0' for even indexes and a value of '1' for odd indexes), and C represents half of a total number of resource units.

In a second example illustrated by resource mapping scheme 502, consecutive virtual resource units 505 may be mapped to physical resource units 510 that are separated by at least an offset 525 (e.g., an interleaver depth). For example, a virtual resource unit 505 having an index of '0' may be mapped to a physical resource unit having an index of '0,' a virtual resource unit 505 having an index of '1' may be mapped to a physical resource unit having an index of '4' (e.g., at an offset 525 from index '0'), a virtual resource unit 505 having an index of '2' may be mapped to a physical resource unit having an index of '8' (e.g., at an offset 525 from index '4'), and so forth.

Based on one or more of the examples described herein, the UE 115 may communicate a sidelink packet or communication to another UE 115 (e.g., using a resource mapping). The techniques described herein may increase communication reliability and thereby increase the likelihood of successful transmission or reception of the sidelink packet.

Figure 6:
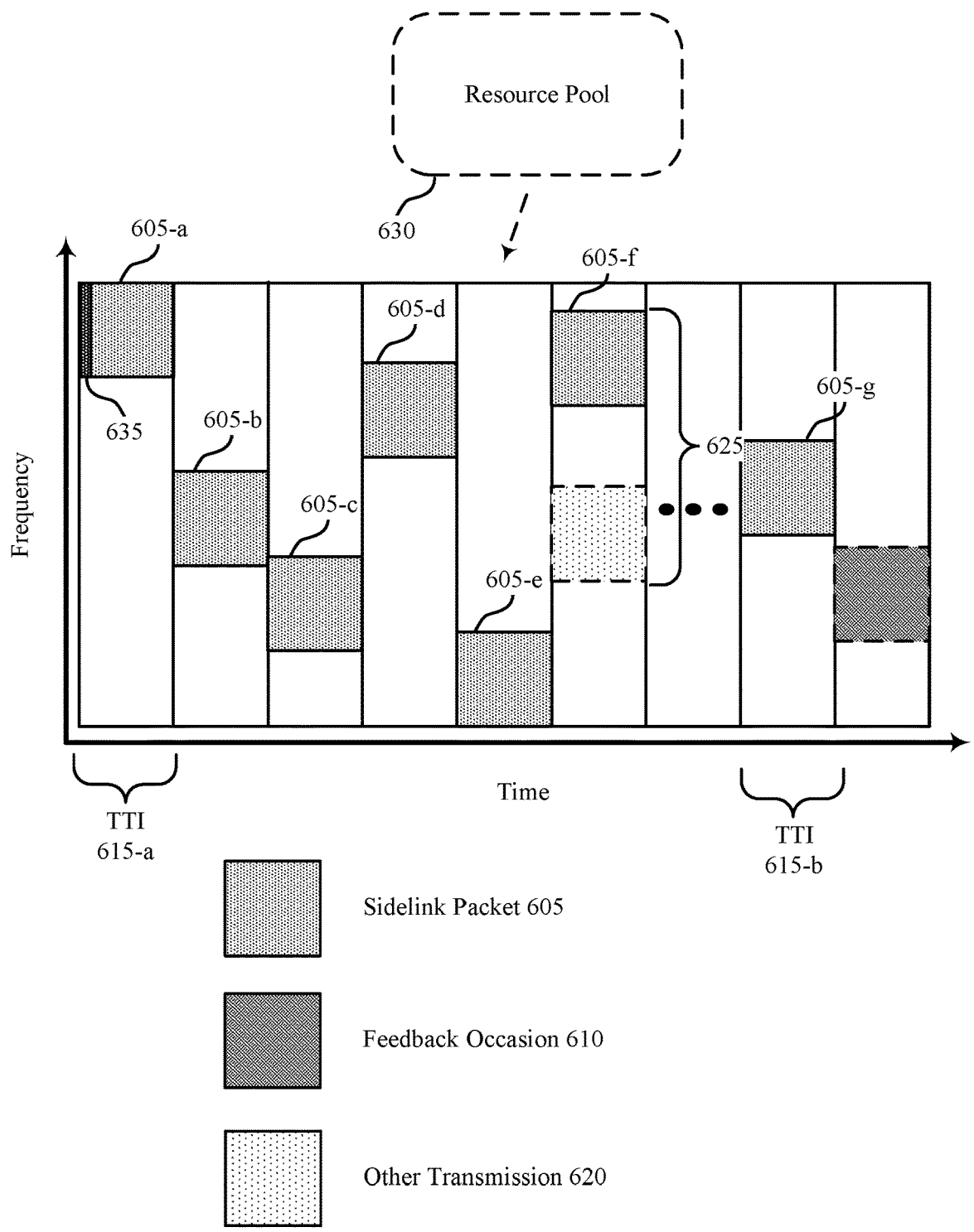
FIG. 6 illustrates an example of a communication repetition scheme that supports sidelink communication reliability in accordance with one or more aspects of the present disclosure.

FIG. 6 illustrates an example of a communication repetition scheme 600 that supports sidelink communication reliability in accordance with one or more aspects of the present disclosure. In some examples, communication repetition scheme 600 may implement aspects of wireless communications system 100 or 200. For example, communication repetition scheme 600 may be implemented by a UE 115 or aspects of a UE 115, which may represent an example of a UE 115 described with reference to FIGS. 1-5. As described with reference to FIG. 2, communication repetition scheme 600 may be implemented by the UE 115 to repeat a sidelink communication and increase the reliability of the sidelink communication.

As described with reference to FIG. 2, the UE 115 may be configured (e.g., via a configuration transmitted via a base station 105, the UE 115, or another UE 115) with an aggregation factor for a sidelink packet 605 (e.g., sidelink data channel and/or sidelink control channel communications). The aggregation factor may represent a number of times the sidelink packet 605 is to be repeated (e.g., 1, 2, 3, 4, 7, 8, 12, or 16 repetitions), for example, before transmitting or receiving feedback for the sidelink packet 605. The aggregation factor may be a number configured via RRC signaling, for example, and may or may not include SCI or downlink control information (DCI) activation. In some cases, the repetitions of the sidelink packet 605 may be combined for feedback (e.g., using soft HARQ combining), and in some cases, the repetitions of the sidelink packet 605 may be used to improve reliability without combining for feedback (e.g., feedback may not be requested by a transmitting UE 115). The feedback configuration may be configured via RRC signaling, for example, and may be based on a capability of the UE 115.

Repetition of the sidelink packet 605 may reduce latency, for example, by reducing waiting time for a feedback procedure to resupply information that may not be correctly received via the sidelink packet 605. Additionally, in Mode 1, repetition of the sidelink packet 605 may reduce control transmission overhead (e.g., DCI overhead) for scheduling multiple transmissions. Techniques for repeating the sidelink packet 605 according to the aggregation factor may be supported by UEs 115 with limited power or bandwidth capabilities.

In the example illustrated by communication repetition scheme 600, the UE 115 may be configured with an aggregation factor that indicates for the UE 115 to repeat the sidelink packet 605 a number of times (e.g., K times). The UE 115 may repeat the sidelink packet 605 in K consecutive TTIs 615 (e.g., slots), for example, beginning with sidelink packet 605-a in TTI 615-a and ending with sidelink packet 605-g in TTI 615-b. After transmission or reception of sidelink packet 605-g, the UE 115 may prepare and transmit feedback, or may receive feedback, within feedback occasion 610, for example, if the sidelink packet is configured for feedback (e.g., if the transmitting UE 115 requests feedback). If feedback is not configured, the UE 115 may not be configured with a feedback occasion 610, as indicated in FIG. 6 by the dashed line for the feedback occasion 610. If feedback is configured, the feedback may be based on all the repetitions of the sidelink packet 605 as described herein. In some cases, the frequency resources used for the repetitions of the sidelink packet 605 may be different, or frequency hopping may take place between repetitions of the sidelink packet 605 (e.g., as supported by an offset from upper transmission layers). In some cases, the frequency resources used for the repetitions of the sidelink packet 605 may be at least partially, if not all, the same.

In some examples, the repetitions of the sidelink packet 605 may represent blind repetitions, and may be transmitted using a shared resource pool (e.g., a contention-based resource pool 630). For example, the UE 115 (e.g., or another UE 115) may select resources for transmission of the repetitions of the sidelink packet 605 from a contention-based resource pool 630 by autonomously selecting the resources based on a sensing policy or a priority policy (e.g., because the resources may be subject to transmission collisions from other UEs 115). For example, the UE 115 (e.g., or another UE 115) may autonomously select resources for transmission of the repetitions of the sidelink packet 605 from a contention-based resource pool 630 based on a configuration for detecting overlapping transmissions 625 (e.g., one or more repetitions of the sidelink packet 605 overlapping with one or more other transmissions 620), or based on a transmission priority 635 (e.g., of the repetitions of the sidelink packet 605).

Signaling (e.g., RRC signaling) from a base station 105 or another UE 115 may indicate the configuration of the shared resource pool. If feedback for the repetitions of the sidelink packet 605 is configured (e.g., in the feedback occasion 610), the UE 115 may be configured to use resources not included in the shared resource pool. An RV-ID for each repetitions of the sidelink packet 605 may be cycled from a list of RV-IDs, for example, selected from one or more lists configured for the UE 115 along with the aggregation factor (e.g., {0, 2, 3, 1}, {0, 0, 0, 0}, or {0, 3, 0, 3}).

The repetitions of the sidelink packet 605 may be transmitted without scheduling the repetitions using an SCI (e.g., an SCI 0_1 or an SCI 0_2). For example, SCI 0_1 may not be associated with repetitions of the sidelink packet 605 because the resources for the repetitions may be selected from a contention-based resource pool 630 instead of a scheduling-based resource pool. Similarly, SCI 0_2 may be skipped because the RV-ID of the repetitions of the sidelink packet 605 may be defined by upper communication layers.

Based on one or more of the examples described herein, the UE 115 may communicate a sidelink packet or communication to another UE 115 (e.g., using a repetition scheme). The techniques described herein may increase communication reliability and thereby increase the likelihood of successful transmission or reception of the sidelink packet.

Figure 7:
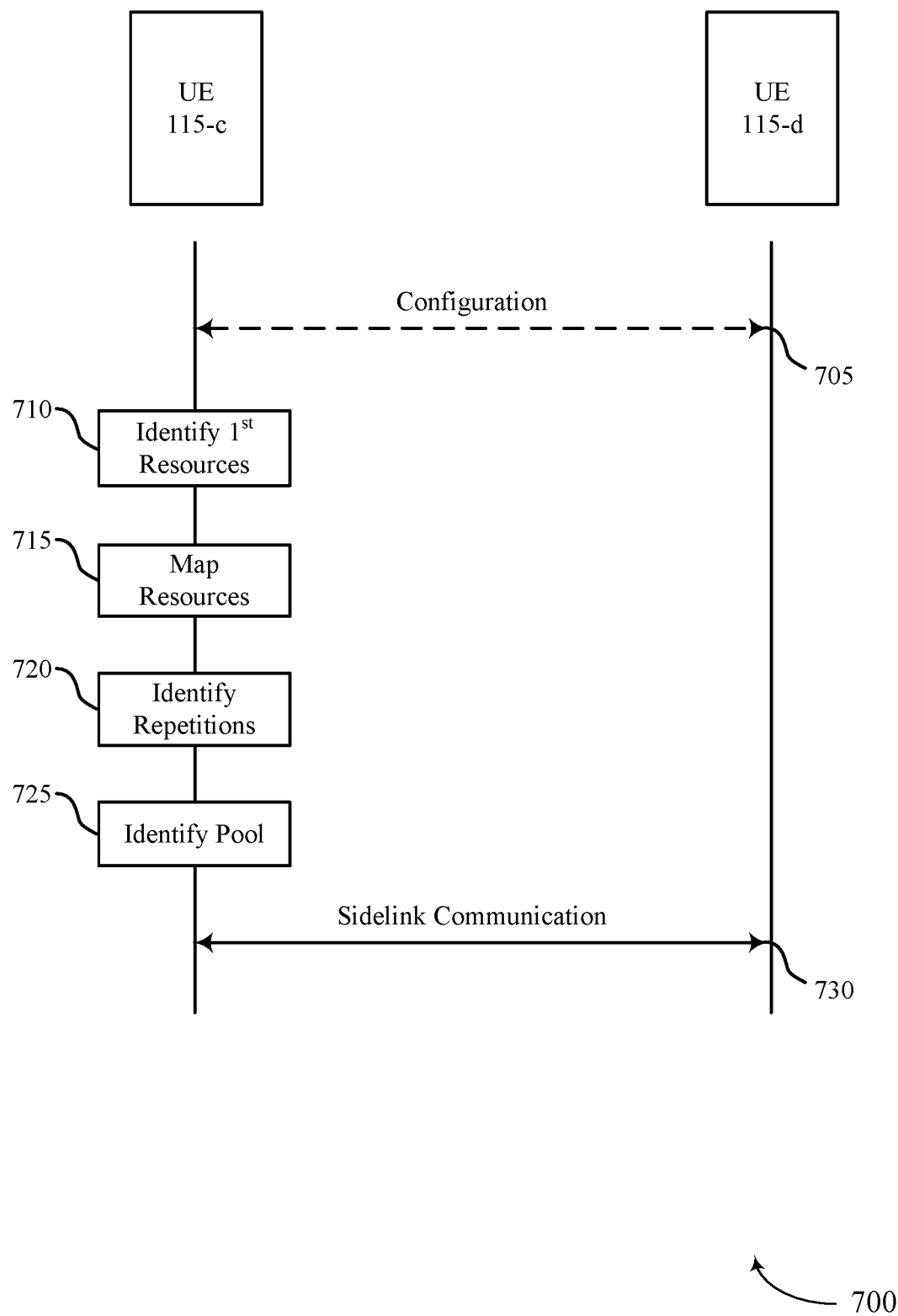
FIG. 7 illustrates an example of a process flow that supports sidelink communication reliability in accordance with one or more aspects of the present disclosure.

FIG. 7 illustrates an example of a process flow 700 that supports sidelink communication reliability in accordance with one or more aspects of the present disclosure. In some examples, process flow 700 may implement or be implemented by aspects of wireless communications system 100 or 200. For example, process flow may be implemented by a UE 115-c and a UE 115-d, which may represent examples of a UE 115 described with reference to FIGS. 1-6.

In the following description of process flow 700, the operations between UE 115-c and UE 115-d may be transmitted in a different order than the order shown, or the operations performed by UE 115-c and UE 115-d may be performed in different orders or at different times. For example, specific operations may also be left out of process flow 700, or other operations may be added to process flow 700. Although UE 115-c and UE 115-d are shown performing the operations of process flow 700, some aspects of some operations may also be performed by one or more other wireless devices. For example, some aspects of indicating a configuration to UE 115-c or of allocating resources to UE 115-c may be performed by a base station 105.

At 705, UE 115-c may receive or identify a configuration for increasing the reliability of a sidelink communication (e.g., sidelink data packet). For example, UE 115-c may receive an indication of a configuration from UE 115-d, another UE 115, or a base station 105. In some cases, UE 115-c may identify or determine the configuration and may indicate the configuration to UE 115-d. The configuration may include information about an aggregation factor, an associated resource pool, and associated feedback. Additionally or alternatively, the configuration may be associated with or include information for mapping communication resources allocated for a sidelink control channel and a sidelink data channel (e.g., logical communication resources) to corresponding physical communication resources.

At 710, if UE 115-c is configured to map the logical communication resources to the physical communication resources, UE 115-c may identify first communication resources allocated to UE 115-c for the sidelink control channel and the sidelink data channel. The first communication resources allocated for the sidelink control channel may occupy or cover a first bandwidth. UE 115-c may be allocated the first communication resources by the base station 105 or by UE 115-d, or UE 115-c may allocate the first communication resources. The first communication resources may be included in a logical domain.

At 715, if UE 115-c is configured to map the logical communication resources to the physical communication resources, UE 115-c may map, based on the configuration, the first communication resources to second communication resources (e.g., physical communication resources) for the sidelink control channel and the sidelink data channel. The second communication resources allocated for the sidelink control channel may cover a second bandwidth greater than the first bandwidth.

UE 115-c may map the resources according to one or more of the examples described herein. For example, UE 115-c may map the resources according to a multiplexing configuration for the sidelink control channel (e.g., including a first stage SCI) and the sidelink data channel (e.g., including a second stage SCI and other data). Additionally or alternatively, UE 115-c may map the resources using one or more resource units and a mapping scheme configured for a resource pool used by UE 115-c. In some cases, UE 115-c may map the resources using a mapping scheme and respective indexes of the one or more resource units.

At 720, if UE 115-c is configured with an aggregation factor for repeating the sidelink communication, UE 115-c may identify a quantity of repetitions associated with the sidelink communication. The quantity of repetitions may be configured for a feedback instance and may be based on an aggregation factor configured for UE 115-c.

At 725, if UE 115-c is configured with an aggregation factor for repeating the sidelink communication, UE 115-c may identify a communication resource pool that includes one or more contention-based communication resources for sidelink communications. For example, UE 115-c may identify the communication resource pool for communicating the repetitions of the sidelink communication. For example, the communication resource pool may be configured for UE 115-c and other UEs 115 (e.g., via configuration signaling).

At 730, UE 115-c may communicate (e.g., transmit or receive) the sidelink communication with UE 115-d. For example, if UE 115-c is configured to map the logical communication resources to the physical communication resources, UE 115-c may communicate with UE 115-d using the second communication resources (e.g., physical communication resources). If UE 115-c is configured with an aggregation factor for repeating the sidelink communication, UE 115-c may communicate the sidelink communication using the contention-based communication resources from the communication resource pool and may communicate a repetition of the sidelink communication in each of a number of consecutive time periods associated with the quantity of repetitions. For example, UE 115-c may repeat the sidelink communication in a number of consecutive time periods equal to the quantity of repetitions. Each repetition of the sidelink communication may be unassociated with control information used for scheduling. For example, control information for scheduling the repetitions may not be used based on redundancy information identified by UE 115-c and/or based on using contention-based resources for transmission of the repetitions.

Figure 8:
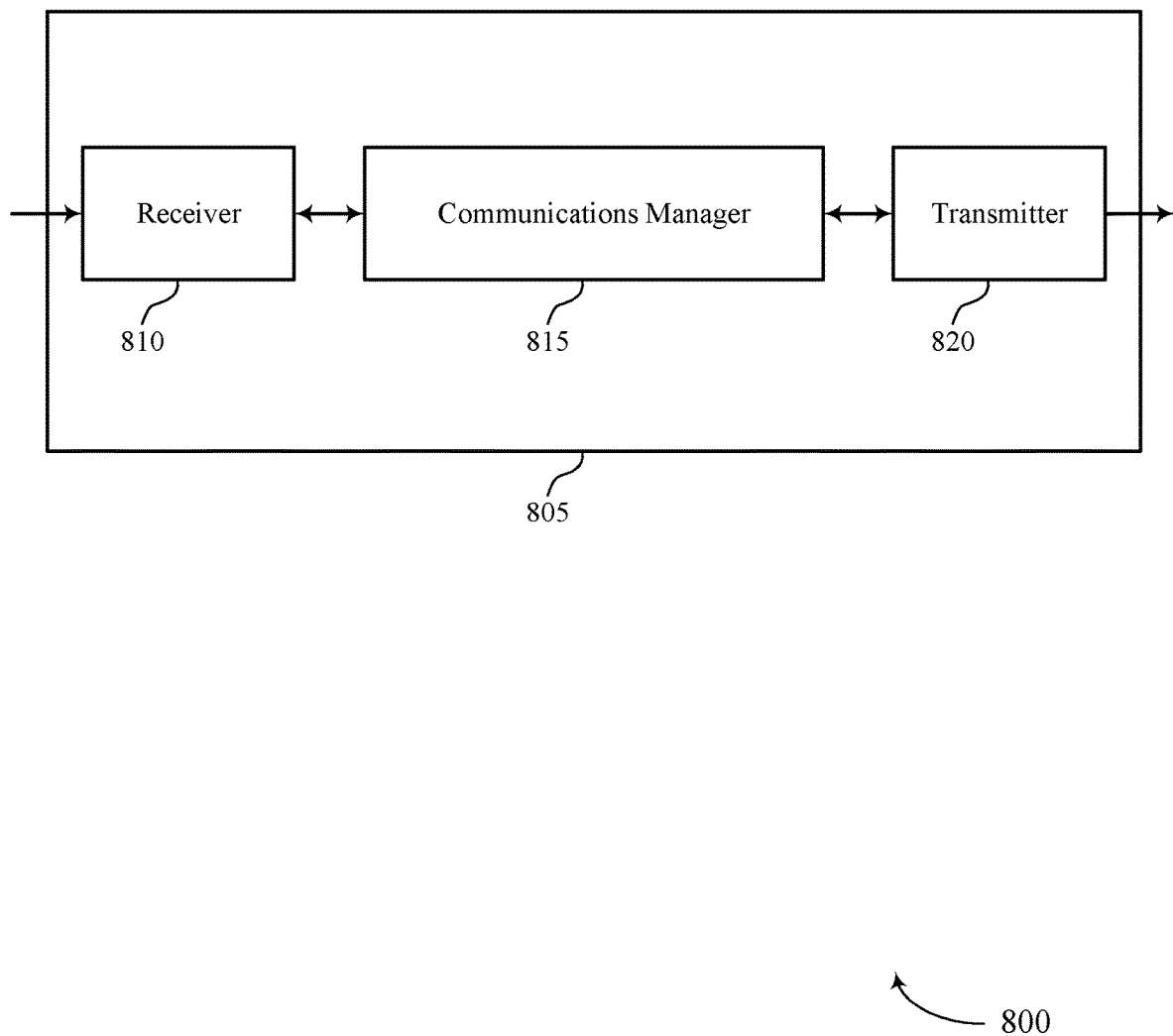
FIGS. 8 and 9 show block diagrams of devices that support sidelink communication reliability in accordance with one or more aspects of the present disclosure.

FIG. 8 shows a block diagram 800 of a device 805 that supports sidelink communication reliability in accordance with one or more aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to sidelink communication reliability, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may support wireless communication at a first UE in accordance with examples as disclosed herein. For example, the communications manager 815 may be configured as or otherwise support a means for receiving a configuration associated with mapping communication resources allocated for a sidelink control channel and a sidelink data channel to corresponding physical communication resources. The communications manager 815 may be configured as or otherwise support a means for mapping, based on the configuration, first communication resources allocated to the first UE for the sidelink control channel and the sidelink data channel to second communication resources for the sidelink control channel and the sidelink data channel, the first communication resources allocated for the sidelink control channel occupying a first bandwidth and the second communication resources for the sidelink control channel covering a second bandwidth greater than the first bandwidth. The communications manager 815 may be configured as or otherwise support a means for communicating with a second UE using the second communication resources.

Additionally or alternatively, the communications manager 815 may support wireless communication at a UE in accordance with examples as disclosed herein. For example, the communications manager 815 may be configured as or otherwise support a means for receiving signaling that indicates a communication resource pool including one or more contention-based communication resources for sidelink communications. The communications manager 815 may be configured as or otherwise support a means for receiving signaling that indicates a quantity of repetitions associated with the communication resource pool. The communications manager 815 may be configured as or otherwise support a means for communicating, using contention-based communication resources from the communication resource pool, a repetition of the sidelink communication in each of a number of consecutive time periods associated with the quantity of repetitions, each repetition of the sidelink communication being unassociated with control information used for scheduling.

Additionally or alternatively, the communications manager 815 may support wireless communication at a first UE in accordance with examples as disclosed herein. For example, the communications manager 815 may be configured as or otherwise support a means for receiving a configuration associated with mapping communication resources allocated for a sidelink control channel and a sidelink data channel to corresponding physical communication resources, the configuration applicable to a communication resource pool that includes first communication resources allocated to the first UE for the sidelink control channel and the sidelink data channel. The communications manager 815 may be configured as or otherwise support a means for mapping, based on the configuration, a logical communication resource unit of the first communication resources to a physical communication resource unit of second communication resources for the sidelink control channel and the sidelink data channel, the logical communication resource unit and the physical communication resource unit each including a first quantity of resource elements and a second quantity of symbols. The communications manager 815 may be configured as or otherwise support a means for communicating with a second UE using the second communication resources.

Additionally or alternatively, the communications manager 815 may support wireless communication at a first UE in accordance with examples as disclosed herein. For example, the communications manager 815 may be configured as or otherwise support a means for receiving a configuration associated with mapping communication resources allocated for a sidelink control channel and a sidelink data channel to corresponding physical communication resources, the configuration for a communication resource pool that includes first communication resources allocated to the first UE for the sidelink control channel and the sidelink data channel. The communications manager 815 may be configured as or otherwise support a means for mapping, based on the configuration, indexes of a set of multiple logical communication resource units of the first communication resources to a indexes of a set of multiple physical communication resource units of second communication resources for the sidelink control channel and the sidelink data channel, the set of multiple logical communication resource units and the set of multiple physical communication resource units each including a first quantity of resource elements and a second quantity of symbols. The communications manager 815 may be configured as or otherwise support a means for communicating with a second UE using the second communication resources.

The communications manager 815 may receive a configuration associated with mapping communication resources allocated for a sidelink control channel and a sidelink data channel to corresponding physical communication resources, identify first communication resources allocated to the first UE for the sidelink control channel and the sidelink data channel, the first communication resources allocated for the sidelink control channel occupying a first bandwidth, map, based on the configuration, the first communication resources to second communication resources for the sidelink control channel and the sidelink data channel, the second communication resources for the sidelink control channel covering a second bandwidth greater than the first bandwidth, and communicate with a second UE using the second communication resources.

The communications manager 815 may also identify a quantity of repetitions associated with a sidelink communication, identify a communication resource pool including one or more contention-based communication resources for sidelink communications, and communicate, using contention-based communication resources from the communication resource pool, a repetition of the sidelink communication in each of a number of consecutive time periods associated with the quantity of repetitions, where each repetition of the sidelink communication is unassociated with control information used for scheduling. The communications manager 815 may be an example of aspects of the communications manager 1110 described herein.

The communications manager 815 may be an example of means for performing various aspects of managing sidelink communications as described herein. The communications manager 815, or its sub-components, may be implemented in hardware (e.g., in communications management circuitry). The circuitry may comprise of a processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

In another implementation, the communications manager 815, or its sub-components, may be implemented in code (e.g., as communications management software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device.

In some examples, the communication manager 815 may be configured to perform various operations (e.g., receiving, determining, transmitting) using or otherwise in cooperation with the receiver 810, the transmitter 820, or both.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

In one or more aspects, the described techniques performed by the communications manager 815 as described herein may support improvements in sidelink communications. For example, communications manager 815 may increase communication quality at a wireless device (e.g., a UE 115) by supporting increased remapping allocated resources or blind repetitions of a sidelink communication. The increase in communication quality may result in increased link performance and decreased overhead based on remapping the resources or repeating the sidelink communication. Accordingly, communications manager 815 may save power and increase battery life at a wireless device (e.g., a UE 115) by strategically increasing a quality of communications at a wireless device (e.g., a UE 115).

Figure 9:
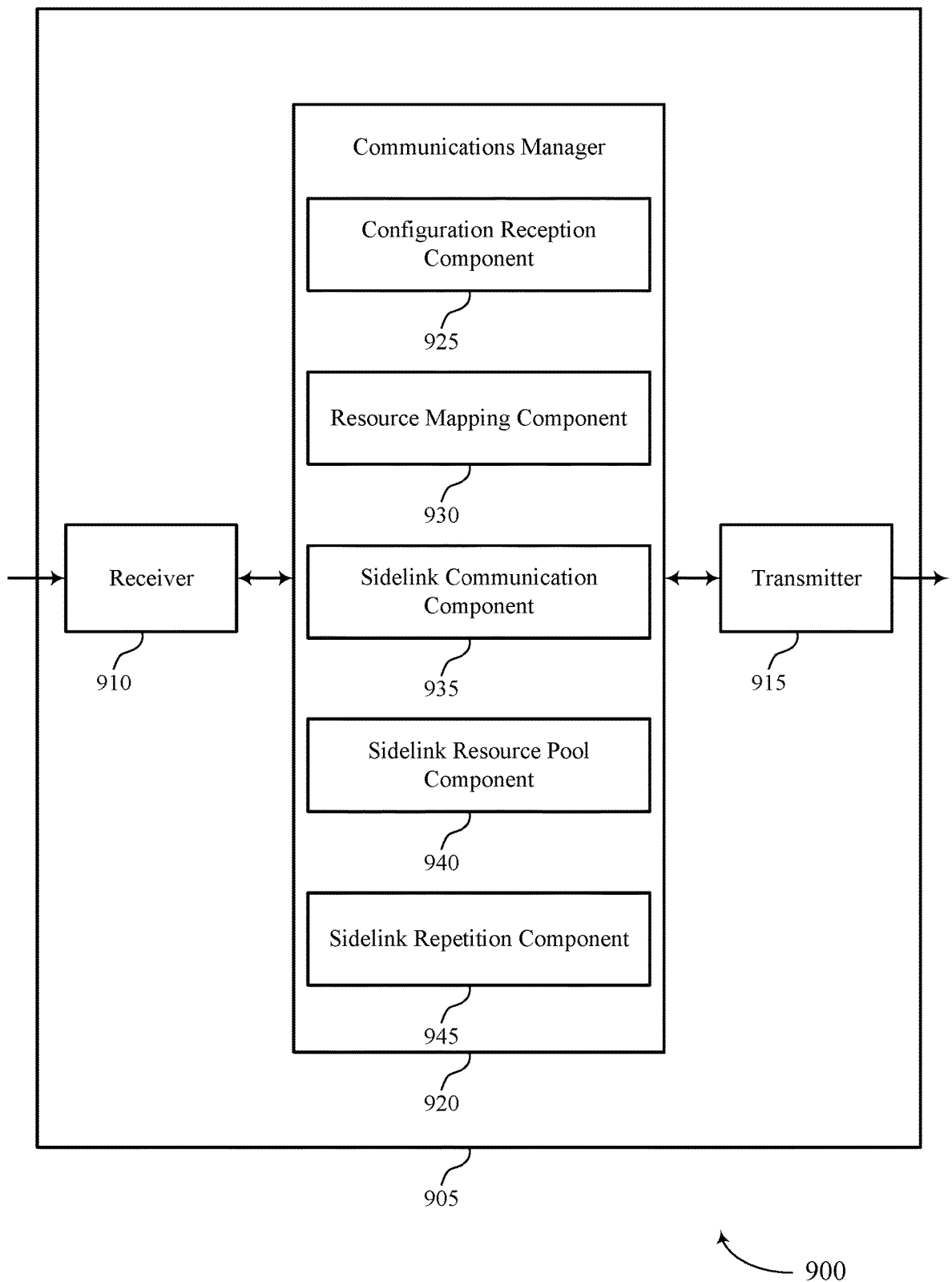

FIG. 9 shows a block diagram 900 of a device 905 that supports sidelink communication reliability in accordance with one or more aspects of the present disclosure. The device 905 may be an example of aspects of a device 805, or a UE 115 as described herein. The device 905 may include a receiver 910, a transmitter 915, and a communications manager 920. The device 905 may also include a processor. Each of these components may be in communication with one another (e.g., via one or more buses).

The receiver 910 may receive information such as packets, user data, or control information associated with various information channels (e.g., control channels, data channels, and information related to sidelink communication reliability, etc.). Information may be passed on to other components of the device 905. The receiver 910 may be an example of aspects of the transceiver 1120 described with reference to FIG. 11. The receiver 910 may utilize a single antenna or a set of antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to sidelink communication reliability). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of sidelink communication reliability as described herein. For example, the communications manager 920 may include a configuration reception component 925, a resource mapping component 930, a sidelink communication component 935, a sidelink resource pool component 940, a sidelink repetition component 945, or any combination thereof. The communications manager 920 may be an example of aspects of a communications manager 815 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first UE in accordance with examples as disclosed herein. The configuration reception component 925 may be configured as or otherwise support a means for receiving a configuration associated with mapping communication resources allocated for a sidelink control channel and a sidelink data channel to corresponding physical communication resources. The resource mapping component 930 may be configured as or otherwise support a means for mapping, based on the configuration, first communication resources allocated to the first UE for the sidelink control channel and the sidelink data channel to second communication resources for the sidelink control channel and the sidelink data channel, the first communication resources allocated for the sidelink control channel occupying a first bandwidth and the second communication resources for the sidelink control channel covering a second bandwidth greater than the first bandwidth. The sidelink communication component 935 may be configured as or otherwise support a means for communicating with a second UE using the second communication resources.

Additionally or alternatively, the communications manager 920 may support wireless communication at a UE in accordance with examples as disclosed herein. The sidelink resource pool component 940 may be configured as or otherwise support a means for receiving signaling that indicates a communication resource pool including one or more contention-based communication resources for sidelink communications. The sidelink repetition component 945 may be configured as or otherwise support a means for receiving signaling that indicates a quantity of repetitions associated with the communication resource pool. The sidelink communication component 935 may be configured as or otherwise support a means for communicating, using contention-based communication resources from the communication resource pool, a repetition of the sidelink communication in each of a number of consecutive time periods associated with the quantity of repetitions, each repetition of the sidelink communication being unassociated with control information used for scheduling.

Additionally or alternatively, the communications manager 920 may support wireless communication at a first UE in accordance with examples as disclosed herein. The configuration reception component 925 may be configured as or otherwise support a means for receiving a configuration associated with mapping communication resources allocated for a sidelink control channel and a sidelink data channel to corresponding physical communication resources, the configuration applicable to a communication resource pool that includes first communication resources allocated to the first UE for the sidelink control channel and the sidelink data channel. The resource mapping component 930 may be configured as or otherwise support a means for mapping, based on the configuration, a logical communication resource unit of the first communication resources to a physical communication resource unit of second communication resources for the sidelink control channel and the sidelink data channel, the logical communication resource unit and the physical communication resource unit each including a first quantity of resource elements and a second quantity of symbols. The sidelink communication component 935 may be configured as or otherwise support a means for communicating with a second UE using the second communication resources.

Additionally or alternatively, the communications manager 920 may support wireless communication at a first UE in accordance with examples as disclosed herein. The configuration reception component 925 may be configured as or otherwise support a means for receiving a configuration associated with mapping communication resources allocated for a sidelink control channel and a sidelink data channel to corresponding physical communication resources, the configuration for a communication resource pool that includes first communication resources allocated to the first UE for the sidelink control channel and the sidelink data channel. The resource mapping component 930 may be configured as or otherwise support a means for mapping, based on the configuration, indexes of a set of multiple logical communication resource units of the first communication resources to a indexes of a set of multiple physical communication resource units of second communication resources for the sidelink control channel and the sidelink data channel, the set of multiple logical communication resource units and the set of multiple physical communication resource units each including a first quantity of resource elements and a second quantity of symbols. The sidelink communication component 935 may be configured as or otherwise support a means for communicating with a second UE using the second communication resources.

A processor of a wireless device (e.g., controlling the receiver 910, the transmitter 915, or the transceiver 1120 as described with reference to FIG. 11) may increase communication reliability and quality. The increased communication quality may reduce power consumption (e.g., via implementation of system components described with reference to FIG. 10) compared to other systems and techniques, for example, that do not support remapping allocated resources or blind repetitions for sidelink communications, which may decrease communication quality and increase power consumption. Further, the processor of the UE 115 may identify one or more aspects of a sidelink resource configuration. The processor of the wireless device may use the sidelink resource configuration to perform one or more actions that may result in increased communication quality and power consumption, as well as save power and increase battery life at the wireless device (e.g., by strategically supporting resource remapping or communication repetition, which may increase communication quality), among other improvements.

Figure 10:
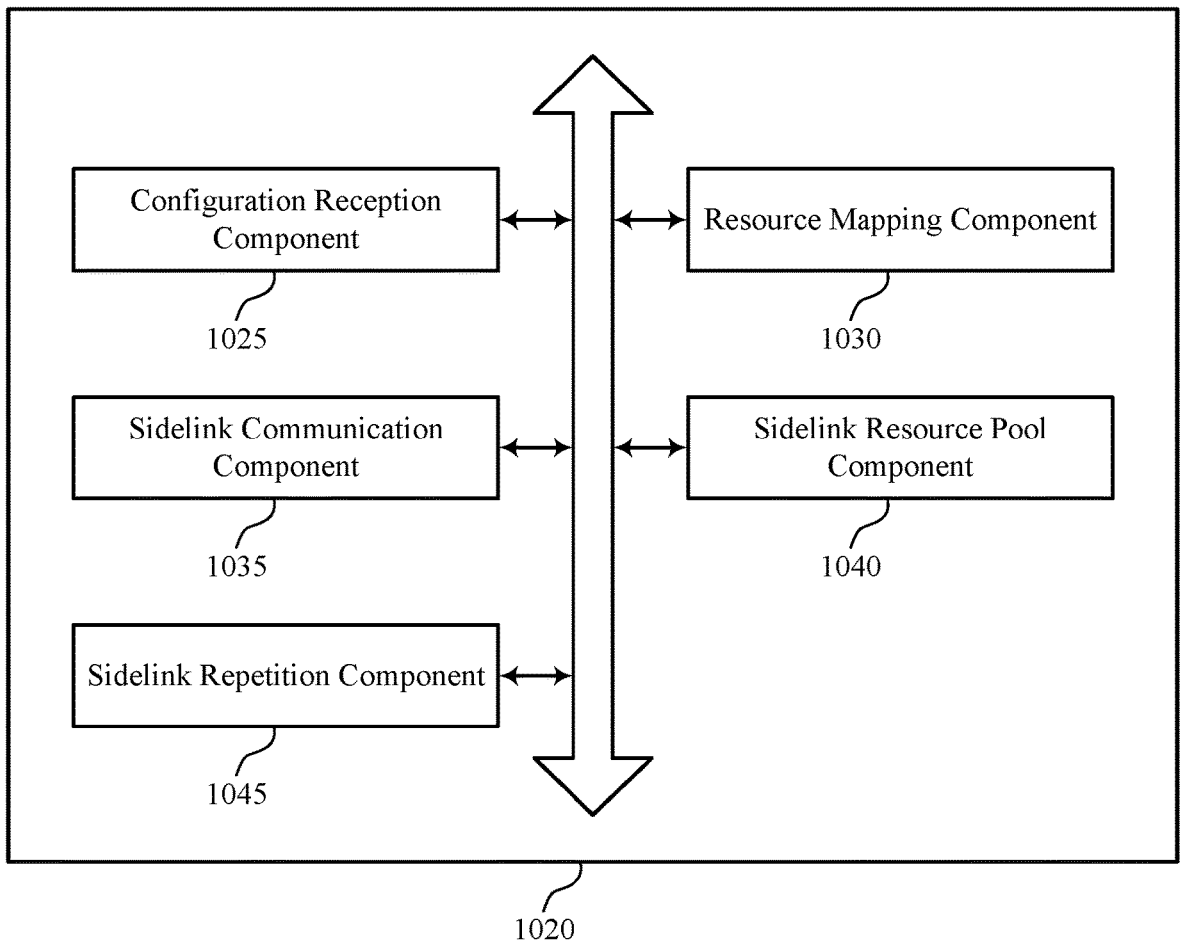
FIG. 10 shows a block diagram of a communications manager that supports sidelink communication reliability in accordance with one or more aspects of the present disclosure.

FIG. 10 shows a block diagram 1000 of a communications manager 1020 that supports sidelink communication reliability in accordance with aspects of the present disclosure. The communications manager 1020 may be an example of aspects of a communications manager 815, a communications manager 920, or both, as described herein. The communications manager 1020, or various components thereof, may be an example of means for performing various aspects of sidelink communication reliability as described herein. For example, the communications manager 1020 may include a configuration reception component 1025, a resource mapping component 1030, a sidelink communication component 1035, a sidelink resource pool component 1040, a sidelink repetition component 1045, or any combination thereof. Each of these components may communicate, directly or indirectly, with one another (e.g., via one or more buses).

The communications manager 1020 may support wireless communication at a first UE in accordance with examples as disclosed herein. The configuration reception component 1025 may be configured as or otherwise support a means for receiving a configuration associated with mapping communication resources allocated for a sidelink control channel and a sidelink data channel to corresponding physical communication resources. The resource mapping component 1030 may be configured as or otherwise support a means for mapping, based on the configuration, first communication resources allocated to the first UE for the sidelink control channel and the sidelink data channel to second communication resources for the sidelink control channel and the sidelink data channel, the first communication resources allocated for the sidelink control channel occupying a first bandwidth and the second communication resources for the sidelink control channel covering a second bandwidth greater than the first bandwidth. The sidelink communication component 1035 may be configured as or otherwise support a means for communicating with a second UE using the second communication resources.

In some examples, the resource mapping component 1030 may be configured as or otherwise support a means for mapping consecutive symbols of a first stage SCI to a same first frequency range, at least two subsets of the first stage SCI being separated by a frequency range. In some examples, the resource mapping component 1030 may be configured as or otherwise support a means for mapping consecutive symbols of a second stage SCI to a same second frequency range different from and interlaced with the first frequency range.

In some examples, the resource mapping component 1030 may be configured as or otherwise support a means for multiplexing the first stage SCI and the second stage SCI to cover a bandwidth of a sidelink sub-channel. In some examples, the resource mapping component 1030 may be configured as or otherwise support a means for multiplexing the first stage SCI and the second stage SCI to cover a bandwidth greater than a sidelink sub-channel.

In some examples, the resource mapping component 1030 may be configured as or otherwise support a means for mapping consecutive symbols of a first stage SCI to at least partially different first frequency ranges. In some examples, the resource mapping component 1030 may be configured as or otherwise support a means for mapping consecutive symbols of a second stage SCI to at least partially different second frequency ranges interlaced with respective first frequency ranges.

In some examples, the resource mapping component 1030 may be configured as or otherwise support a means for multiplexing the first stage SCI and the second stage SCI to cover a bandwidth of a sidelink sub-channel. In some examples, the resource mapping component 1030 may be configured as or otherwise support a means for multiplexing the first stage SCI and the second stage SCI to cover a bandwidth greater than a sidelink sub-channel.

In some examples, the second bandwidth includes the second communication resources different from the first communication resources. In some examples, the configuration reception component 1025 may be configured as or otherwise support a means for receiving signaling from a base station, a broadcast UE, or both, indicating the configuration.

Additionally or alternatively, the communications manager 1020 may support wireless communication at a UE in accordance with examples as disclosed herein. The sidelink resource pool component 1040 may be configured as or otherwise support a means for receiving signaling that indicates a communication resource pool including one or more contention-based communication resources for sidelink communications. The sidelink repetition component 1045 may be configured as or otherwise support a means for receiving signaling that indicates a quantity of repetitions associated with the communication resource pool. In some examples, the sidelink communication component 1035 may be configured as or otherwise support a means for communicating, using contention-based communication resources from the communication resource pool, a repetition of the sidelink communication in each of a number of consecutive time periods associated with the quantity of repetitions, each repetition of the sidelink communication being unassociated with control information used for scheduling.

In some examples, the sidelink resource pool component 1040 may be configured as or otherwise support a means for selecting, based on a configuration for transmission priority or for detecting overlapping transmissions, contention-based communication resources from the communication resource pool for communicating the repetitions of the sidelink communication. In some examples, the sidelink communication component 1035 may be configured as or otherwise support a means for communicating consecutive repetitions of the sidelink communication using at least partially different frequency ranges.

In some examples, the sidelink repetition component 1045 may be configured as or otherwise support a means for identifying a RV-ID for each of the repetitions of the sidelink communication based on a configured pattern of RV-IDs.

In some examples, the configuration reception component 1025 may be configured as or otherwise support a means for receiving first signaling from a broadcast UE, the first signaling indicating the communication resource pool, the quantity of repetitions, or both. In some examples, the configuration reception component 1025 may be configured as or otherwise support a means for receiving first signaling from a base station, the first signaling indicating the communication resource pool, the quantity of repetitions, or both.

In some examples, the sidelink communication component 1035 may be configured as or otherwise support a means for performing a combining process based on the repetitions of the sidelink communication. In some examples, the quantity of repetitions is associated with feedback. In some examples, the quantity of repetitions is unassociated with feedback.

Additionally or alternatively, the communications manager 1020 may support wireless communication at a first UE in accordance with examples as disclosed herein. In some examples, the configuration reception component 1025 may be configured as or otherwise support a means for receiving a configuration associated with mapping communication resources allocated for a sidelink control channel and a sidelink data channel to corresponding physical communication resources, the configuration applicable to a communication resource pool that includes first communication resources allocated to the first UE for the sidelink control channel and the sidelink data channel. In some examples, the resource mapping component 1030 may be configured as or otherwise support a means for mapping, based on the configuration, a logical communication resource unit of the first communication resources to a physical communication resource unit of second communication resources for the sidelink control channel and the sidelink data channel, the logical communication resource unit and the physical communication resource unit each including a first quantity of REs and a second quantity of symbols. In some examples, the sidelink communication component 1035 may be configured as or otherwise support a means for communicating with a second UE using the second communication resources.

In some examples, the first communication resources allocated for the sidelink control channel occupy a first bandwidth and the second communication resources for the sidelink control channel cover a second bandwidth greater than the first bandwidth. In some examples, the first quantity of REs and the second quantity of symbols are based on a type of communication, the type of communication including control information or data, or both. In some examples, the first quantity of REs and the second quantity of symbols are based on the communication resource pool or a type of traffic of the communication resource pool, or both.

In some examples, the resource mapping component 1030 may be configured as or otherwise support a means for mapping an AGC communication to a range of frequencies covered in a first symbol of the second communication resources. In some examples, the resource mapping component 1030 may be configured as or otherwise support a means for mapping an AGC communication to a range of frequencies covered in all of the symbols of the second communication resources.

In some examples, the configuration reception component 1025 may be configured as or otherwise support a means for receiving signaling from a base station, a broadcast UE, or both, indicating the configuration.

Additionally or alternatively, the communications manager 1020 may support wireless communication at a first UE in accordance with examples as disclosed herein. In some examples, the configuration reception component 1025 may be configured as or otherwise support a means for receiving a configuration associated with mapping communication resources allocated for a sidelink control channel and a sidelink data channel to corresponding physical communication resources, the configuration for a communication resource pool that includes first communication resources allocated to the first UE for the sidelink control channel and the sidelink data channel. In some examples, the resource mapping component 1030 may be configured as or otherwise support a means for mapping, based on the configuration, indexes of a set of multiple logical communication resource units of the first communication resources to a indexes of a set of multiple physical communication resource units of second communication resources for the sidelink control channel and the sidelink data channel, the set of multiple logical communication resource units and the set of multiple physical communication resource units each including a first quantity of REs and a second quantity of symbols. In some examples, the sidelink communication component 1035 may be configured as or otherwise support a means for communicating with a second UE using the second communication resources.

In some examples, the first communication resources allocated for the sidelink control channel occupy a first bandwidth and the second communication resources for the sidelink control channel cover a second bandwidth greater than the first bandwidth.

In some examples, the resource mapping component 1030 may be configured as or otherwise support a means for mapping consecutive even indexes of a set of multiple logical communication resource units to consecutive indexes of a first subset of a set of multiple physical communication resource units. In some examples, the resource mapping component 1030 may be configured as or otherwise support a means for mapping consecutive odd indexes of the set of multiple logical communication resource units to consecutive indexes of a second subset of the set of multiple physical communication resource units.

In some examples, indexes of the set of multiple physical communication resource units that are associated with consecutive indexes of the set of multiple logical communication resource units are separated by an index offset.

In some examples, the configuration reception component 1025 may be configured as or otherwise support a means for receiving signaling from a base station, a broadcast UE, or both, indicating the configuration.

Figure 11:
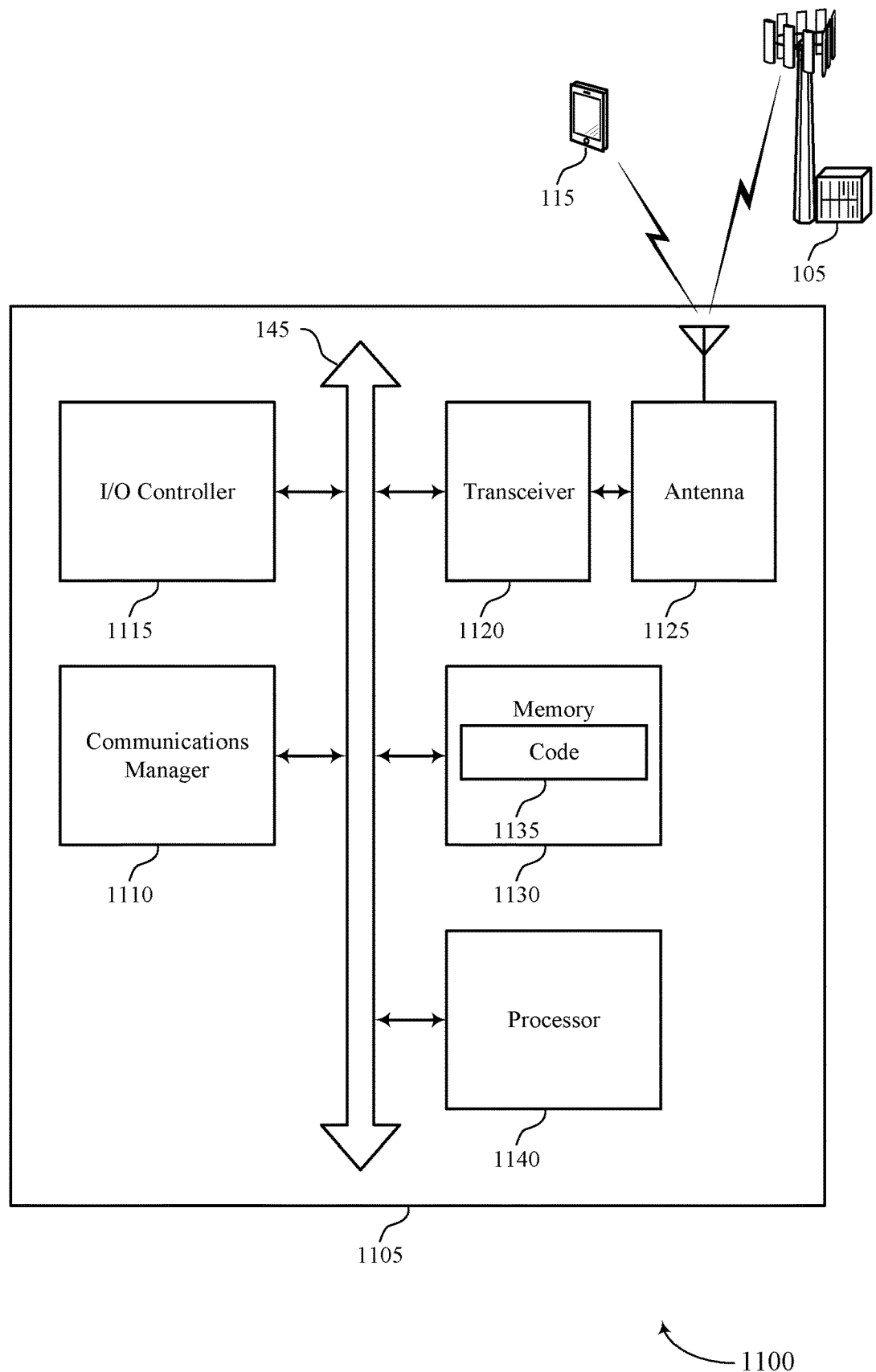
FIG. 11 shows a diagram of a system including a device that supports sidelink communication reliability in accordance with one or more aspects of the present disclosure.

FIG. 11 shows a diagram of a system 1100 including a device 1105 that supports sidelink communication reliability in accordance with one or more aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may support wireless communication at a first UE in accordance with examples as disclosed herein. For example, the communications manager 1110 may be configured as or otherwise support a means for receiving a configuration associated with mapping communication resources allocated for a sidelink control channel and a sidelink data channel to corresponding physical communication resources. The communications manager 1110 may be configured as or otherwise support a means for mapping, based on the configuration, first communication resources allocated to the first UE for the sidelink control channel and the sidelink data channel to second communication resources for the sidelink control channel and the sidelink data channel, the first communication resources allocated for the sidelink control channel occupying a first bandwidth and the second communication resources for the sidelink control channel covering a second bandwidth greater than the first bandwidth. The communications manager 1110 may be configured as or otherwise support a means for communicating with a second UE using the second communication resources.

Additionally or alternatively, the communications manager 1110 may support wireless communication at a UE in accordance with examples as disclosed herein. For example, the communications manager 1110 may be configured as or otherwise support a means for receiving signaling that indicates a communication resource pool including one or more contention-based communication resources for sidelink communications. The communications manager 1110 may be configured as or otherwise support a means for receiving signaling that indicates a quantity of repetitions associated with the communication resource pool. The communications manager 1110 may be configured as or otherwise support a means for communicating, using contention-based communication resources from the communication resource pool, a repetition of the sidelink communication in each of a number of consecutive time periods associated with the quantity of repetitions, each repetition of the sidelink communication being unassociated with control information used for scheduling.

Additionally or alternatively, the communications manager 1110 may support wireless communication at a first UE in accordance with examples as disclosed herein. For example, the communications manager 1110 may be configured as or otherwise support a means for receiving a configuration associated with mapping communication resources allocated for a sidelink control channel and a sidelink data channel to corresponding physical communication resources, the configuration applicable to a communication resource pool that includes first communication resources allocated to the first UE for the sidelink control channel and the sidelink data channel. The communications manager 1110 may be configured as or otherwise support a means for mapping, based on the configuration, a logical communication resource unit of the first communication resources to a physical communication resource unit of second communication resources for the sidelink control channel and the sidelink data channel, the logical communication resource unit and the physical communication resource unit each including a first quantity of REs and a second quantity of symbols. The communications manager 1110 may be configured as or otherwise support a means for communicating with a second UE using the second communication resources.

Additionally or alternatively, the communications manager 1110 may support wireless communication at a first UE in accordance with examples as disclosed herein. For example, the communications manager 1110 may be configured as or otherwise support a means for receiving a configuration associated with mapping communication resources allocated for a sidelink control channel and a sidelink data channel to corresponding physical communication resources, the configuration for a communication resource pool that includes first communication resources allocated to the first UE for the sidelink control channel and the sidelink data channel. The communications manager 1110 may be configured as or otherwise support a means for mapping, based on the configuration, indexes of a set of multiple logical communication resource units of the first communication resources to a indexes of a set of multiple physical communication resource units of second communication resources for the sidelink control channel and the sidelink data channel, the set of multiple logical communication resource units and the set of multiple physical communication resource units each including a first quantity of REs and a second quantity of symbols. The communications manager 1110 may be configured as or otherwise support a means for communicating with a second UE using the second communication resources.

The communications manager 1110 may receive a configuration associated with mapping communication resources allocated for a sidelink control channel and a sidelink data channel to corresponding physical communication resources, identify first communication resources allocated to the first UE for the sidelink control channel and the sidelink data channel, the first communication resources allocated for the sidelink control channel occupying a first bandwidth, map, based on the configuration, the first communication resources to second communication resources for the sidelink control channel and the sidelink data channel, the second communication resources for the sidelink control channel covering a second bandwidth greater than the first bandwidth, and communicate with a second UE using the second communication resources.

The communications manager 1110 may also identify a quantity of repetitions associated with a sidelink communication, identify a communication resource pool including one or more contention-based communication resources for sidelink communications, and communicate, using contention-based communication resources from the communication resource pool, a repetition of the sidelink communication in each of a number of consecutive time periods associated with the quantity of repetitions, where each repetition of the sidelink communication is unassociated with control information used for scheduling.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random access memory (RAM) and read only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting sidelink communication reliability).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
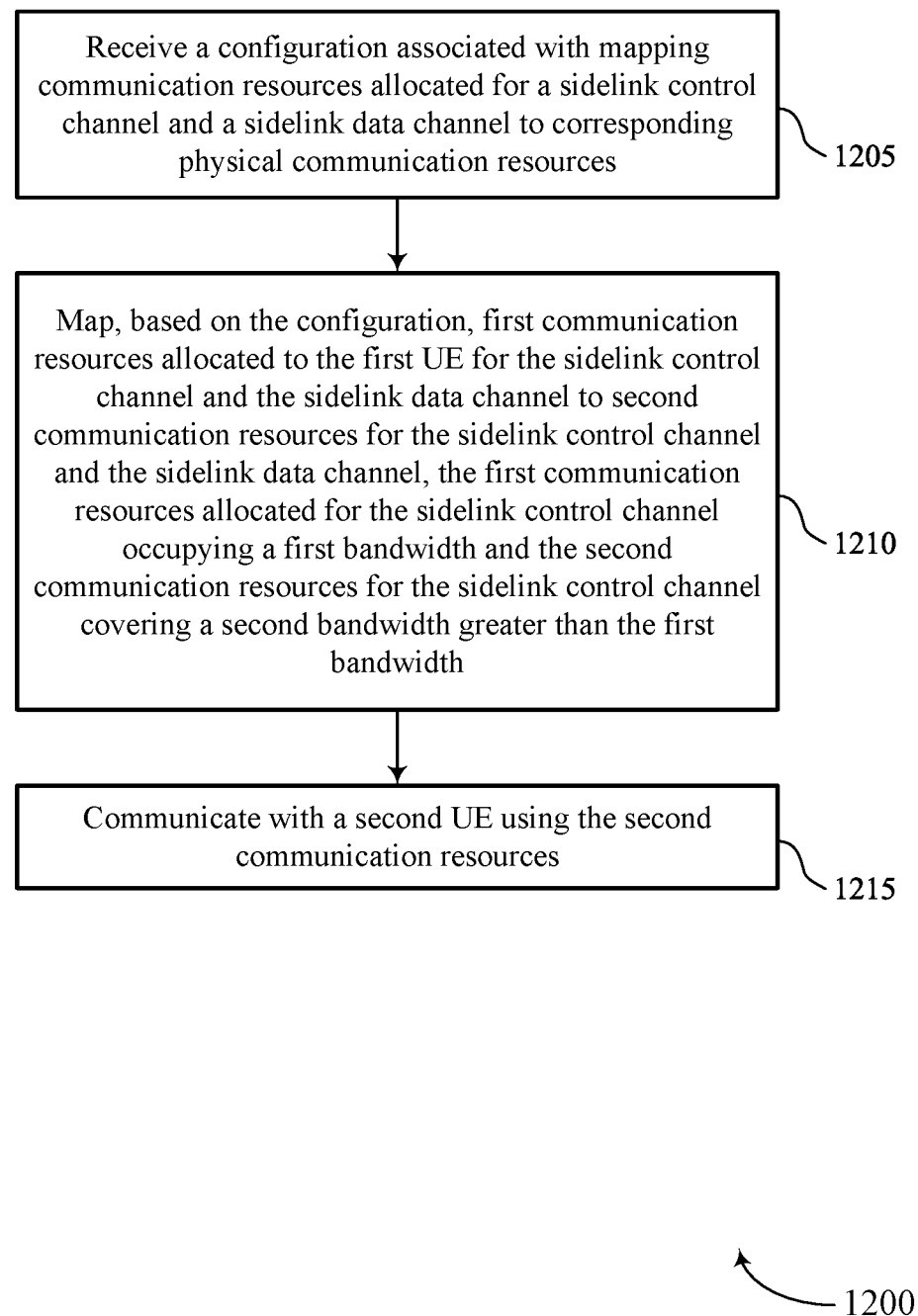
FIGS. 12 through 19 show flowcharts illustrating methods that support sidelink communication reliability in accordance with one or more aspects of the present disclosure.

FIG. 12 shows a flowchart illustrating a method 1200 that supports sidelink communication reliability in accordance with aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1205, the method may include receiving a configuration associated with mapping communication resources allocated for a sidelink control channel and a sidelink data channel to corresponding physical communication resources. The operations of 1205 may be performed in accordance with examples as disclosed herein. In some examples, aspects of the operations of 1205 may be performed by a configuration reception component 1025 as described with reference to FIG. 10.

At 1210, the method may include mapping, based on the configuration, first communication resources allocated to the first UE for the sidelink control channel and the sidelink data channel to second communication resources for the sidelink control channel and the sidelink data channel, the first communication resources allocated for the sidelink control channel occupying a first bandwidth and the second communication resources for the sidelink control channel covering a second bandwidth greater than the first bandwidth. The operations of 1210 may be performed in accordance with examples as disclosed herein. In some examples, aspects of the operations of 1210 may be performed by a resource mapping component 1030 as described with reference to FIG. 10.

At 1215, the method may include communicating with a second UE using the second communication resources. The operations of 1215 may be performed in accordance with examples as disclosed herein. In some examples, aspects of the operations of 1215 may be performed by a sidelink communication component 1035 as described with reference to FIG. 10.

Figure 13:
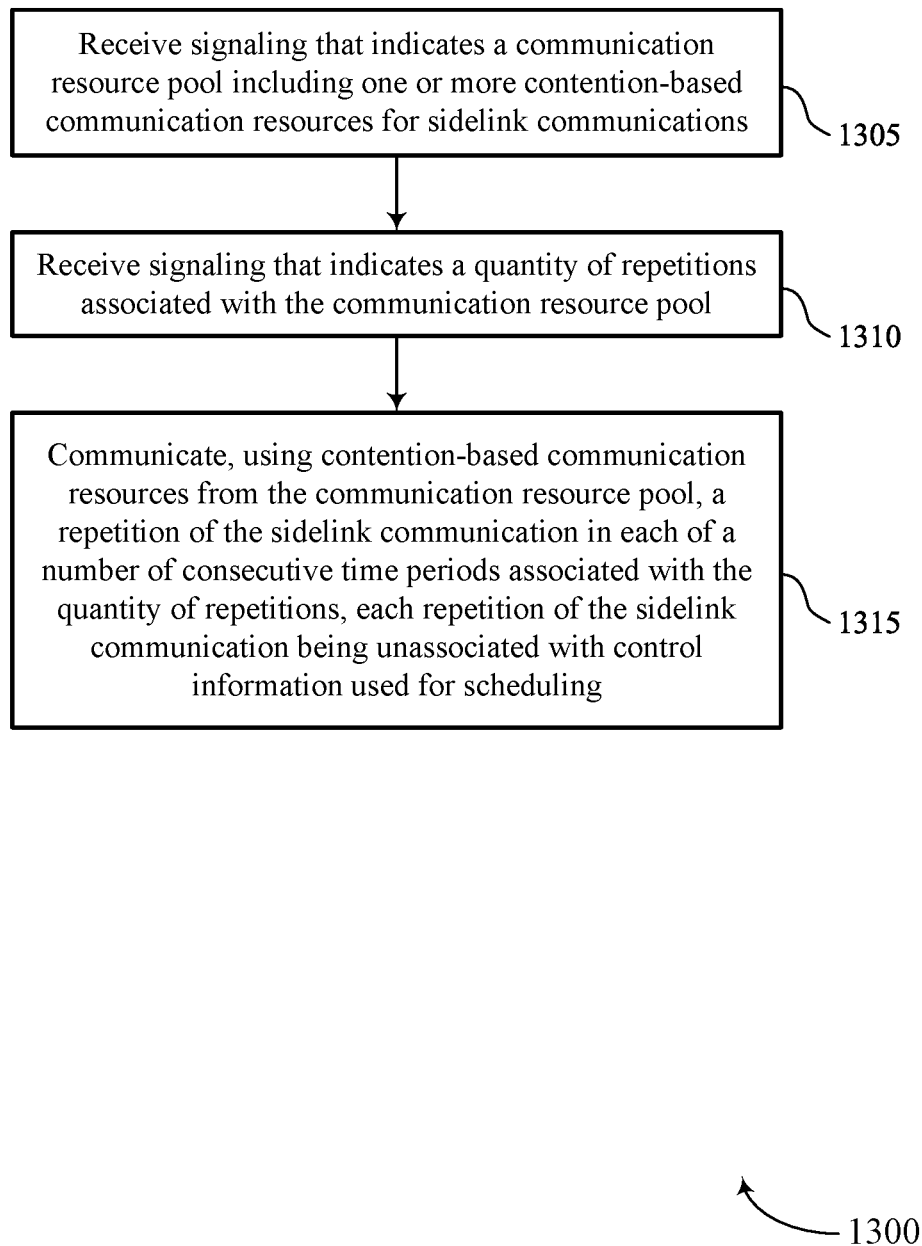

FIG. 13 shows a flowchart illustrating a method 1300 that supports sidelink communication reliability in accordance with aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1305, the method may include receiving signaling that indicates a communication resource pool including one or more contention-based communication resources for sidelink communications. The operations of 1305 may be performed in accordance with examples as disclosed herein. In some examples, aspects of the operations of 1305 may be performed by a sidelink resource pool component 1040 as described with reference to FIG. 10.

At 1310, the method may include receiving signaling that indicates a quantity of repetitions associated with the communication resource pool. The operations of 1310 may be performed in accordance with examples as disclosed herein. In some examples, aspects of the operations of 1310 may be performed by a sidelink repetition component 1045 as described with reference to FIG. 10.

At 1315, the method may include communicating, using contention-based communication resources from the communication resource pool, a repetition of the sidelink communication in each of a number of consecutive time periods associated with the quantity of repetitions, each repetition of the sidelink communication being unassociated with control information used for scheduling. The operations of 1315 may be performed in accordance with examples as disclosed herein. In some examples, aspects of the operations of 1315 may be performed by a sidelink communication component 1035 as described with reference to FIG. 10.

Figure 14:
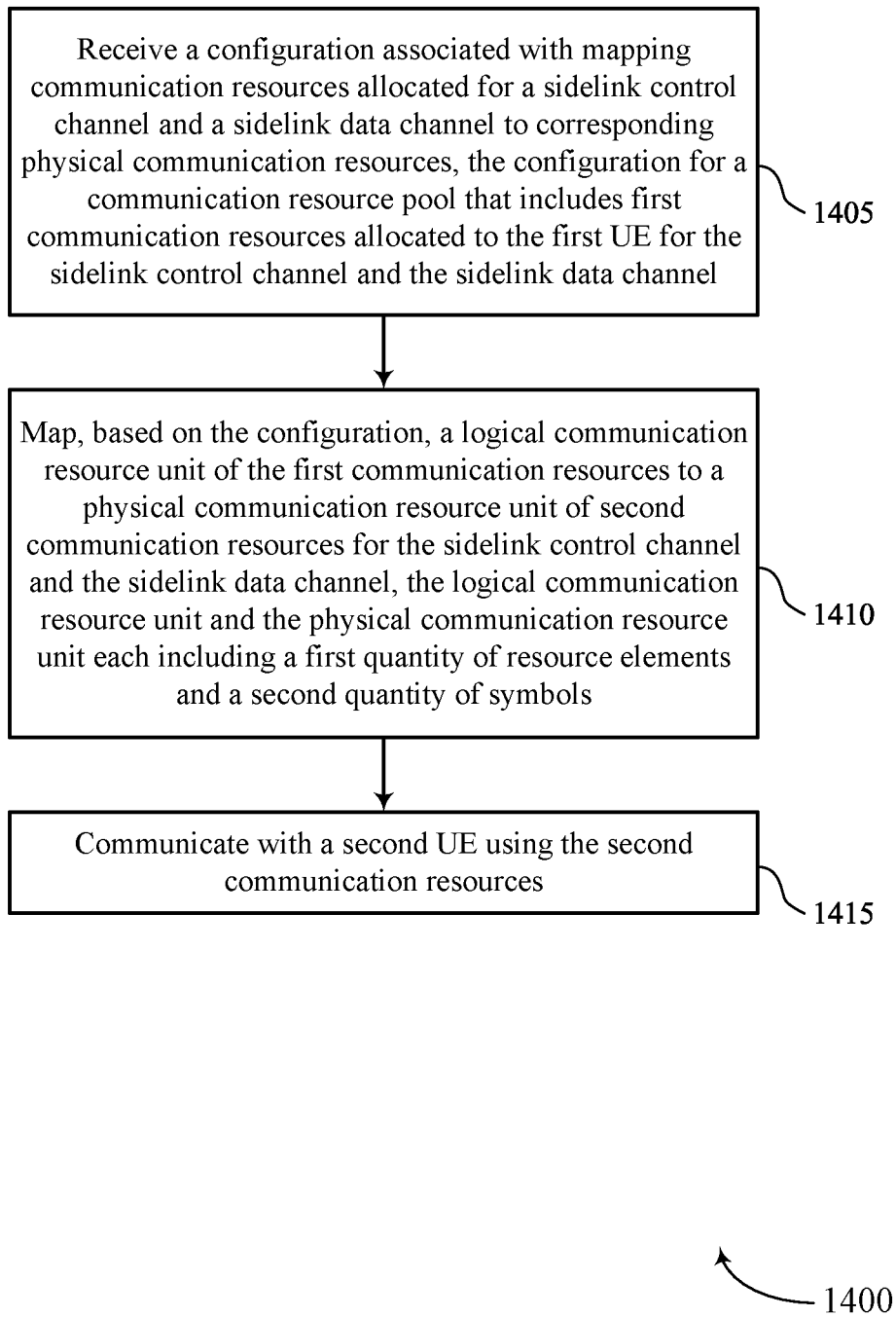

FIG. 14 shows a flowchart illustrating a method 1400 that supports sidelink communication reliability in accordance with aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1405, the method may include receiving a configuration associated with mapping communication resources allocated for a sidelink control channel and a sidelink data channel to corresponding physical communication resources, the configuration applicable to a communication resource pool that includes first communication resources allocated to the first UE for the sidelink control channel and the sidelink data channel. The operations of 1405 may be performed in accordance with examples as disclosed herein. In some examples, aspects of the operations of 1405 may be performed by a configuration reception component 1025 as described with reference to FIG. 10.

At 1410, the method may include mapping, based on the configuration, a logical communication resource unit of the first communication resources to a physical communication resource unit of second communication resources for the sidelink control channel and the sidelink data channel, the logical communication resource unit and the physical communication resource unit each including a first quantity of REs and a second quantity of symbols. The operations of 1410 may be performed in accordance with examples as disclosed herein. In some examples, aspects of the operations of 1410 may be performed by a resource mapping component 1030 as described with reference to FIG. 10.

At 1415, the method may include communicating with a second UE using the second communication resources. The operations of 1415 may be performed in accordance with examples as disclosed herein. In some examples, aspects of the operations of 1415 may be performed by a sidelink communication component 1035 as described with reference to FIG. 10.

Figure 15:
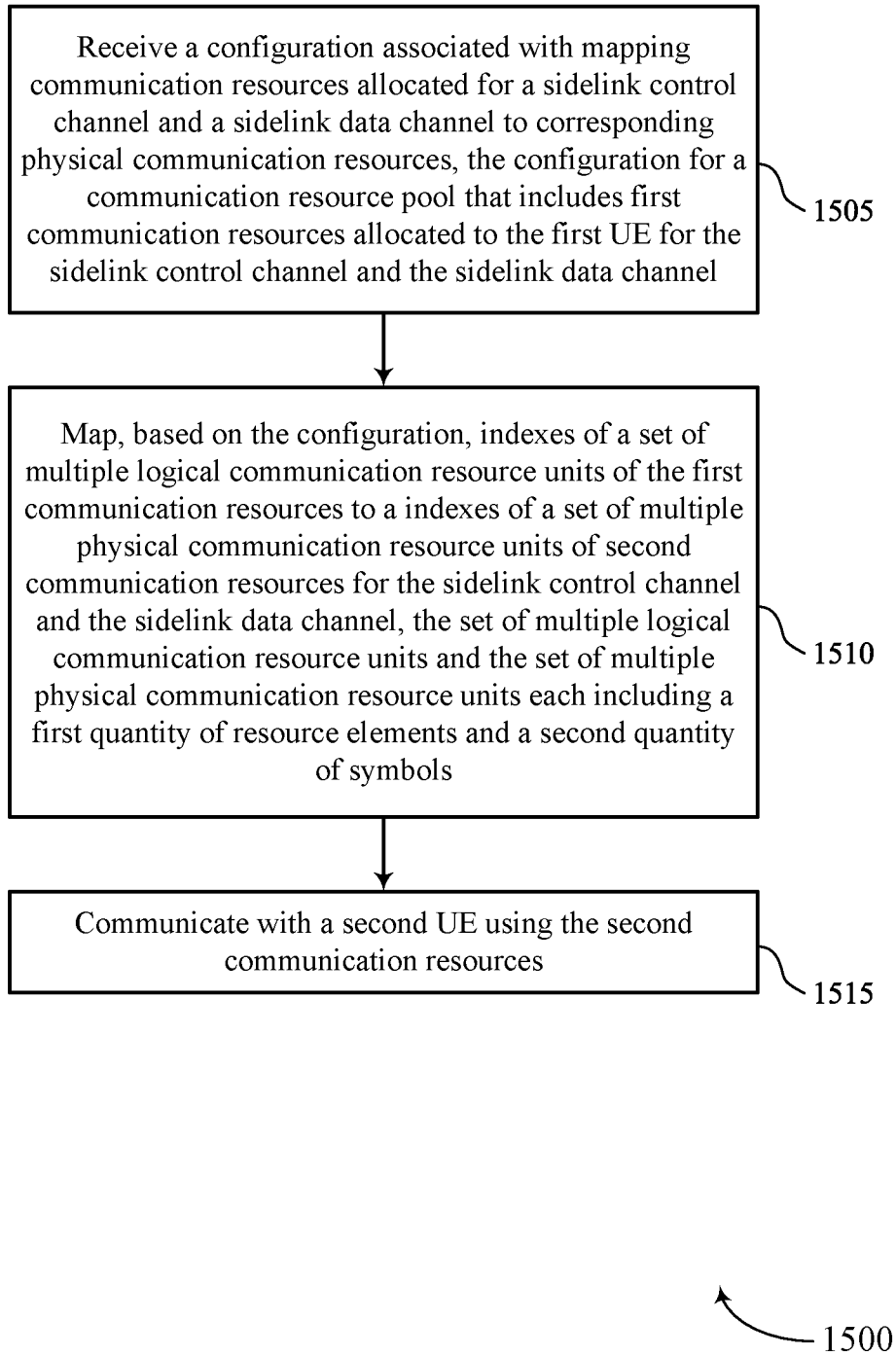

FIG. 15 shows a flowchart illustrating a method 1500 that supports sidelink communication reliability in accordance with aspects of the present disclosure. The operations of the method 1500 may be implemented by a UE or its components as described herein. For example, the operations of the method 1500 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1505, the method may include receiving a configuration associated with mapping communication resources allocated for a sidelink control channel and a sidelink data channel to corresponding physical communication resources, the configuration for a communication resource pool that includes first communication resources allocated to the first UE for the sidelink control channel and the sidelink data channel. The operations of 1505 may be performed in accordance with examples as disclosed herein. In some examples, aspects of the operations of 1505 may be performed by a configuration reception component 1025 as described with reference to FIG. 10.

At 1510, the method may include mapping, based on the configuration, indexes of a set of multiple logical communication resource units of the first communication resources to a indexes of a set of multiple physical communication resource units of second communication resources for the sidelink control channel and the sidelink data channel, the set of multiple logical communication resource units and the set of multiple physical communication resource units each including a first quantity of REs and a second quantity of symbols. The operations of 1510 may be performed in accordance with examples as disclosed herein. In some examples, aspects of the operations of 1510 may be performed by a resource mapping component 1030 as described with reference to FIG. 10.

At 1515, the method may include communicating with a second UE using the second communication resources. The operations of 1515 may be performed in accordance with examples as disclosed herein. In some examples, aspects of the operations of 1515 may be performed by a sidelink communication component 1035 as described with reference to FIG. 10.

Figure 16:
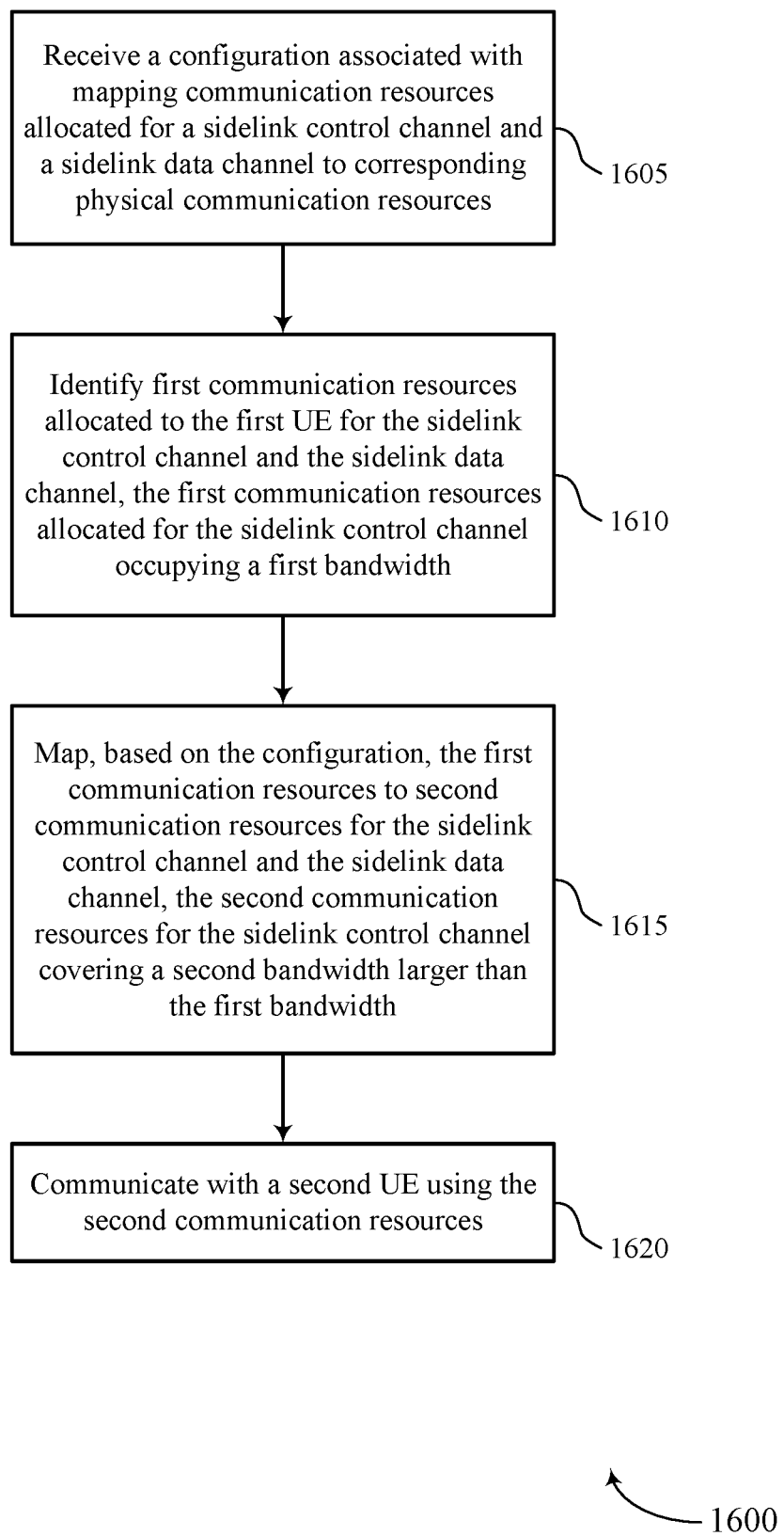

FIG. 16 shows a flowchart illustrating a method 1600 that supports sidelink communication reliability in accordance with one or more aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive a configuration associated with mapping communication resources allocated for a sidelink control channel and a sidelink data channel to corresponding physical communication resources. The operations of 1605 may be performed according to the methods described herein. In some examples, aspects of the operations of 1605 may be performed by a configuration reception component as described with reference to FIGS. 8 through 11.

At 1610, the UE may identify first communication resources allocated to the first UE for the sidelink control channel and the sidelink data channel, the first communication resources allocated for the sidelink control channel occupying a first bandwidth. The operations of 1610 may be performed according to the methods described herein. In some examples, aspects of the operations of 1610 may be performed by a first communication resource component as described with reference to FIGS. 8 through 11.

At 1615, the UE may map, based on the configuration, the first communication resources to second communication resources for the sidelink control channel and the sidelink data channel, the second communication resources for the sidelink control channel covering a second bandwidth greater than the first bandwidth. The operations of 1615 may be performed according to the methods described herein. In some examples, aspects of the operations of 1615 may be performed by a second communication resource component as described with reference to FIGS. 8 through 11.

At 1620, the UE may communicate with a second UE using the second communication resources. The operations of 1620 may be performed according to the methods described herein. In some examples, aspects of the operations of 1620 may be performed by a sidelink communication component as described with reference to FIGS. 8 through 11.

Figure 17:
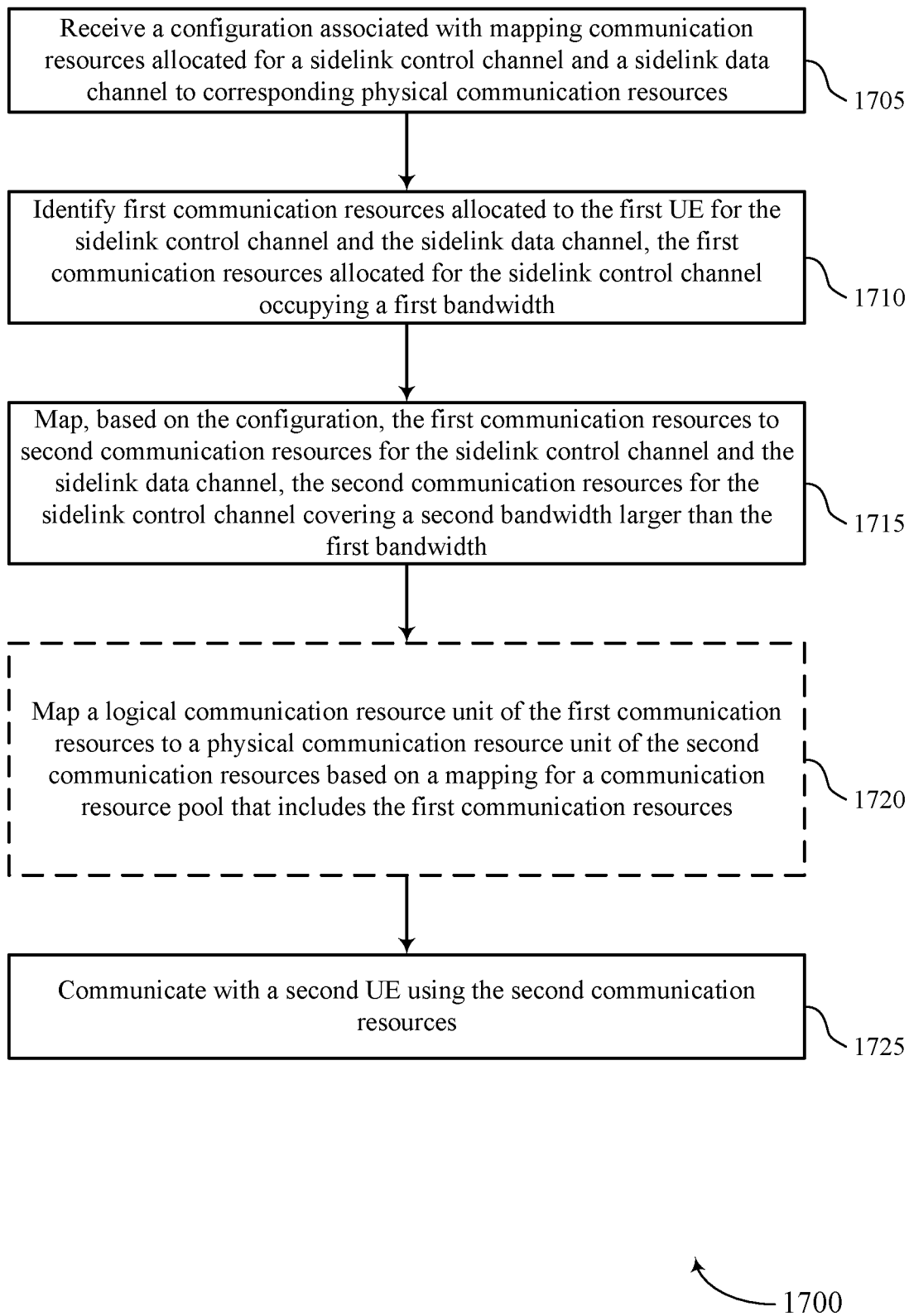

FIG. 17 shows a flowchart illustrating a method 1700 that supports sidelink communication reliability in accordance with one or more aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive a configuration associated with mapping communication resources allocated for a sidelink control channel and a sidelink data channel to corresponding physical communication resources. The operations of 1705 may be performed according to the methods described herein. In some examples, aspects of the operations of 1705 may be performed by a configuration reception component as described with reference to FIGS. 8 through 11.

At 1710, the UE may identify first communication resources allocated to the first UE for the sidelink control channel and the sidelink data channel, the first communication resources allocated for the sidelink control channel occupying a first bandwidth. The operations of 1710 may be performed according to the methods described herein. In some examples, aspects of the operations of 1710 may be performed by a first communication resource component as described with reference to FIGS. 8 through 11.

At 1715, the UE may map, based on the configuration, the first communication resources to second communication resources for the sidelink control channel and the sidelink data channel, the second communication resources for the sidelink control channel covering a second bandwidth greater than the first bandwidth. The operations of 1715 may be performed according to the methods described herein. In some examples, aspects of the operations of 1715 may be performed by a second communication resource component as described with reference to FIGS. 8 through 11.

At 1720, the UE may map a logical communication resource unit of the first communication resources to a physical communication resource unit of the second communication resources based on a mapping for a communication resource pool that includes the first communication resources, where the logical communication resource unit and the physical communication resource unit each include a first quantity of resource elements and a second quantity of symbols. The operations of 1720 may be performed according to the methods described herein. In some examples, aspects of the operations of 1720 may be performed by a second communication resource component as described with reference to FIGS. 8 through 11.

At 1725, the UE may communicate with a second UE using the second communication resources. The operations of 1725 may be performed according to the methods described herein. In some examples, aspects of the operations of 1725 may be performed by a sidelink communication component as described with reference to FIGS. 8 through 11.

Figure 18:
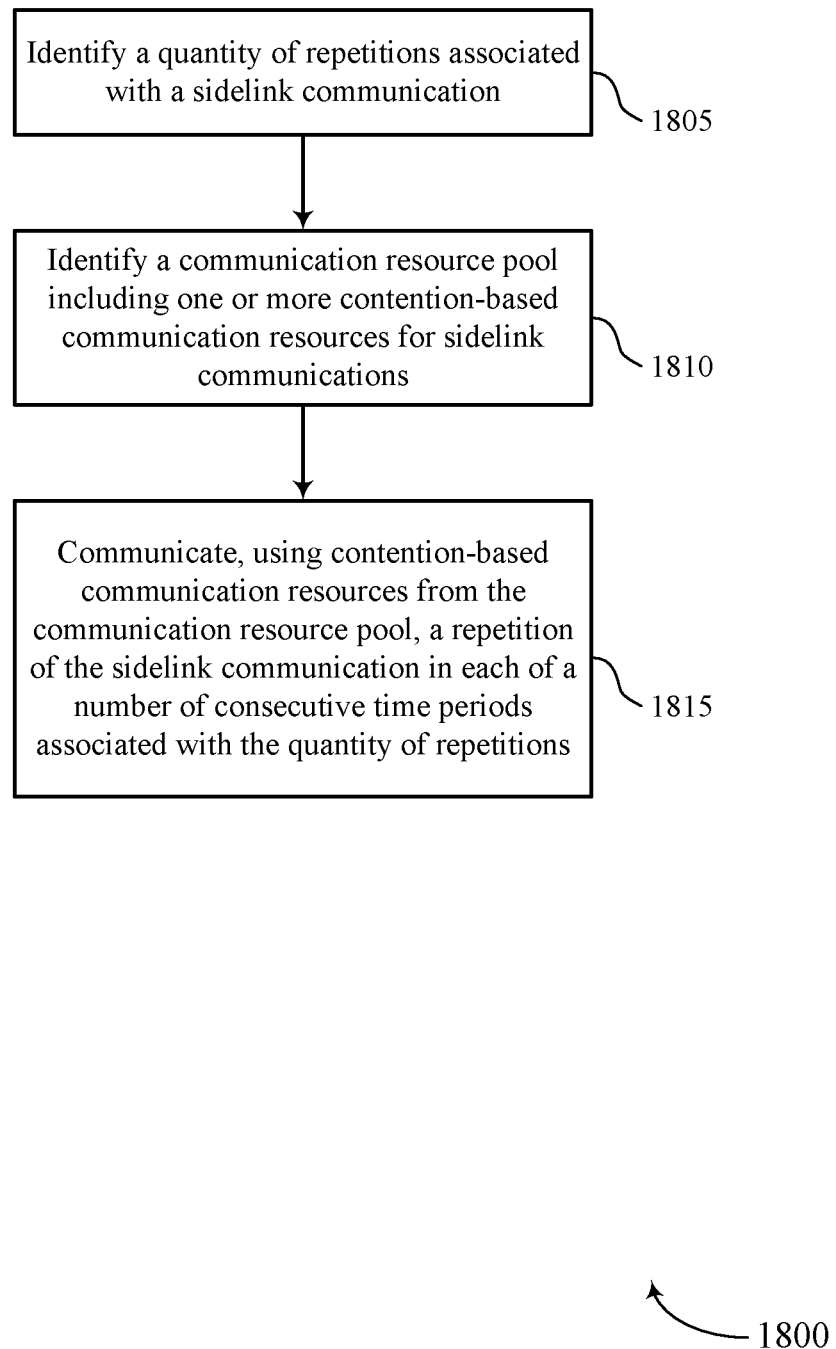

FIG. 18 shows a flowchart illustrating a method 1800 that supports sidelink communication reliability in accordance with one or more aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may identify a quantity of repetitions associated with a sidelink communication. The operations of 1805 may be performed according to the methods described herein. In some examples, aspects of the operations of 1805 may be performed by a sidelink repetition component as described with reference to FIGS. 8 through 11.

At 1810, the UE may identify a communication resource pool including one or more contention-based communication resources for sidelink communications. The operations of 1810 may be performed according to the methods described herein. In some examples, aspects of the operations of 1810 may be performed by a resource pool identification component as described with reference to FIGS. 8 through 11.

At 1815, the UE may communicate, using contention-based communication resources from the communication resource pool, a repetition of the sidelink communication in each of a number of consecutive time periods associated with the quantity of repetitions, where each repetition of the sidelink communication is unassociated with control information used for scheduling. The operations of 1815 may be performed according to the methods described herein. In some examples, aspects of the operations of 1815 may be performed by a sidelink communication component as described with reference to FIGS. 8 through 11.

Figure 19:
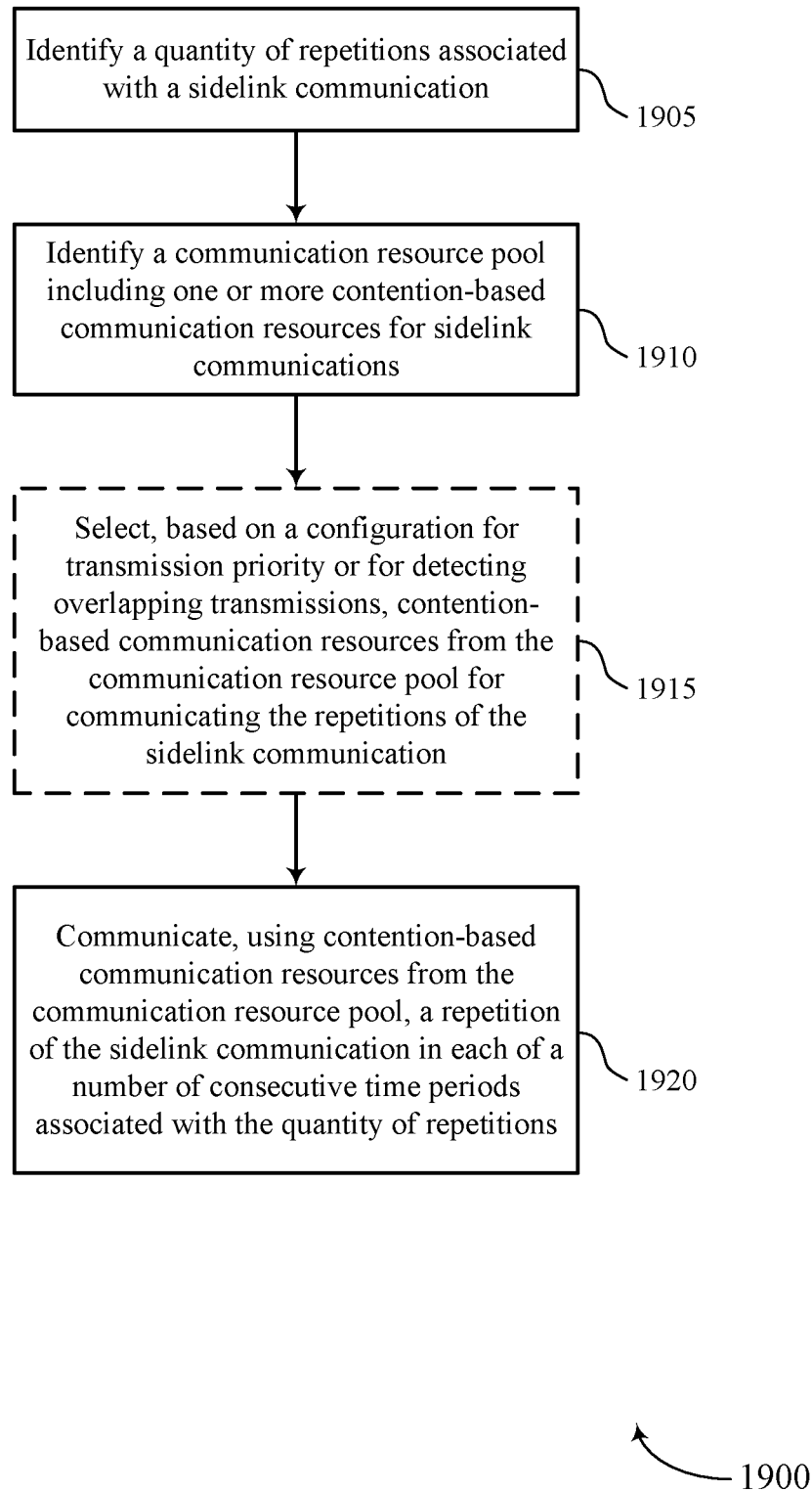

FIG. 19 shows a flowchart illustrating a method 1900 that supports sidelink communication reliability in accordance with one or more aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may identify a quantity of repetitions associated with a sidelink communication. The operations of 1905 may be performed according to the methods described herein. In some examples, aspects of the operations of 1905 may be performed by a sidelink repetition component as described with reference to FIGS. 8 through 11.

At 1910, the UE may identify a communication resource pool including one or more contention-based communication resources for sidelink communications. The operations of 1910 may be performed according to the methods described herein. In some examples, aspects of the operations of 1910 may be performed by a resource pool identification component as described with reference to FIGS. 8 through 11.

At 1915, the UE may select, based on a configuration for transmission priority or for detecting overlapping transmissions, contention-based communication resources from the communication resource pool for communicating the repetitions of the sidelink communication. The operations of 1915 may be performed according to the methods described herein. In some examples, aspects of the operations of 1915 may be performed by a resource pool identification component as described with reference to FIGS. 8 through 11.

At 1920, the UE may communicate, using contention-based communication resources from the communication resource pool, a repetition of the sidelink communication in each of a number of consecutive time periods associated with the quantity of repetitions, where each repetition of the sidelink communication is unassociated with control information used for scheduling. The operations of 1920 may be performed according to the methods described herein. In some examples, aspects of the operations of 1920 may be performed by a sidelink communication component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first UE, comprising: receiving a configuration associated with mapping communication resources allocated for a sidelink control channel and a sidelink data channel to corresponding physical communication resources; mapping, based at least in part on the configuration, first communication resources allocated to the first UE for the sidelink control channel and the sidelink data channel to second communication resources for the sidelink control channel and the sidelink data channel, the first communication resources allocated for the sidelink control channel occupying a first bandwidth and the second communication resources for the sidelink control channel covering a second bandwidth greater than the first bandwidth; and communicating with a second UE using the second communication resources.

Aspect 2: The method of aspect 1, the mapping the first communication resources to the second communication resources comprising: mapping consecutive symbols of a first stage SCI to a same first frequency range, at least two subsets of the first stage SCI being separated by a frequency range; and mapping consecutive symbols of a second stage SCI to a same second frequency range different from and interlaced with the first frequency range.

Aspect 3: The method of aspect 2, further comprising: multiplexing the first stage SCI and the second stage SCI to cover a bandwidth of a sidelink sub-channel.

Aspect 4: The method of any of aspects 2 through 3, further comprising: multiplexing the first stage SCI and the second stage SCI to cover a bandwidth greater than a sidelink sub-channel.

Aspect 5: The method of any of aspects 1 through 4, the mapping the first communication resources to the second communication resources comprising: mapping consecutive symbols of a first stage SCI to at least partially different first frequency ranges; and mapping consecutive symbols of a second stage SCI to at least partially different second frequency ranges interlaced with respective first frequency ranges.

Aspect 6: The method of aspect 5, further comprising: multiplexing the first stage SCI and the second stage SCI to cover a bandwidth of a sidelink sub-channel.

Aspect 7: The method of any of aspects 5 through 6, further comprising: multiplexing the first stage SCI and the second stage SCI to cover a bandwidth greater than a sidelink sub-channel.

Aspect 8: The method of any of aspects 1 through 7, the second bandwidth comprising the second communication resources different from the first communication resources.

Aspect 9: The method of any of aspects 1 through 8, the receiving the configuration comprising: receiving signaling from a base station, a broadcast UE, or both, indicating the configuration.

Aspect 10: A method for wireless communication at a UE, comprising: receiving signaling that indicates a communication resource pool comprising one or more contention-based communication resources for sidelink communications; receiving signaling that indicates a quantity of repetitions associated with the communication resource pool; and communicating, using contention-based communication resources from the communication resource pool, a repetition of the sidelink communication in each of a number of consecutive time periods associated with the quantity of repetitions, each repetition of the sidelink communication being unassociated with control information used for scheduling.

Aspect 11: The method of aspect 10, further comprising: selecting, based at least in part on a configuration for transmission priority or for detecting overlapping transmissions, contention-based communication resources from the communication resource pool for communicating the repetitions of the sidelink communication.

Aspect 12: The method of any of aspects 10 through 11, the communicating the repetitions of the sidelink communication comprising: communicating consecutive repetitions of the sidelink communication using at least partially different frequency ranges.

Aspect 13: The method of any of aspects 10 through 12, further comprising: identifying a RV-ID for each of the repetitions of the sidelink communication based at least in part on a configured pattern of RV-IDs.

Aspect 14: The method of any of aspects 10 through 13, further comprising: receiving first signaling from a broadcast UE, the first signaling indicating the communication resource pool, the quantity of repetitions, or both.

Aspect 15: The method of any of aspects 10 through 14, further comprising: receiving first signaling from a base station, the first signaling indicating the communication resource pool, the quantity of repetitions, or both.

Aspect 16: The method of any of aspects 10 through 15, further comprising: performing a combining process based at least in part on the repetitions of the sidelink communication.

Aspect 17: The method of any of aspects 10 through 16, the quantity of repetitions being associated with feedback.

Aspect 18: The method of any of aspects 10 through 16, the quantity of repetitions being unassociated with feedback.

Aspect 19: A method for wireless communication at a first UE, comprising: receiving a configuration associated with mapping communication resources allocated for a sidelink control channel and a sidelink data channel to corresponding physical communication resources, the configuration applicable to a communication resource pool that comprises first communication resources allocated to the first UE for the sidelink control channel and the sidelink data channel; mapping, based at least in part on the configuration, a logical communication resource unit of the first communication resources to a physical communication resource unit of second communication resources for the sidelink control channel and the sidelink data channel, the logical communication resource unit and the physical communication resource unit each comprising a first quantity of REs and a second quantity of symbols; and communicating with a second UE using the second communication resources.

Aspect 20: The method of aspect 19, the first communication resources allocated for the sidelink control channel occupying a first bandwidth and the second communication resources for the sidelink control channel covering a second bandwidth greater than the first bandwidth.

Aspect 21: The method of any of aspects 19 through 20, the first quantity of REs and the second quantity of symbols based at least in part on a type of communication, the type of communication comprising control information or data or both.

Aspect 22: The method of any of aspects 19 through 21, the first quantity of REs and the second quantity of symbols based at least in part on the communication resource pool or a type of traffic of the communication resource pool, or both.

Aspect 23: The method of any of aspects 19 through 22, further comprising: mapping an AGC communication to a range of frequencies covered in a first symbol of the second communication resources.

Aspect 24: The method of any of aspects 19 through 22, further comprising: mapping an AGC communication to a range of frequencies covered in all of the symbols of the second communication resources.

Aspect 25: The method of any of aspects 19 through 24, the receiving the configuration comprising: receiving signaling from a base station, a broadcast UE, or both, indicating the configuration.

Aspect 26: A method for wireless communication at a first UE, comprising: receiving a configuration associated with mapping communication resources allocated for a sidelink control channel and a sidelink data channel to corresponding physical communication resources, the configuration for a communication resource pool that comprises first communication resources allocated to the first UE for the sidelink control channel and the sidelink data channel; mapping, based at least in part on the configuration, indexes of a plurality of logical communication resource units of the first communication resources to a indexes of a plurality of physical communication resource units of second communication resources for the sidelink control channel and the sidelink data channel, the plurality of logical communication resource units and the plurality of physical communication resource units each comprising a first quantity of REs and a second quantity of symbols; and communicating with a second UE using the second communication resources.

Aspect 27: The method of aspect 26, the first communication resources allocated for the sidelink control channel occupying a first bandwidth and the second communication resources for the sidelink control channel covering a second bandwidth greater than the first bandwidth.

Aspect 28: The method of any of aspects 26 through 27, further comprising: mapping consecutive even indexes of a plurality of logical communication resource units to consecutive indexes of a first subset of a plurality of physical communication resource units; and mapping consecutive odd indexes of the plurality of logical communication resource units to consecutive indexes of a second subset of the plurality of physical communication resource units.

Aspect 29: The method of any of aspects 26 through 27, wherein indexes of the plurality of physical communication resource units that are associated with consecutive indexes of the plurality of logical communication resource units are separated by an index offset.

Aspect 30: The method of any of aspects 26 through 29, the receiving the configuration comprising: receiving signaling from a base station, a broadcast UE, or both, indicating the configuration.

Aspect 31: A method for wireless communication at a first UE, comprising: receiving a configuration associated with mapping communication resources allocated for a sidelink control channel and a sidelink data channel to corresponding physical communication resources; identifying first communication resources allocated to the first UE for the sidelink control channel and the sidelink data channel, the first communication resources allocated for the sidelink control channel occupying a first bandwidth; mapping, based at least in part on the configuration, the first communication resources to second communication resources for the sidelink control channel and the sidelink data channel, the second communication resources for the sidelink control channel covering a second bandwidth greater than the first bandwidth; and communicating with a second UE using the second communication resources.

Aspect 32: The method of aspect 31, wherein the second bandwidth comprises communication resources for one or more UEs different from the first UE.

Aspect 33: The method of any of aspects 31 or 32, the mapping the first communication resources to the second communication resources comprising: mapping consecutive symbols of a first stage SCI to at least partially different first frequency ranges; and mapping consecutive symbols of a second stage SCI to at least partially different second frequency ranges interlaced with respective first frequency ranges.

Aspect 34: The method of aspect 33, further comprising: multiplexing the first stage SCI and the second stage sidelink control information to cover a bandwidth of a sidelink sub-channel.

Aspect 35: The method of aspect 33, further comprising: multiplexing the first stage SCI and the second stage SCI to cover a bandwidth greater than a sidelink sub-channel.

Aspect 36: The method of any of aspects 31 or 32, the mapping the first communication resources to the second communication resources comprising: mapping consecutive symbols of a first stage SCI to a same first frequency range, wherein at least two subsets of the first stage SCI are separated by a frequency range; and mapping consecutive symbols of a second stage SCI to a same second frequency range different from and interlaced with the first frequency range.

Aspect 37: The method of aspect 36, further comprising: multiplexing the first stage SCI and the second stage sidelink control information to cover a bandwidth of a sidelink sub-channel.

Aspect 38: The method of aspect 36, further comprising: multiplexing the first stage sidelink control information and the second stage sidelink control information to cover a bandwidth greater than a sidelink sub-channel.

Aspect 39: The method of any of aspects 31 through 38, the mapping the first communication resources to the second communication resources comprising: mapping a logical communication resource unit of the first communication resources to a physical communication resource unit of the second communication resources based at least in part on a mapping for a communication resource pool that comprises the first communication resources, wherein the logical communication resource unit and the physical communication resource unit each comprise a first quantity of REs and a second quantity of symbols.

Aspect 40: The method of aspect 39, wherein the first quantity of REs and the second quantity of symbols are based at least in part on a type of communication, wherein the type of communication comprises control information or data or both.

Aspect 41: The method of any of aspects 39 or 40, wherein the first quantity of REs and the second quantity of symbols are based at least in part on the communication resource pool or a type of traffic of the communication resource pool or both.

Aspect 42: The method of any of aspects 39 through 41, further comprising: mapping an AGC communication to a range of frequencies covered in a first symbol of the second communication resources.

Aspect 43: The method of any of aspects 39 through 41, further comprising: mapping an AGC communication to a range of frequencies covered in all of the symbols of the second communication resources.

Aspect 44: The method of any of aspects 39 through 43, further comprising: mapping consecutive even indexes of a plurality of logical communication resource units to consecutive indexes of a first subset of a plurality of physical communication resource units; and mapping consecutive odd indexes of the plurality of logical communication resource units to consecutive indexes of a second subset of the plurality of physical communication resource units.

Aspect 45: The method of any of aspects 39 through 43, further comprising: mapping indexes of a plurality of logical communication resource units to respective indexes of a plurality of physical communication resource units, wherein indexes of the plurality of physical communication resource units that are associated with consecutive indexes of the plurality of logical communication resource units are separated by an index offset.

Aspect 46: A method for wireless communication at a UE, comprising: identifying a quantity of repetitions associated with a sidelink communication; identifying a communication resource pool comprising one or more contention-based communication resources for sidelink communications; and communicating, using contention-based communication resources from the communication resource pool, a repetition of the sidelink communication in each of a number of consecutive time periods associated with the quantity of repetitions, wherein each repetition of the sidelink communication is unassociated with control information used for scheduling.

Aspect 47: The method of aspect 46, further comprising: selecting, based at least in part on a configuration for transmission priority or for detecting overlapping transmissions, contention-based communication resources from the communication resource pool for communicating the repetitions of the sidelink communication.

Aspect 48: The method of any of aspects 46 or 47, the communicating the repetitions of the sidelink communication comprising: communicating consecutive repetitions of the sidelink communication using at least partially different frequency ranges.

Aspect 49: The method of any of aspects 46 through 48, further comprising: identifying an RV-ID for each of the repetitions of the sidelink communication based at least in part on a configured pattern of RV-IDs.

Aspect 50: The method of any of aspects 46 through 49, further comprising: performing a combining process based at least in part on the repetitions of the sidelink communication.

Aspect 51: The method of any of aspects 46 through 50, further comprising: communicating configuration signaling that indicates the quantity of repetitions.

Aspect 52: The method of any of aspects 46 through 51, further comprising: receiving configuration signaling that indicates the communication resource pool.

Aspect 53: The method of any of aspects 46 through 52, wherein the quantity of repetitions is configured for a feedback instance.

Aspect 54: An apparatus for wireless communication at a first UE, comprising a processor; memory coupled with the processor; and instructions stored in the memory and executable by the processor to cause the apparatus to perform a method of any of aspects 1 through 9.

Aspect 55: An apparatus for wireless communication at a first UE, comprising at least one means for performing a method of any of aspects 1 through 9.

Aspect 56: A non-transitory computer-readable medium storing code for wireless communication at a first UE, the code comprising instructions executable by a processor to perform a method of any of aspects 1 through 9.

Aspect 57: An apparatus for wireless communication at a UE, comprising a processor; memory coupled with the processor; and instructions stored in the memory and executable by the processor to cause the apparatus to perform a method of any of aspects 10 through 18.

Aspect 58: An apparatus for wireless communication at a UE, comprising at least one means for performing a method of any of aspects 10 through 18.

Aspect 59: A non-transitory computer-readable medium storing code for wireless communication at a UE, the code comprising instructions executable by a processor to perform a method of any of aspects 10 through 18.

Aspect 60: An apparatus for wireless communication at a first UE, comprising a processor; memory coupled with the processor; and instructions stored in the memory and executable by the processor to cause the apparatus to perform a method of any of aspects 19 through 25.

Aspect 61: An apparatus for wireless communication at a first UE, comprising at least one means for performing a method of any of aspects 19 through 25.

Aspect 62: A non-transitory computer-readable medium storing code for wireless communication at a first UE, the code comprising instructions executable by a processor to perform a method of any of aspects 19 through 25.

Aspect 63: An apparatus for wireless communication at a first UE, comprising a processor; memory coupled with the processor; and instructions stored in the memory and executable by the processor to cause the apparatus to perform a method of any of aspects 26 through 30.

Aspect 64: An apparatus for wireless communication at a first UE, comprising at least one means for performing a method of any of aspects 26 through 30.

Aspect 65: A non-transitory computer-readable medium storing code for wireless communication at a first UE, the code comprising instructions executable by a processor to perform a method of any of aspects 26 through 30.

Aspect 66: An apparatus for wireless communication comprising at least one means for performing a method of any one of aspects 31 through 45.

Aspect 67: An apparatus for wireless communication comprising a processor and memory coupled with the processor, the processor and memory configured to perform a method of any one of aspects 31 through 45.

Aspect 68: A non-transitory computer-readable medium storing code for wireless communication, the code comprising instructions executable by a processor to perform a method of any one of aspects 31 through 45.

Aspect 69: An apparatus for wireless communication comprising at least one means for performing a method of any one of aspects 46 through 53.

Aspect 70: An apparatus for wireless communication comprising a processor and memory coupled with the processor, the processor and memory configured to perform a method of any one of aspects 46 through 53.

Aspect 71: A non-transitory computer-readable medium storing code for wireless communication, the code comprising instructions executable by a processor to perform a method of any one of aspects 46 through 53.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
   receiving a configuration associated with mapping communication resources allocated for a sidelink control channel and a sidelink data channel to corresponding physical communication resources;
   mapping, based at least in part on the configuration, first communication resources allocated to the first UE for a symbol of each portion of sidelink control information to second communication resources for a time period, the mapping comprising:
      mapping, for the time period, consecutive symbols of a first stage sidelink control information to at least partially different first frequency ranges of a sub-channel; and
      mapping, for the time period, consecutive symbols of a second stage sidelink control information to at least partially different second frequency ranges of the sub-channel and interlaced with respective first frequency ranges of the at least partially different first frequency ranges of the sub-channel; and
   communicating with a second UE using the second communication resources.

2. The method of claim 1, the mapping the first communication resources to the second communication resources comprising:
- mapping, for the time period, consecutive symbols of an additional first stage sidelink control information to a same third frequency range, at least two subsets of the additional first stage sidelink control information being separated by a fourth frequency range; and
- mapping, for the time period, consecutive symbols of an additional second stage sidelink control information to a same fifth frequency range different from and interlaced with the third frequency range.

3. The method of claim 2, further comprising:
- multiplexing the additional first stage sidelink control information and the additional second stage sidelink control information to cover a bandwidth of a sidelink sub-channel.

4. The method of claim 2, further comprising:
- multiplexing the additional first stage sidelink control information and the additional second stage sidelink control information to cover a bandwidth greater than a sidelink sub-channel.

5. The method of claim 1, further comprising:
- multiplexing the first stage sidelink control information and the second stage sidelink control information to cover a bandwidth of a sidelink sub-channel.

6. The method of claim 1, further comprising:
- multiplexing the first stage sidelink control information and the second stage sidelink control information to cover a bandwidth greater than a sidelink sub-channel.

7. The method of claim 1, wherein a second bandwidth that comprises the second communication resources is different from a first bandwidth that comprises the first communication resources.

8. The method of claim 1, the receiving the configuration comprising:
- receiving signaling from a network entity, a broadcast UE, or both, indicating the configuration.

9. An apparatus for wireless communication at a first user equipment (UE), comprising:
- one or more memories; and
- one or more processors coupled with the one or more memories and individually or collectively configured to cause the first UE to:
  - receive a configuration associated with communication resources allocated for a sidelink control channel and a sidelink data channel mapped to corresponding physical communication resources;
  - map, based at least in part on the configuration, first communication resources allocated to the first UE for a symbol of each portion of sidelink control information to second communication resources for a time period, and wherein, to map the first communication resources to the second communication resources, the one or more processors are individually or collectively configured to cause the first UE to:
    - map, for the time period, consecutive symbols of a first stage sidelink control information to at least partially different first frequency ranges of a sub-channel; and
    - map, for the time period, consecutive symbols of a second stage sidelink control information to at least partially different second frequency ranges of the sub-channel and interlaced with respective first frequency ranges of the at least partially different first frequency ranges of the sub-channel; and
  - communicate with a second UE based on the second communication resources.

10. The apparatus of claim 9, wherein, to map the first communication resources to the second communication resources, the one or more processors are individually or collectively configured to cause the first UE to:
- map, for the time period, consecutive symbols of an additional first stage sidelink control information to a same third frequency range, at least two subsets of the additional first stage sidelink control information separated by a fourth frequency range; and
- map, for the time period, consecutive symbols of an additional second stage sidelink control information to a same fifth frequency range different from and interlaced with the third frequency range.

11. The apparatus of claim 10, wherein the one or more processors are individually or collectively configured to cause the first UE to:
- multiplex the additional first stage sidelink control information and the additional second stage sidelink control information to cover a bandwidth of a sidelink sub-channel.

12. The apparatus of claim 10, wherein the one or more processors are individually or collectively configured to cause the first UE to:
- multiplex the additional first stage sidelink control information and the additional second stage sidelink control information to cover a bandwidth greater than a sidelink sub-channel.

13. The apparatus of claim 9, wherein the one or more processors are individually or collectively configured to cause the first UE to:
- multiplex the first stage sidelink control information and the second stage sidelink control information to cover a bandwidth of a sidelink sub-channel.

14. The apparatus of claim 9, wherein the one or more processors are individually or collectively configured to cause the first UE to:
- multiplex the first stage sidelink control information and the second stage sidelink control information to cover a bandwidth greater than a sidelink sub-channel.

15. The apparatus of claim 9, wherein a second bandwidth that comprises the second communication resources is different from a first bandwidth that comprises the first communication resources.

16. The apparatus of claim 9, wherein, to receive the configuration, the one or more processors are individually or collectively configured to cause the first UE to:
- receive signaling from a network entity, a broadcast UE, or both, that indicates the configuration.

17. A non-transitory computer-readable medium storing code for wireless communication at a user equipment (UE), the code comprising instructions executable by one or more processors to:
- receive a configuration associated with communication resources allocated for a sidelink control channel and a sidelink data channel mapped to corresponding physical communication resources;
- map, based at least in part on the configuration, first communication resources allocated to the first UE for a symbol of each portion of sidelink control information to second communication resources for a time period, wherein the instructions to map the first communication resources to the second communication resources are executable by the one or more processors to:
    map, for the time period, consecutive symbols of a first stage sidelink control information to at least partially different first frequency ranges of a sub-channel; and
    map, for the time period, consecutive symbols of a second stage sidelink control information to at least partially different second frequency ranges of the sub-channel and interlaced with respective first frequency ranges of the at least partially different first frequency ranges of the sub-channel; and
    communicate with a second UE based on the second communication resources.

18. The non-transitory computer-readable medium of claim 17, wherein the instructions to map the first communication resources to the second communication resources are executable by the one or more processors to:
    map, for the time period, consecutive symbols of an additional first stage sidelink control information to a same third frequency range, at least two subsets of the additional first stage sidelink control information separated by a fourth frequency range; and
    map, for the time period, consecutive symbols of an additional second stage sidelink control information to a same fifth frequency range different from and interlaced with the third frequency range.

19. The non-transitory computer-readable medium of claim 18, wherein the instructions are executable by the one or more processors to:
    multiplex the additional first stage sidelink control information and the additional second stage sidelink control information to cover a bandwidth of a sidelink sub-channel.

20. The non-transitory computer-readable medium of claim 18, wherein the instructions are executable by the one or more processors to:
    multiplex the additional first stage sidelink control information and the additional second stage sidelink control information to cover a bandwidth greater than a sidelink sub-channel.

21. The non-transitory computer-readable medium of claim 17, wherein the instructions are executable by the one or more processors to:
    multiplex the first stage sidelink control information and the second stage sidelink control information to cover a bandwidth of a sidelink sub-channel.

22. The non-transitory computer-readable medium of claim 17, wherein the instructions are executable by the one or more processors to:
    multiplex the first stage sidelink control information and the second stage sidelink control information to cover a bandwidth greater than a sidelink sub-channel.

23. The non-transitory computer-readable medium of claim 17, wherein the instructions are executable by the one or more processors to:
    receive signaling from a network entity, a broadcast UE, or both, that indicates the configuration.

24. An apparatus for wireless communication at a first user equipment (UE), comprising:
    means for receiving a configuration associated with mapping communication resources allocated for a sidelink control channel and a sidelink data channel to corresponding physical communication resources;
    means for mapping, based at least in part on the configuration, first communication resources allocated to the first UE for a symbol of each portion of sidelink control information to second communication resources for a time period, the means for mapping comprising:
        means for mapping, for the time period, consecutive symbols of a first stage sidelink control information to at least partially different first frequency ranges of a sub-channel; and
        means for mapping, for the time period, consecutive symbols of a second stage sidelink control information to at least partially different second frequency ranges of the sub-channel and interlaced with respective first frequency ranges of the at least partially different first frequency ranges of the sub-channel; and
    means for communicating with a second UE using the second communication resources.

25. The apparatus of claim 24, wherein the means for mapping the first communication resources to the second communication resources comprises:
    means for mapping, for the time period, consecutive symbols of an additional first stage sidelink control information to a same third frequency range, at least two subsets of the additional first stage sidelink control information being separated by a fourth frequency range; and
    means for mapping, for the time period, consecutive symbols of an additional second stage sidelink control information to a same fifth frequency range different from and interlaced with the third frequency range.

26. The apparatus of claim 25, further comprising:
    means for multiplexing the additional first stage sidelink control information and the additional second stage sidelink control information to cover a bandwidth of a sidelink sub-channel.

27. The apparatus of claim 24, further comprising:
    means for multiplexing the first stage sidelink control information and the second stage sidelink control information to cover a bandwidth of a sidelink sub-channel.

28. The apparatus of claim 25, further comprising:
    means for multiplexing the additional first stage sidelink control information and the additional second stage sidelink control information to cover a bandwidth greater than a sidelink sub-channel.

29. The apparatus of claim 24, further comprising:
    means for multiplexing the first stage sidelink control information and the second stage sidelink control information to cover a bandwidth greater than a sidelink sub-channel.

30. The apparatus of claim 24, further comprising:
    means for receiving signaling from a network entity, a broadcast UE, or both, that indicates the configuration.

* * * * *